(12) United States Patent
Li et al.

(10) Patent No.: US 7,218,733 B2
(45) Date of Patent: May 15, 2007

(54) ENCRYPTION METHOD, PROGRAM FOR ENCRYPTION, MEMORY MEDIUM FOR STORING THE PROGRAM, AND ENCRYPTION APPARATUS, AS WELL AS DECRYPTION METHOD AND DECRYPTION APPARATUS

(75) Inventors: Jingye Li, Saitama-ken (JP); Satoshi Kakeya, Kanagawa-ken (JP)

(73) Assignee: C4 Technology Inc. (JP)

( * ) Notice: Subject to any disclaimer, the term of this patent is extended or adjusted under 35 U.S.C. 154(b) by 762 days.

(21) Appl. No.: 09/999,560

(22) Filed: Oct. 24, 2001

(65) Prior Publication Data

US 2003/0007635 A1    Jan. 9, 2003

(30) Foreign Application Priority Data

Jul. 9, 2001    (JP)    ............................... 2001-208386

(51) Int. Cl.
*H04L 9/00*    (2006.01)

(52) U.S. Cl. .......................................... 380/28; 380/44

(58) Field of Classification Search .................. 380/28
See application file for complete search history.

(56) References Cited

U.S. PATENT DOCUMENTS

| | | | | |
|---|---|---|---|---|
| 5,048,086 A | * | 9/1991 | Bianco et al. | ................ 380/28 |
| 5,365,589 A | * | 11/1994 | Gutowitz | ..................... 380/43 |
| 5,438,622 A | * | 8/1995 | Normile et al. | ............... 380/46 |
| 5,479,513 A | * | 12/1995 | Protopopescu et al. | ....... 380/28 |
| 5,481,613 A | * | 1/1996 | Ford et al. | ..................... 380/30 |
| 5,544,245 A | * | 8/1996 | Tsubakiyama | ............... 713/171 |
| 5,606,616 A | * | 2/1997 | Sprunk et al. | ................. 380/29 |
| 5,659,569 A | * | 8/1997 | Padovani et al. | ........... 370/479 |
| 5,673,319 A | * | 9/1997 | Bellare et al. | .............. 713/181 |
| 5,680,462 A | * | 10/1997 | Miller et al. | ................. 380/263 |
| 5,696,826 A | * | 12/1997 | Gao | ............................ 380/28 |

(Continued)

FOREIGN PATENT DOCUMENTS

EP    1071242 A1 *    1/2001

OTHER PUBLICATIONS

Douglas Frey, Chaotic Digital Encoding: An Approach to Secure Communication, Oct. 1993, IEEE, vol. 40, Issue: 10, pp. 660-666.*

(Continued)

*Primary Examiner*—Nasser Moazzami
*Assistant Examiner*—David Garcia Cervetti
(74) *Attorney, Agent, or Firm*—Ostrolenk, Faber, Gerb & Soffen, LLP

(57) ABSTRACT

The present invention relates to a cryptosystem. A keystream table [Ks] is a virtual data space. Every data of 1 byte in a secondary ciphertext $E_2$ provides a vector directional component IR. The data Ks (IR) in the keystream table [Ks] designated by the directional component IR of the vector is recognized as the quantitative component of the vector. By handling a secondary ciphertext $E_2$ of 1 byte as the address in the keystream table [Ks], the secondary ciphertext $E_2$ can be recognized as the directional component of the vector. A logical operation for the data Ks (IR) is performed, and the internal vector data V is sequentially replaced every 1 byte. An exclusive OR operation is performed between the internal vector data V and the primary ciphertext E1 for generating a secondary ciphertext $E_2$.

44 Claims, 23 Drawing Sheets

U.S. PATENT DOCUMENTS

| | | | | |
|---|---|---|---|---|
| 5,729,607 | A * | 3/1998 | DeFries et al. | 380/263 |
| 5,740,246 | A * | 4/1998 | Saito | 705/52 |
| 5,745,576 | A * | 4/1998 | Abraham et al. | 705/73 |
| 5,748,734 | A * | 5/1998 | Mizikovsky | 380/247 |
| 5,751,811 | A * | 5/1998 | Magnotti et al. | 380/28 |
| 5,761,306 | A * | 6/1998 | Lewis | 380/282 |
| 5,850,450 | A * | 12/1998 | Schweitzer et al. | 380/30 |
| 5,857,025 | A * | 1/1999 | Anderson et al. | 380/28 |
| 5,933,501 | A * | 8/1999 | Leppek | 380/259 |
| 5,949,883 | A * | 9/1999 | Ford | 380/28 |
| 6,014,445 | A * | 1/2000 | Kohda et al. | 380/28 |
| 6,055,316 | A * | 4/2000 | Perlman et al. | 380/262 |
| 6,064,738 | A * | 5/2000 | Fridrich | 380/28 |
| 6,178,217 | B1 * | 1/2001 | Defries et al. | 375/377 |
| 6,178,244 | B1 * | 1/2001 | Takeda et al. | 380/277 |
| 6,240,187 | B1 * | 5/2001 | Lewis | 380/282 |
| 6,252,958 | B1 * | 6/2001 | Rose | 380/28 |
| 6,259,790 | B1 * | 7/2001 | Takagi et al. | 380/30 |
| 6,269,163 | B1 * | 7/2001 | Rivest et al. | 380/28 |
| 6,314,186 | B1 * | 11/2001 | Lee et al. | 380/28 |
| 6,331,974 | B1 * | 12/2001 | Yang et al. | 370/342 |
| 6,337,910 | B1 * | 1/2002 | Goff et al. | 380/28 |
| 6,404,888 | B1 * | 6/2002 | Barbir | 380/22 |
| 6,415,032 | B1 * | 7/2002 | Doland | 380/255 |
| 6,430,588 | B1 * | 8/2002 | Kobayashi et al. | 708/492 |
| 6,480,605 | B1 * | 11/2002 | Uchiyama et al. | 380/30 |
| 6,490,357 | B1 * | 12/2002 | Rose | 380/265 |
| 6,647,493 | B1 * | 11/2003 | Occhipinti et al. | 713/170 |
| 6,704,871 | B1 * | 3/2004 | Kaplan et al. | 713/192 |
| 6,708,273 | B1 * | 3/2004 | Ober et al. | 713/189 |
| 6,711,680 | B1 * | 3/2004 | Cordery | 713/176 |
| 6,732,127 | B2 * | 5/2004 | Karp | 708/250 |
| 6,763,363 | B1 * | 7/2004 | Driscoll | 708/252 |
| 6,868,159 | B2 * | 3/2005 | Leppek | 380/28 |
| 6,879,689 | B2 * | 4/2005 | Carroll et al. | 380/44 |
| 2002/0023209 | A1 * | 2/2002 | Domstedt et al. | 713/160 |
| 2003/0182246 | A1 * | 9/2003 | Johnson et al. | 705/76 |

OTHER PUBLICATIONS

Dachselt et al., Discrete-Time Chaotic encryption systems, Part III: Cryptographical Analysis, Sep. 1998, IEEE, vol. 45, issue 9, pp. 983-988.*

Gotz et al., Discrete-Time Chaotic encryption systems, Part I: Statistical Design Approach, Oct. 1997, IEEE, vol. 44, issue 10, pp. 963-970.*

Yong et al., A new method of the Chaos Encryption, Oct. 1998, IEEE, Signal Processing Proceedings, 1998. ICSP '98, pp. 233-236.*

Jui-Cheng et al., A new chaotic key-based design for image encryption and decryption, May 2000, The 2000 IEEE international Symposium on Circuits and Systems, vol. 4, 28-31, pp. 49-52, vol. 4.*

Beritelli et al., Multilayer chaotic encryption for secure communications in packet switching networks, Aug. 2000, IEEE, International Conference on Communication Technology, Proceedings, vol. 2, 21-25 pp. 1575-1582 vol. 2.*

Zhou et al., Secure communication via one-dimensional chaotic inverse systems, Jun. 1997, IEEE International Symposium on Circuits and Systems, vol. 2, 9-12 pp. 1029-1032 vol. 2.*

Chambers, Comments on "Chaotic digital encoding: an approach to secure communication" and reply by Frey, D., Nov. 1999 IEEE Transactions on Circuits and Systems II: Analog and Digital Signal Processing, vol. 46, Issue 11, pp. 1445-1447.*

Dachselt et al., Chaotic coding and cryptoanalysis, Jun. 1997, IEEE International Symposium on Circuits and Systems, 1997, vol. 2, 9-12, pp. 1061-1064 vol. 2.*

Sobhy et al., Chaotic algorithms for data encryption, May 2001, IEEE International Conference on Acoustics, Speech, and Signal Processing, 2001, vol. 2, 7-11, pp. 997-1000 vol. 2.*

Papadimitriou et al., Chaotic real-time encryption using systems of difference equations with large parameter spaces, Jun. 1996, 8th IEEE Signal Processing Workshop on Statistical Signal and Array Processing, pp. 566-569.*

Delgado-Restituto et al., Discrete-time integrated circuits for chaotic communication, Jun. 1997, IEEE International Symposium on Circuits and Systems, vol. 2, pp. 1073-1076 vol. 2.*

Kocarev et al., From chaotic maps to encryption schemes, Jun. 1998, IEEE International Symposium on Circuits and Systems, vol. 4, pp. 514-517 vol. 4.*

Sobhy et al., Methods of attacking chaotic encryption and countermeasures, May 2001, IEEE International Conference on Acoustics, Speech, and Signal Processing, vol. 2, pp. 1001-1004 vol. 2.*

Jakimoski et al., Chaos and cryptography: block encryption ciphers based on chaotic maps, Feb. 2001, IEEE Transactions on Circuits and Systems I: Fundamental Theory and Applications, vol. 48, Issue: 2, pp. 163-169.*

Microsoft Press Computer Dictionary, 3rd Edition, 1997.*

Bruce Schneier, Applied Cryptography, Second Edition, Protocols, Algorithms, and Source Code in C, 1996, John Wiley & Sons, pp. 189-211.*

Menezes et al., Handbook of Applied Cryptography, 1996, CRC Press, pp. 223-282.*

* cited by examiner $X(i+1) = \alpha X(i)(1-X(i))$ $X(i+1) = \alpha X(i)(1-X(i))$

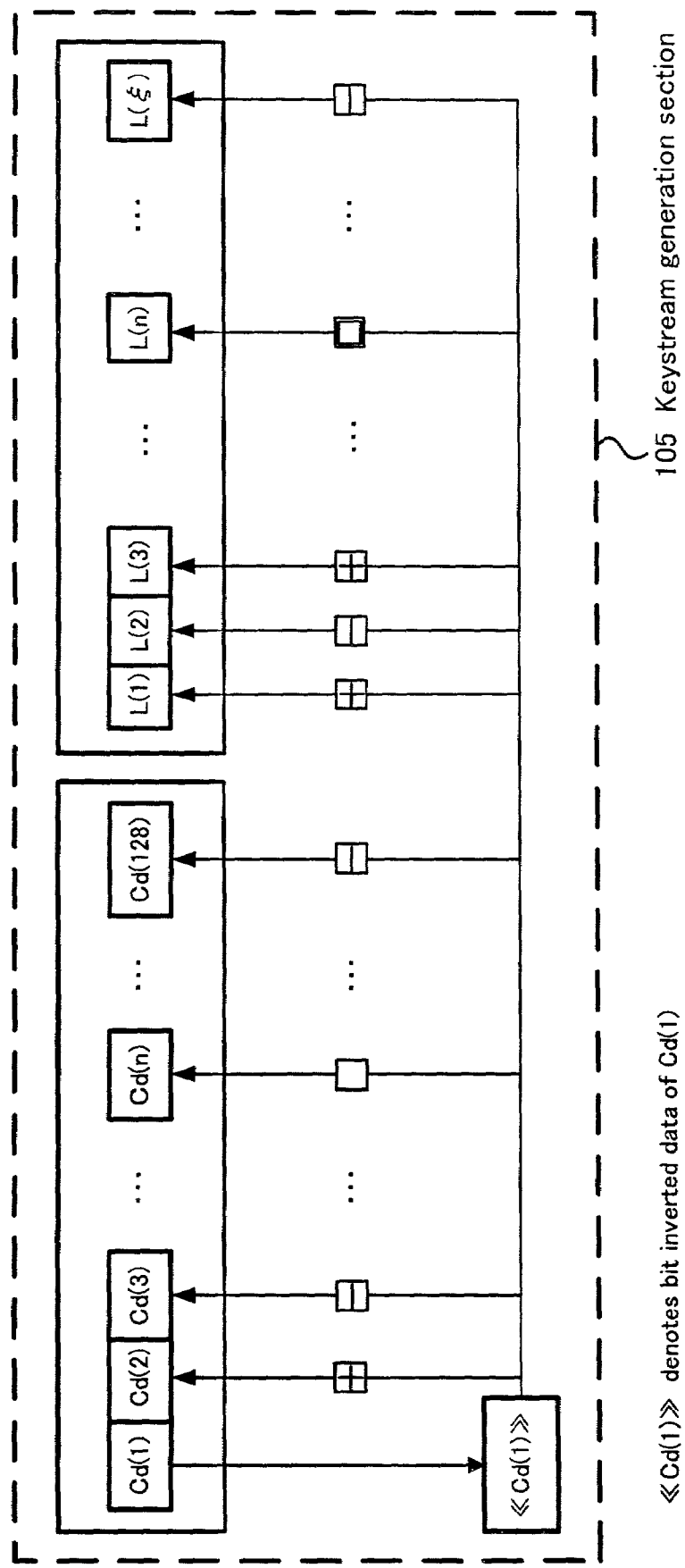

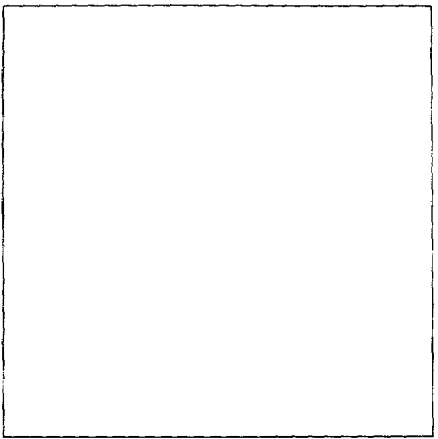

FIG.12(B)

white.bmp File size: 32,830 bytes
512 pixels for both width and height(A resolution of 96 for both horizontal and vertical directions)
Monochrome using only white

FIG.12(A)

black.bmp File size: 32,830 bytes
512 pixels for both width and height (A resolution of 96 for both horizontal and vertical directions)
Monochrome using only black

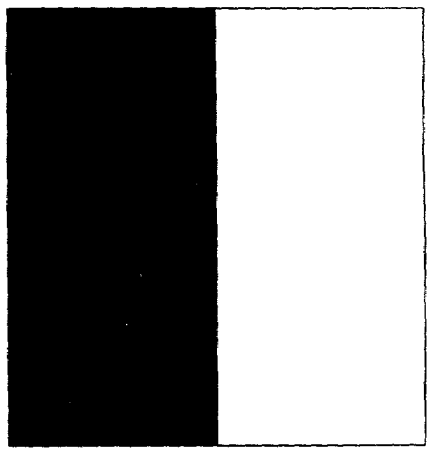

FIG.12(C)

blackwhite.bmp File size: 32,830 bytes
512 pixels for both width and height(A resolution of 96 for both horizontal and vertical directions)
Monochrome using black for upper half and white for lower half

FIG.13

| Plaintext (name of file) | Encryption key used | Decryption key used | File size (in byte) | Plaintext Freq. of occur.:0 | Freq. of occur.:1 | Ciphertext Freq. of occur.:0 | Freq. of occur.:1 | Decrypted plaintext Freq. of occur.:0 | Freq. of occur.:1 |
|---|---|---|---|---|---|---|---|---|---|
| black.bmp | 11111111 | 1111111112 | 32,830 | 60 0.02% | 262,580 99.98% | 131,128 49.93% | 131,512 50.07% | 131,610 50.11% | 131,030 49.89% |
| white.bmp | a1a1a1a12 | b1b1b1b13 | 32,830 | 262,204 99.83% | 436 0.17% | 131,437 50.04% | 131,203 49.96% | 131,298 49.99% | 131,342 50.01% |
| blackwhite.bmp | abc | 12345 | 32,830 | 130,620 49.73% | 132,020 50.27% | 131,056 49.9% | 131,584 50.1% | 131,200 49.95% | 131,440 50.05% |
| Help.lzh (Visio) * | acc1123456n######qwua lqf1l&&&&&&&pekingte | acc1123456n######qwua lqf1l&&&&&&&pekingtf | 6,376,587 | 25,554,514 50.09% | 25,458,182 49.91% | 25,501,721 49.99% | 25,510,975 50.01% | 25,506,576 50% | 25,506,120 50% |
| Average | | | | 49.92% | 50.08% | 49.97% | 50.04% | 50.01% | 49.99% |

\* Help.lzh File size: 6,376,587 bytes
Japanese edition of Microsoft Visio 2000 SRI (The Visual Language of Business)
Data obtained as an lzh file by compressing the entire Help folder (13.4 MB) with compression software

FIG.14

|    | *0     | *1  | *2 | *3 | *4 | *5 | *6 | *7 | *8 | *9 | *A | *B | *C | *D | *E | *F |
|----|--------|-----|----|----|----|----|----|----|----|----|----|----|----|----|----|----|
| 0* | 32,812 | 2   | 2  | 0  | 0  | 0  | 0  | 0  | 0  | 0  | 0  | 0  | 0  | 0  | 2  | 0  |
| 1* | 0      | 0   | 0  | 0  | 0  | 0  | 0  | 0  | 0  | 0  | 0  | 0  | 0  | 0  | 0  | 0  |
| 2* | 0      | 0   | 0  | 0  | 0  | 0  | 0  | 0  | 1  | 0  | 0  | 0  | 0  | 0  | 0  | 0  |
| 3* | 0      | 0   | 0  | 0  | 0  | 0  | 0  | 0  | 0  | 0  | 0  | 0  | 0  | 0  | 2  | 0  |
| 4* | 0      | 0   | 1  | 0  | 0  | 0  | 0  | 0  | 0  | 0  | 0  | 0  | 0  | 1  | 0  | 0  |
| 5* | 0      | 0   | 0  | 0  | 0  | 0  | 0  | 0  | 0  | 0  | 0  | 0  | 0  | 0  | 0  | 0  |
| 6* | 0      | 0   | 0  | 0  | 0  | 0  | 0  | 0  | 0  | 0  | 0  | 0  | 0  | 0  | 0  | 0  |
| 7* | 0      | 0   | 0  | 0  | 0  | 0  | 0  | 0  | 0  | 0  | 0  | 0  | 0  | 0  | 0  | 0  |
| 8* | 2      | 0   | 0  | 0  | 0  | 0  | 0  | 0  | 0  | 0  | 0  | 0  | 0  | 0  | 0  | 0  |
| 9* | 0      | 0   | 0  | 0  | 0  | 0  | 0  | 0  | 0  | 0  | 0  | 0  | 0  | 0  | 0  | 0  |
| A* | 0      | 0   | 0  | 0  | 0  | 0  | 0  | 0  | 0  | 0  | 0  | 0  | 0  | 0  | 0  | 0  |
| B* | 0      | 0   | 0  | 0  | 0  | 0  | 0  | 0  | 0  | 0  | 0  | 0  | 0  | 0  | 0  | 0  |
| C* | 0      | 0   | 0  | 0  | 2  | 0  | 0  | 0  | 0  | 0  | 0  | 0  | 0  | 0  | 0  | 0  |
| D* | 0      | 0   | 0  | 0  | 0  | 0  | 0  | 0  | 0  | 0  | 0  | 0  | 0  | 0  | 0  | 0  |
| E* | 0      | 0   | 0  | 0  | 0  | 0  | 0  | 0  | 0  | 0  | 0  | 0  | 0  | 0  | 0  | 0  |
| F* | 0      | 0   | 0  | 0  | 0  | 0  | 0  | 0  | 0  | 0  | 0  | 0  | 0  | 0  | 0  | 3  |

Table gives distribution of binary data occurrence frequencies in black.bmp file.

|    | *0  | *1  | *2  | *3  | *4  | *5  | *6  | *7  | *8  | *9  | *A  | *B  | *C  | *D  | *E  | *F  |
|----|-----|-----|-----|-----|-----|-----|-----|-----|-----|-----|-----|-----|-----|-----|-----|-----|
| 0* | 113 | 135 | 121 | 143 | 119 | 136 | 146 | 132 | 139 | 121 | 126 | 166 | 131 | 129 | 97  | 140 |
| 1* | 96  | 128 | 127 | 130 | 133 | 128 | 138 | 126 | 129 | 125 | 127 | 108 | 105 | 98  | 148 | 127 |
| 2* | 139 | 113 | 103 | 112 | 123 | 123 | 140 | 122 | 126 | 129 | 116 | 147 | 138 | 129 | 126 | 117 |
| 3* | 122 | 132 | 141 | 143 | 129 | 129 | 149 | 118 | 121 | 134 | 127 | 124 | 128 | 119 | 139 | 135 |
| 4* | 121 | 139 | 140 | 121 | 123 | 124 | 123 | 125 | 132 | 138 | 140 | 122 | 141 | 126 | 141 | 135 |
| 5* | 118 | 121 | 130 | 114 | 128 | 145 | 111 | 111 | 119 | 132 | 129 | 129 | 163 | 139 | 120 | 123 |
| 6* | 140 | 135 | 120 | 134 | 129 | 132 | 124 | 135 | 144 | 113 | 145 | 121 | 119 | 134 | 120 | 131 |
| 7* | 119 | 122 | 134 | 133 | 129 | 134 | 116 | 139 | 110 | 120 | 143 | 121 | 130 | 115 | 138 | 107 |
| 8* | 137 | 130 | 138 | 135 | 128 | 143 | 129 | 118 | 144 | 102 | 130 | 122 | 130 | 135 | 138 | 111 |
| 9* | 130 | 110 | 129 | 127 | 143 | 135 | 108 | 140 | 128 | 115 | 136 | 130 | 104 | 111 | 118 | 131 |
| A* | 134 | 135 | 136 | 125 | 120 | 97  | 129 | 129 | 127 | 145 | 131 | 121 | 131 | 118 | 139 | 141 |
| B* | 116 | 123 | 134 | 132 | 139 | 128 | 127 | 118 | 121 | 133 | 113 | 133 | 144 | 130 | 100 | 114 |
| C* | 148 | 147 | 130 | 145 | 131 | 141 | 115 | 117 | 140 | 139 | 142 | 122 | 147 | 134 | 155 | 115 |
| D* | 143 | 127 | 124 | 154 | 121 | 112 | 122 | 144 | 134 | 115 | 127 | 137 | 121 | 104 | 118 | 129 |
| E* | 142 | 125 | 133 | 139 | 129 | 113 | 145 | 121 | 128 | 121 | 125 | 148 | 140 | 129 | 146 | 119 |
| F* | 140 | 119 | 149 | 132 | 138 | 127 | 120 | 121 | 138 | 121 | 135 | 124 | 136 | 121 | 115 | 122 |

Table gives distribution of binary data occurrence frequencies in ciphertext generated by encrypting black.bmp file with encryption key "1111111111".

|    | *0  | *1  | *2  | *3  | *4  | *5  | *6  | *7  | *8  | *9  | *A  | *B  | *C  | *D  | *E  | *F  |
|----|-----|-----|-----|-----|-----|-----|-----|-----|-----|-----|-----|-----|-----|-----|-----|-----|
| 0* | 147 | 112 | 128 | 124 | 142 | 136 | 138 | 113 | 123 | 123 | 146 | 136 | 134 | 133 | 104 | 156 |
| 1* | 140 | 128 | 115 | 134 | 120 | 136 | 141 | 124 | 126 | 130 | 124 | 145 | 105 | 147 | 132 | 139 |
| 2* | 132 | 115 | 133 | 131 | 112 | 113 | 108 | 110 | 137 | 119 | 127 | 120 | 140 | 107 | 134 | 117 |
| 3* | 137 | 123 | 118 | 143 | 147 | 127 | 121 | 149 | 110 | 96  | 114 | 125 | 125 | 118 | 141 | 127 |
| 4* | 106 | 138 | 131 | 131 | 121 | 113 | 138 | 128 | 113 | 114 | 126 | 149 | 128 | 125 | 93  | 132 |
| 5* | 117 | 121 | 134 | 115 | 141 | 136 | 146 | 124 | 119 | 129 | 124 | 131 | 141 | 119 | 139 | 120 |
| 6* | 137 | 109 | 108 | 111 | 126 | 124 | 100 | 122 | 158 | 127 | 133 | 126 | 118 | 121 | 136 | 123 |
| 7* | 139 | 139 | 121 | 119 | 128 | 137 | 135 | 131 | 148 | 128 | 123 | 149 | 114 | 129 | 154 | 150 |
| 8* | 117 | 122 | 119 | 106 | 127 | 152 | 129 | 129 | 142 | 149 | 122 | 149 | 135 | 113 | 123 | 149 |
| 9* | 159 | 106 | 171 | 111 | 149 | 134 | 160 | 132 | 121 | 144 | 147 | 128 | 115 | 142 | 114 | 129 |
| A* | 125 | 127 | 148 | 139 | 119 | 101 | 118 | 128 | 131 | 130 | 136 | 108 | 114 | 134 | 105 | 127 |
| B* | 146 | 148 | 137 | 131 | 135 | 123 | 131 | 143 | 95  | 119 | 128 | 139 | 135 | 120 | 138 | 123 |
| C* | 137 | 129 | 106 | 122 | 127 | 117 | 131 | 123 | 146 | 135 | 112 | 122 | 111 | 118 | 123 | 131 |
| D* | 135 | 123 | 114 | 126 | 132 | 114 | 140 | 122 | 125 | 136 | 113 | 114 | 113 | 131 | 137 | 133 |
| E* | 116 | 111 | 133 | 112 | 136 | 121 | 125 | 141 | 123 | 124 | 123 | 134 | 130 | 132 | 152 | 116 |
| F* | 129 | 140 | 144 | 116 | 134 | 120 | 153 | 148 | 124 | 123 | 157 | 119 | 141 | 124 | 147 | 136 |

Table gives distribution of binary data occurrence frequencies in decrypted plaintext generated by decrypting encrypted black.bmp file with decryption key "1111111112".

FIG.15

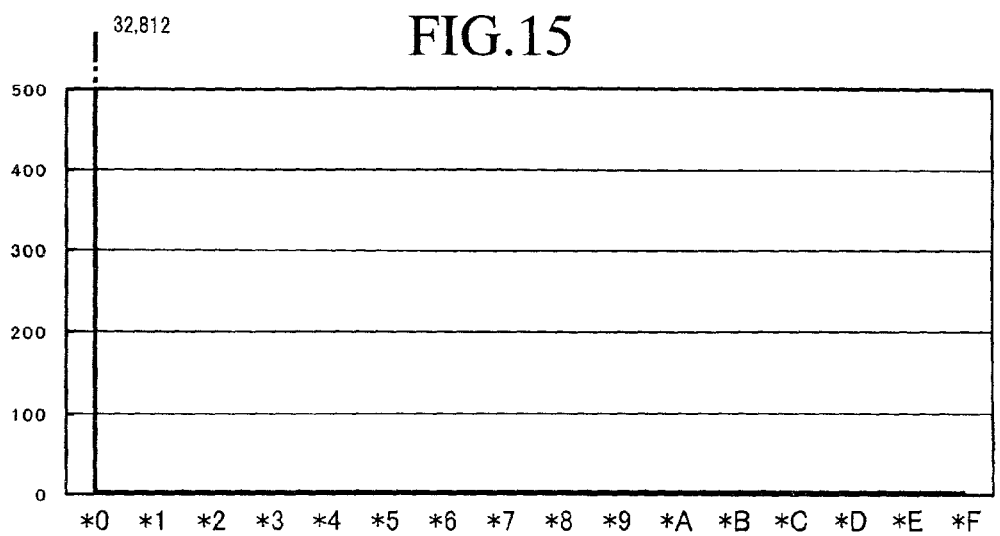

Line graphs show distribution of binary data occurrence frequencies in black.bmp file.

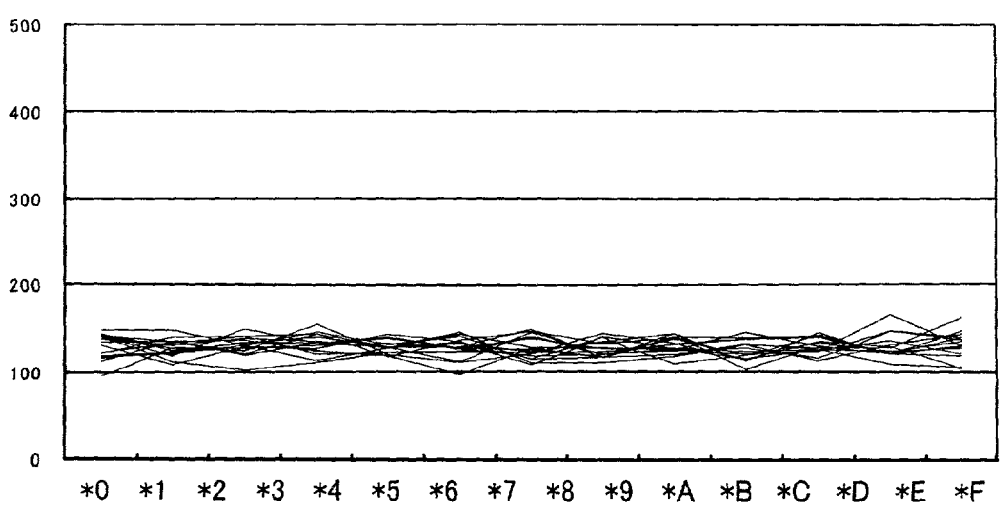

Line graphs show distribution of binary data occurrence frequencies in ciphertext generated by encrypting black.bmp file with encryption key "1111111111".

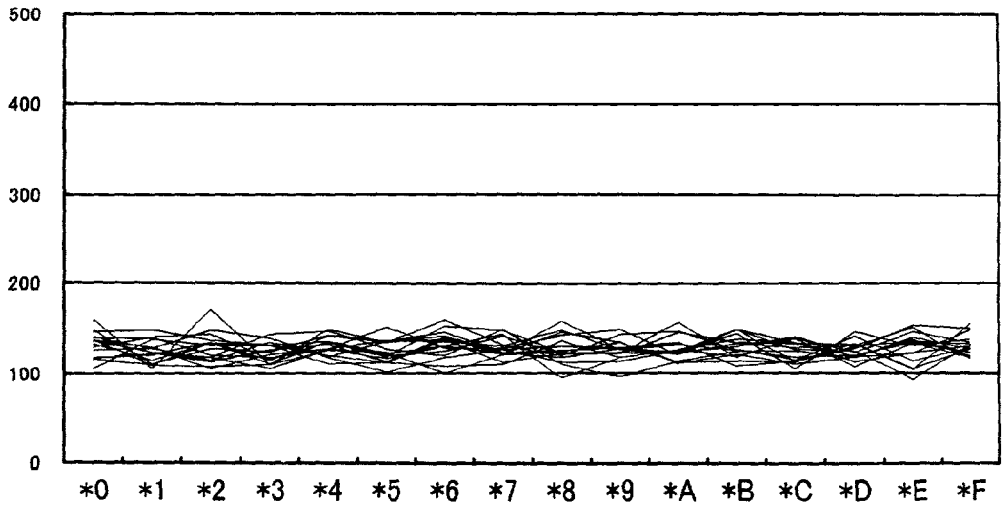

Line graphs show distribution of binary data occurrence frequencies in decrypted plaintext generated by decrypting encrypted black.bmp file with decryption key "1111111112".

FIG.16

|     | *0 | *1 | *2 | *3 | *4 | *5 | *6 | *7 | *8 | *9 | *A | *B | *C | *D | *E | *F |
|-----|----|----|----|----|----|----|----|----|----|----|----|----|----|----|----|-----|
| 0*  | 44 | 2  | 2  | 0  | 0  | 0  | 0  | 0  | 0  | 0  | 0  | 0  | 0  | 0  | 2  | 0 |
| 1*  | 0  | 0  | 0  | 0  | 0  | 0  | 0  | 0  | 0  | 0  | 0  | 0  | 0  | 0  | 0  | 0 |
| 2*  | 0  | 0  | 0  | 0  | 0  | 0  | 0  | 0  | 1  | 0  | 0  | 0  | 0  | 0  | 0  | 0 |
| 3*  | 0  | 0  | 0  | 0  | 0  | 0  | 0  | 0  | 0  | 0  | 0  | 0  | 0  | 0  | 2  | 0 |
| 4*  | 0  | 0  | 1  | 0  | 0  | 0  | 0  | 0  | 0  | 0  | 0  | 0  | 0  | 1  | 0  | 0 |
| 5*  | 0  | 0  | 0  | 0  | 0  | 0  | 0  | 0  | 0  | 0  | 0  | 0  | 0  | 0  | 0  | 0 |
| 6*  | 0  | 0  | 0  | 0  | 0  | 0  | 0  | 0  | 0  | 0  | 0  | 0  | 0  | 0  | 0  | 0 |
| 7*  | 0  | 0  | 0  | 0  | 0  | 0  | 0  | 0  | 0  | 0  | 0  | 0  | 0  | 0  | 0  | 0 |
| 8*  | 2  | 0  | 0  | 0  | 0  | 0  | 0  | 0  | 0  | 0  | 0  | 0  | 0  | 0  | 0  | 0 |
| 9*  | 0  | 0  | 0  | 0  | 0  | 0  | 0  | 0  | 0  | 0  | 0  | 0  | 0  | 0  | 0  | 0 |
| A*  | 0  | 0  | 0  | 0  | 0  | 0  | 0  | 0  | 0  | 0  | 0  | 0  | 0  | 0  | 0  | 0 |
| B*  | 0  | 0  | 0  | 0  | 0  | 0  | 0  | 0  | 0  | 0  | 0  | 0  | 0  | 0  | 0  | 0 |
| C*  | 0  | 0  | 0  | 0  | 2  | 0  | 0  | 0  | 0  | 0  | 0  | 0  | 0  | 0  | 0  | 0 |
| D*  | 0  | 0  | 0  | 0  | 0  | 0  | 0  | 0  | 0  | 0  | 0  | 0  | 0  | 0  | 0  | 0 |
| E*  | 0  | 0  | 0  | 0  | 0  | 0  | 0  | 0  | 0  | 0  | 0  | 0  | 0  | 0  | 0  | 0 |
| F*  | 0  | 0  | 0  | 0  | 0  | 0  | 0  | 0  | 0  | 0  | 0  | 0  | 0  | 0  | 0  | 32,771 |

Table gives distribution of binary data occurrence frequencies in white.bmp file.

|     | *0  | *1  | *2  | *3  | *4  | *5  | *6  | *7  | *8  | *9  | *A  | *B  | *C  | *D  | *E  | *F  |
|-----|-----|-----|-----|-----|-----|-----|-----|-----|-----|-----|-----|-----|-----|-----|-----|-----|
| 0*  | 105 | 116 | 137 | 132 | 129 | 128 | 138 | 141 | 120 | 138 | 134 | 121 | 127 | 149 | 141 | 128 |
| 1*  | 142 | 134 | 127 | 134 | 136 | 118 | 151 | 126 | 136 | 126 | 106 | 128 | 129 | 119 | 114 | 128 |
| 2*  | 140 | 106 | 126 | 127 | 134 | 129 | 124 | 117 | 145 | 138 | 121 | 134 | 124 | 125 | 134 | 125 |
| 3*  | 115 | 117 | 119 | 141 | 114 | 123 | 120 | 139 | 122 | 138 | 139 | 126 | 105 | 126 | 132 | 147 |
| 4*  | 126 | 123 | 118 | 133 | 23  | 132 | 121 | 143 | 127 | 133 | 122 | 130 | 140 | 128 | 117 | 136 |
| 5*  | 120 | 117 | 126 | 133 | 131 | 133 | 118 | 126 | 120 | 147 | 124 | 98  | 148 | 143 | 133 | 140 |
| 6*  | 133 | 129 | 142 | 134 | 141 | 127 | 140 | 131 | 116 | 126 | 135 | 108 | 134 | 156 | 123 | 132 |
| 7*  | 127 | 114 | 136 | 125 | 128 | 119 | 131 | 128 | 138 | 118 | 140 | 128 | 113 | 127 | 119 | 107 |
| 8*  | 126 | 121 | 133 | 126 | 116 | 128 | 122 | 152 | 129 | 122 | 149 | 131 | 124 | 130 | 133 | 132 |
| 9*  | 149 | 134 | 143 | 118 | 120 | 125 | 122 | 138 | 129 | 113 | 133 | 132 | 122 | 126 | 124 | 137 |
| A*  | 142 | 135 | 136 | 122 | 136 | 119 | 133 | 111 | 127 | 107 | 128 | 113 | 119 | 126 | 145 | 136 |
| B*  | 125 | 153 | 127 | 117 | 118 | 140 | 109 | 147 | 130 | 132 | 125 | 134 | 139 | 114 | 129 | 163 |
| C*  | 126 | 115 | 127 | 120 | 126 | 133 | 121 | 141 | 130 | 148 | 129 | 133 | 127 | 138 | 142 | 125 |
| D*  | 122 | 127 | 135 | 120 | 140 | 125 | 137 | 120 | 106 | 101 | 131 | 152 | 118 | 112 | 131 | 106 |
| E*  | 133 | 128 | 136 | 96  | 123 | 134 | 134 | 129 | 125 | 127 | 137 | 135 | 139 | 122 | 119 | 124 |
| F*  | 140 | 119 | 117 | 126 | 125 | 127 | 126 | 114 | 131 | 134 | 128 | 138 | 119 | 126 | 122 | 128 |

Table gives distribution of binary data occurrence frequencies in ciphertext generated by encrypting white.bmp file with encryption key "a1a1a1a12".

|     | *0  | *1  | *2  | *3  | *4  | *5  | *6  | *7  | *8  | *9  | *A  | *B  | *C  | *D  | *E  | *F  |
|-----|-----|-----|-----|-----|-----|-----|-----|-----|-----|-----|-----|-----|-----|-----|-----|-----|
| 0*  | 117 | 123 | 145 | 136 | 136 | 126 | 149 | 145 | 136 | 120 | 124 | 122 | 123 | 137 | 127 | 117 |
| 1*  | 134 | 125 | 129 | 121 | 131 | 128 | 125 | 126 | 120 | 117 | 99  | 143 | 110 | 128 | 136 | 128 |
| 2*  | 135 | 121 | 127 | 141 | 119 | 123 | 98  | 135 | 131 | 124 | 116 | 144 | 137 | 129 | 138 | 115 |
| 3*  | 146 | 131 | 133 | 131 | 152 | 118 | 103 | 146 | 130 | 134 | 148 | 121 | 162 | 131 | 124 | 132 |
| 4*  | 125 | 111 | 121 | 133 | 100 | 126 | 146 | 111 | 129 | 154 | 137 | 123 | 118 | 138 | 140 | 130 |
| 5*  | 126 | 139 | 109 | 132 | 115 | 142 | 130 | 133 | 138 | 141 | 143 | 109 | 120 | 121 | 140 | 128 |
| 6*  | 118 | 142 | 136 | 110 | 139 | 127 | 123 | 108 | 135 | 113 | 137 | 119 | 146 | 123 | 104 | 121 |
| 7*  | 120 | 128 | 105 | 128 | 111 | 116 | 128 | 122 | 131 | 124 | 119 | 132 | 123 | 158 | 146 | 149 |
| 8*  | 118 | 125 | 141 | 124 | 111 | 138 | 107 | 114 | 138 | 149 | 128 | 127 | 125 | 129 | 135 | 120 |
| 9*  | 119 | 113 | 138 | 147 | 136 | 131 | 126 | 118 | 119 | 139 | 112 | 123 | 121 | 125 | 137 | 110 |
| A*  | 111 | 115 | 143 | 120 | 112 | 160 | 146 | 129 | 129 | 130 | 123 | 123 | 124 | 131 | 144 | 105 |
| B*  | 138 | 118 | 121 | 119 | 120 | 123 | 119 | 129 | 125 | 128 | 126 | 121 | 130 | 134 | 123 | 142 |
| C*  | 132 | 143 | 132 | 124 | 111 | 126 | 141 | 141 | 121 | 126 | 130 | 130 | 136 | 117 | 119 | 129 |
| D*  | 130 | 124 | 120 | 146 | 124 | 129 | 139 | 139 | 136 | 137 | 107 | 127 | 146 | 126 | 147 | 117 |
| E*  | 134 | 134 | 129 | 106 | 131 | 123 | 111 | 134 | 117 | 140 | 136 | 120 | 135 | 117 | 134 | 136 |
| F*  | 154 | 118 | 154 | 134 | 137 | 126 | 128 | 117 | 134 | 128 | 126 | 137 | 151 | 127 | 131 | 128 |

Table gives distribution of binary data occurrence frequencies in decrypted plaintext generated by decrypting encrypted white.bmp file with decryption key "b1b1b1b13".

FIG.17

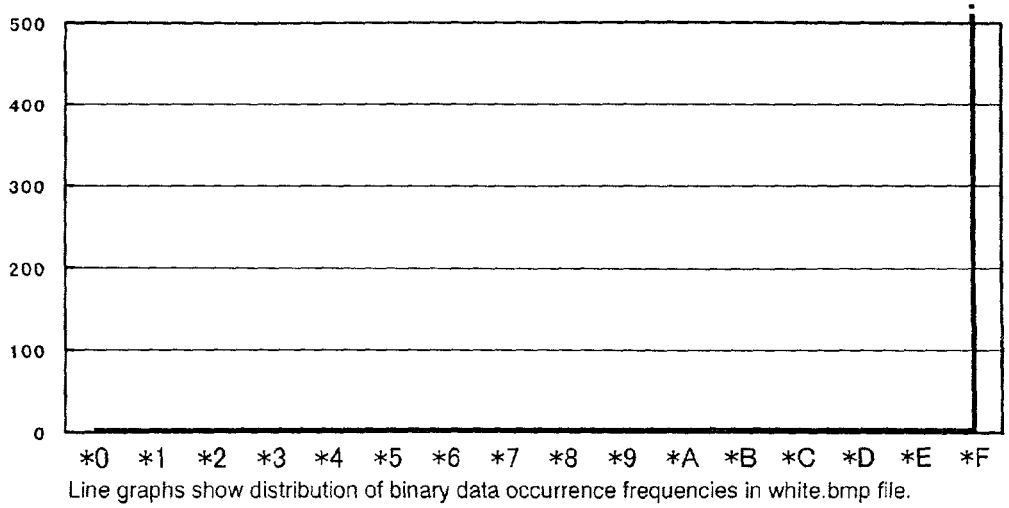

Line graphs show distribution of binary data occurrence frequencies in white.bmp file.

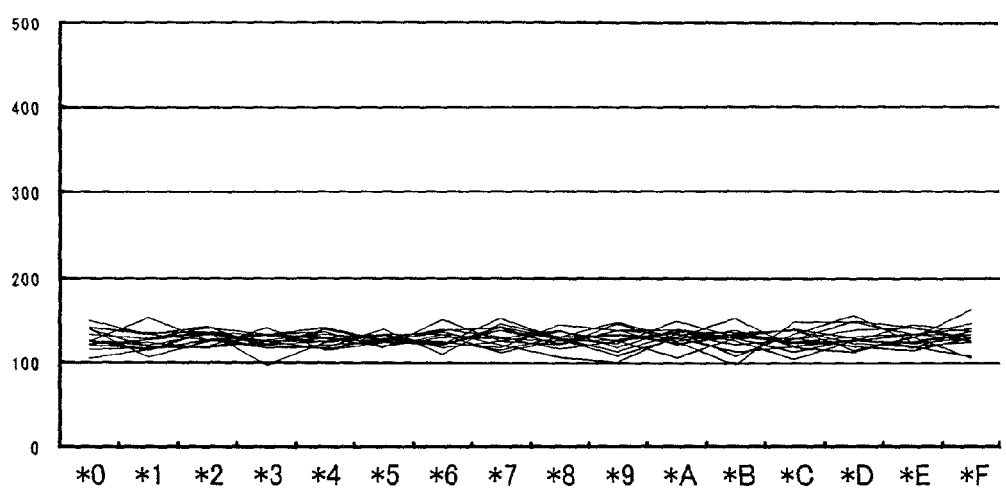

Line graphs show distribution of binary data occurrence frequencies in ciphertext generated by encrypting white.bmp file with encryption key "a1a1a1a12".

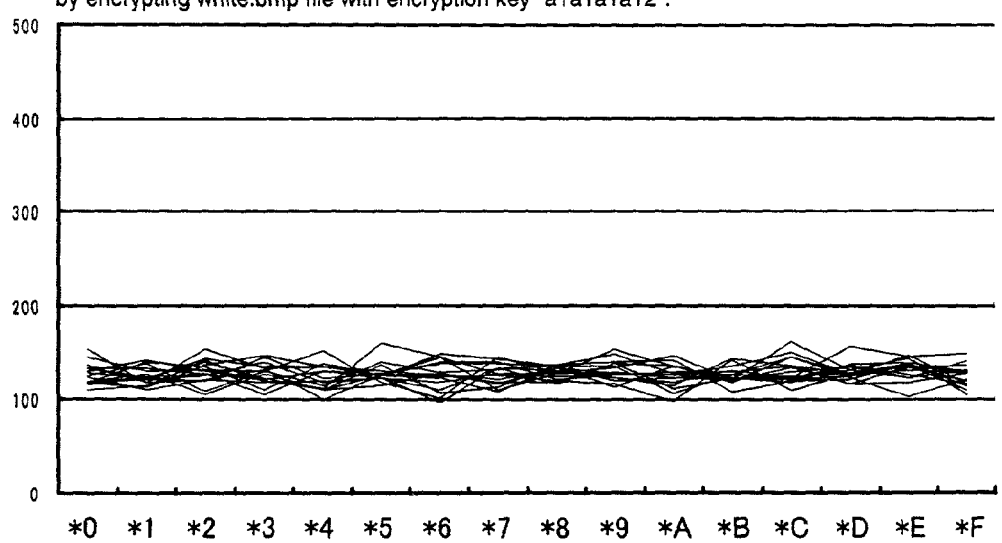

Line graphs show distribution of binary data occurrence frequencies in decrypted plaintext generated by decrypting encrypted white.bmp file with decryption key "b1b1b1b13".

FIG.18

|    | *0    | *1 | *2 | *3 | *4 | *5 | *6 | *7 | *8 | *9 | *A | *B | *C | *D | *E | *F |
|----|-------|----|----|----|----|----|----|----|----|----|----|----|----|----|----|----|
| 0* | 16492 | 2  | 2  | 0  | 0  | 0  | 0  | 0  | 0  | 0  | 0  | 0  | 0  | 0  | 2  | 0  |
| 1* | 0     | 0  | 0  | 0  | 0  | 0  | 0  | 0  | 0  | 0  | 0  | 0  | 0  | 0  | 0  | 0  |
| 2* | 0     | 0  | 0  | 0  | 0  | 0  | 0  | 1  | 0  | 0  | 0  | 0  | 0  | 0  | 0  | 0  |
| 3* | 0     | 0  | 0  | 0  | 0  | 0  | 0  | 0  | 0  | 0  | 0  | 0  | 0  | 0  | 2  | 0  |
| 4* | 0     | 0  | 1  | 0  | 0  | 0  | 0  | 0  | 0  | 0  | 0  | 0  | 0  | 1  | 0  | 0  |
| 5* | 0     | 0  | 0  | 0  | 0  | 0  | 0  | 0  | 0  | 0  | 0  | 0  | 0  | 0  | 0  | 0  |
| 6* | 0     | 0  | 0  | 0  | 0  | 0  | 0  | 0  | 0  | 0  | 0  | 0  | 0  | 0  | 0  | 0  |
| 7* | 0     | 0  | 0  | 0  | 0  | 0  | 0  | 0  | 0  | 0  | 0  | 0  | 0  | 0  | 0  | 0  |
| 8* | 2     | 0  | 0  | 0  | 0  | 0  | 0  | 3  | 0  | 0  | 0  | 0  | 0  | 0  | 0  | 0  |
| 9* | 0     | 0  | 0  | 0  | 0  | 0  | 0  | 0  | 0  | 0  | 0  | 0  | 0  | 0  | 0  | 0  |
| A* | 0     | 0  | 0  | 0  | 0  | 0  | 0  | 0  | 0  | 0  | 0  | 0  | 0  | 0  | 0  | 0  |
| B* | 0     | 0  | 0  | 0  | 0  | 0  | 0  | 0  | 0  | 0  | 0  | 0  | 0  | 0  | 0  | 0  |
| C* | 0     | 0  | 0  | 0  | 2  | 0  | 0  | 0  | 0  | 0  | 0  | 0  | 0  | 0  | 0  | 0  |
| D* | 0     | 0  | 0  | 0  | 0  | 0  | 0  | 0  | 0  | 0  | 0  | 0  | 0  | 0  | 0  | 0  |
| E* | 0     | 0  | 0  | 0  | 0  | 0  | 0  | 0  | 0  | 0  | 0  | 0  | 0  | 0  | 0  | 0  |
| F* | 0     | 0  | 0  | 0  | 0  | 0  | 0  | 0  | 0  | 0  | 0  | 0  | 0  | 0  | 0  | 16323 |

Table gives distribution of binary data occurrence frequencies in blackwhite.bmp file.

|    | *0  | *1  | *2  | *3  | *4  | *5  | *6  | *7  | *8  | *9  | *A  | *B  | *C  | *D  | *E  | *F  |
|----|-----|-----|-----|-----|-----|-----|-----|-----|-----|-----|-----|-----|-----|-----|-----|-----|
| 0* | 117 | 129 | 121 | 128 | 127 | 108 | 108 | 129 | 142 | 141 | 125 | 131 | 119 | 113 | 140 | 160 |
| 1* | 132 | 146 | 122 | 125 | 142 | 134 | 116 | 110 | 131 | 127 | 124 | 120 | 103 | 138 | 100 | 138 |
| 2* | 131 | 136 | 111 | 131 | 135 | 129 | 149 | 136 | 155 | 130 | 133 | 121 | 118 | 134 | 131 | 134 |
| 3* | 136 | 127 | 127 | 148 | 111 | 124 | 133 | 140 | 138 | 123 | 135 | 116 | 131 | 109 | 102 | 140 |
| 4* | 116 | 125 | 122 | 148 | 102 | 140 | 124 | 131 | 98  | 121 | 119 | 135 | 130 | 134 | 135 | 137 |
| 5* | 125 | 131 | 139 | 132 | 123 | 116 | 118 | 136 | 127 | 156 | 154 | 126 | 111 | 122 | 128 | 138 |
| 6* | 144 | 121 | 125 | 132 | 120 | 118 | 133 | 139 | 137 | 134 | 139 | 125 | 144 | 130 | 128 | 129 |
| 7* | 115 | 111 | 137 | 128 | 132 | 112 | 119 | 136 | 122 | 121 | 149 | 108 | 124 | 127 | 118 | 140 |
| 8* | 119 | 130 | 140 | 147 | 123 | 134 | 144 | 118 | 133 | 134 | 131 | 132 | 126 | 134 | 138 | 131 |
| 9* | 125 | 143 | 131 | 120 | 129 | 127 | 125 | 114 | 132 | 143 | 111 | 154 | 118 | 128 | 100 | 102 |
| A* | 133 | 160 | 123 | 110 | 138 | 119 | 152 | 128 | 123 | 113 | 124 | 108 | 139 | 129 | 106 | 123 |
| B* | 122 | 130 | 128 | 137 | 126 | 133 | 117 | 129 | 120 | 139 | 135 | 108 | 124 | 126 | 140 | 114 |
| C* | 128 | 138 | 127 | 120 | 122 | 104 | 130 | 141 | 121 | 120 | 124 | 112 | 137 | 138 | 130 | 129 |
| D* | 139 | 157 | 137 | 131 | 126 | 149 | 134 | 142 | 134 | 112 | 105 | 135 | 135 | 125 | 129 | 132 |
| E* | 125 | 134 | 134 | 151 | 138 | 145 | 117 | 115 | 125 | 114 | 119 | 161 | 144 | 124 | 127 | 131 |
| F* | 96  | 130 | 135 | 154 | 117 | 122 | 125 | 136 | 131 | 135 | 127 | 139 | 123 | 126 | 110 | 105 |

Table gives distribution of binary data occurrence frequencies in ciphertext generated
by encrypting blackwhite.bmp file with encryption key "abc".

|    | *0  | *1  | *2  | *3  | *4  | *5  | *6  | *7  | *8  | *9  | *A  | *B  | *C  | *D  | *E  | *F  |
|----|-----|-----|-----|-----|-----|-----|-----|-----|-----|-----|-----|-----|-----|-----|-----|-----|
| 0* | 134 | 122 | 146 | 133 | 122 | 151 | 134 | 123 | 130 | 153 | 122 | 145 | 139 | 140 | 128 | 153 |
| 1* | 124 | 117 | 127 | 110 | 125 | 131 | 114 | 113 | 132 | 128 | 118 | 131 | 118 | 127 | 126 | 113 |
| 2* | 129 | 131 | 129 | 125 | 128 | 104 | 118 | 140 | 144 | 137 | 130 | 121 | 126 | 113 | 119 | 137 |
| 3* | 123 | 134 | 136 | 127 | 116 | 122 | 123 | 131 | 128 | 130 | 131 | 136 | 119 | 131 | 114 | 120 |
| 4* | 144 | 120 | 136 | 115 | 117 | 122 | 123 | 135 | 132 | 125 | 113 | 126 | 119 | 115 | 125 | 130 |
| 5* | 143 | 132 | 134 | 128 | 137 | 125 | 109 | 131 | 125 | 118 | 126 | 122 | 110 | 120 | 137 | 127 |
| 6* | 118 | 135 | 131 | 133 | 141 | 123 | 106 | 119 | 134 | 116 | 145 | 121 | 136 | 151 | 115 | 128 |
| 7* | 123 | 140 | 102 | 109 | 133 | 135 | 131 | 152 | 139 | 133 | 154 | 146 | 124 | 121 | 133 | 136 |
| 8* | 118 | 106 | 127 | 121 | 123 | 127 | 130 | 139 | 136 | 129 | 100 | 140 | 119 | 137 | 136 | 129 |
| 9* | 109 | 119 | 103 | 133 | 122 | 107 | 132 | 126 | 131 | 122 | 144 | 143 | 135 | 146 | 127 | 122 |
| A* | 124 | 114 | 134 | 124 | 129 | 130 | 123 | 108 | 127 | 129 | 129 | 134 | 131 | 138 | 123 | 145 |
| B* | 134 | 112 | 141 | 149 | 148 | 131 | 127 | 137 | 135 | 121 | 131 | 140 | 122 | 145 | 135 | 122 |
| C* | 116 | 135 | 136 | 120 | 123 | 141 | 146 | 114 | 148 | 135 | 139 | 120 | 128 | 132 | 121 | 124 |
| D* | 132 | 114 | 118 | 139 | 135 | 119 | 111 | 152 | 110 | 125 | 112 | 126 | 124 | 139 | 139 | 135 |
| E* | 127 | 145 | 126 | 130 | 124 | 136 | 112 | 128 | 113 | 157 | 136 | 112 | 148 | 117 | 140 | 105 |
| F* | 135 | 130 | 115 | 115 | 148 | 128 | 131 | 130 | 135 | 116 | 149 | 121 | 130 | 131 | 144 | 133 |

Table gives distribution of binary data occurrence frequencies in decrypted plaintext generated
by decrypting encrypted blackwhite.bmp file with decryption key "12345".

FIG.19

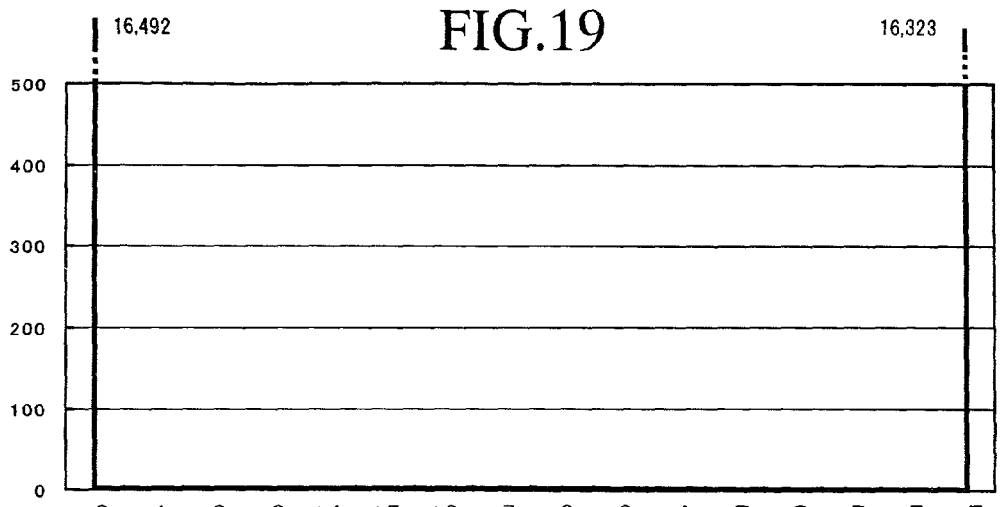

Line graphs show distribution of binary data occurrence frequencies in blackwhite.bmp file.

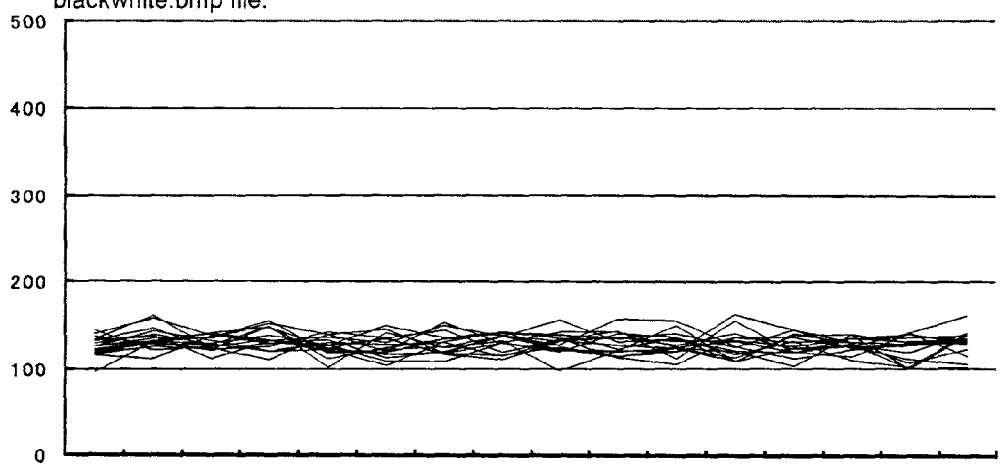

Line graphs show distribution of binary data occurrence frequencies in ciphertext generated by encrypting blackwhite.bmp file with encryption key "abc".

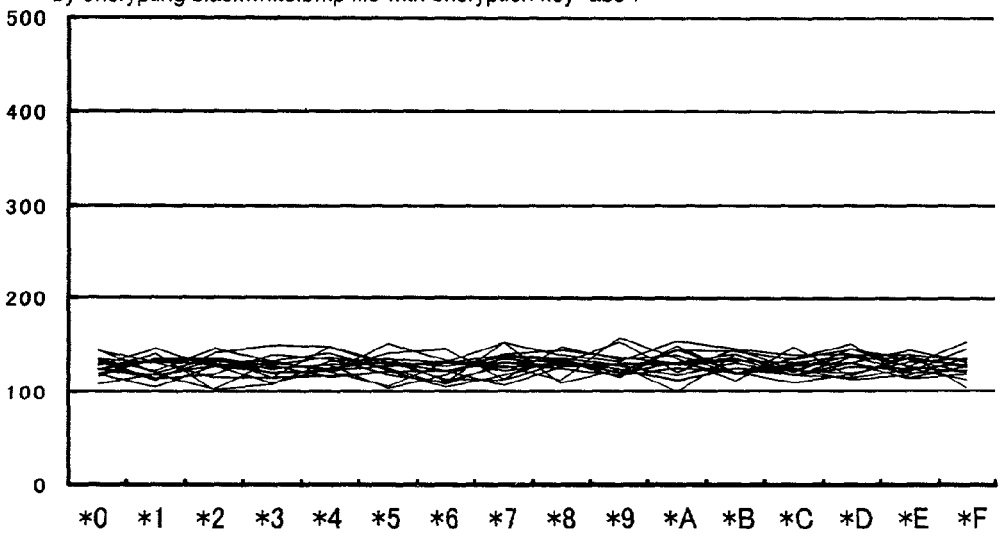

Line graphs show distribution of binary data occurrence frequencies in decrypted plaintext generated by decrypting encrypted blackwhite.bmp file with decryption key "12345".

FIG.20

|    | *0 | *1 | *2 | *3 | *4 | *5 | *6 | *7 | *8 | *9 | *A | *B | *C | *D | *E | *F |
|----|----|----|----|----|----|----|----|----|----|----|----|----|----|----|----|----|
| 0* | 33,257 | 24,756 | 24,847 | 24,696 | 25,083 | 24,356 | 24,577 | 24,987 | 24,861 | 24,673 | 24,120 | 24,955 | 24,385 | 24,465 | 24,377 | 25,230 |
| 1* | 24,700 | 24,680 | 24,582 | 24,821 | 24,315 | 24,171 | 24,775 | 24,978 | 24,609 | 24,871 | 24,609 | 24,635 | 24,888 | 24,771 | 24,973 | 25,193 |
| 2* | 24,922 | 24,306 | 24,313 | 24,736 | 24,708 | 24,655 | 24,743 | 24,869 | 24,836 | 24,438 | 24,619 | 24,801 | 24,499 | 25,160 | 25,190 | 25,262 |
| 3* | 24,510 | 24,309 | 24,671 | 24,805 | 24,702 | 24,845 | 25,023 | 24,777 | 24,882 | 24,963 | 24,849 | 25,332 | 24,787 | 24,993 | 25,348 | 25,099 |
| 4* | 24,903 | 24,654 | 24,722 | 24,782 | 24,437 | 24,535 | 24,743 | 24,965 | 24,966 | 24,670 | 24,616 | 24,644 | 24,575 | 25,047 | 24,683 | 24,971 |
| 5* | 24,812 | 24,468 | 24,641 | 24,926 | 24,638 | 24,757 | 24,920 | 24,986 | 24,379 | 24,885 | 24,512 | 25,090 | 24,689 | 24,826 | 24,962 | 25,261 |
| 6* | 24,748 | 24,535 | 24,459 | 24,612 | 24,700 | 24,783 | 24,769 | 24,869 | 24,950 | 25,187 | 24,526 | 24,976 | 25,332 | 25,131 | 25,061 | 24,956 |
| 7* | 24,871 | 24,695 | 24,320 | 25,218 | 24,949 | 24,719 | 24,963 | 25,195 | 24,473 | 24,684 | 24,878 | 25,484 | 25,119 | 25,457 | 25,669 | 25,539 |
| 8* | 25,179 | 24,575 | 24,883 | 24,358 | 24,369 | 24,220 | 24,323 | 24,737 | 24,520 | 24,449 | 24,534 | 24,660 | 24,575 | 24,972 | 24,524 | 24,933 |
| 9* | 24,644 | 24,787 | 24,768 | 24,820 | 24,413 | 24,554 | 24,306 | 25,002 | 24,659 | 24,714 | 24,857 | 25,187 | 24,763 | 25,194 | 25,159 | 25,239 |
| A* | 24,548 | 24,755 | 24,450 | 24,958 | 24,524 | 24,898 | 24,600 | 24,814 | 24,497 | 24,569 | 25,162 | 25,114 | 24,691 | 25,277 | 25,450 | 25,193 |
| B* | 24,568 | 24,818 | 24,928 | 25,020 | 24,891 | 24,996 | 24,899 | 25,444 | 25,093 | 24,839 | 25,203 | 25,671 | 25,078 | 25,630 | 25,160 | 25,683 |
| C* | 24,606 | 24,931 | 24,336 | 24,816 | 24,201 | 24,625 | 24,513 | 24,810 | 24,696 | 24,904 | 24,606 | 25,011 | 24,644 | 25,208 | 24,969 | 24,990 |
| D* | 24,820 | 24,590 | 25,001 | 25,045 | 24,555 | 24,893 | 25,069 | 25,170 | 25,131 | 25,013 | 25,044 | 25,411 | 25,396 | 25,211 | 25,336 | 25,656 |
| E* | 25,214 | 24,814 | 24,550 | 24,895 | 24,984 | 24,779 | 25,210 | 25,237 | 25,001 | 24,877 | 24,628 | 25,229 | 25,036 | 25,343 | 25,329 | 25,738 |
| F* | 24,687 | 25,004 | 25,017 | 25,238 | 25,003 | 25,114 | 25,307 | 25,965 | 25,270 | 25,439 | 25,672 | 25,859 | 25,469 | 25,570 | 25,435 | 24,530 |

Table gives distribution of binary data occurrence frequencies in Help.lzh file.

|    | *0 | *1 | *2 | *3 | *4 | *5 | *6 | *7 | *8 | *9 | *A | *B | *C | *D | *E | *F |
|----|----|----|----|----|----|----|----|----|----|----|----|----|----|----|----|----|
| 0* | 24,826 | 25,378 | 24,774 | 24,980 | 24,873 | 24,867 | 24,584 | 24,976 | 24,916 | 24,670 | 25,013 | 24,956 | 24,885 | 24,978 | 24,872 | 24,969 |
| 1* | 25,116 | 24,935 | 25,095 | 24,751 | 24,720 | 24,860 | 24,784 | 24,709 | 25,067 | 25,127 | 24,995 | 25,223 | 24,679 | 24,760 | 24,975 | 25,188 |
| 2* | 24,862 | 24,770 | 24,906 | 24,809 | 24,985 | 24,867 | 25,017 | 24,849 | 24,807 | 25,000 | 24,829 | 24,945 | 24,961 | 25,046 | 25,122 | 25,097 |
| 3* | 24,948 | 24,833 | 24,860 | 25,052 | 24,927 | 24,778 | 24,973 | 25,207 | 24,829 | 24,768 | 24,758 | 24,734 | 25,067 | 25,193 | 24,866 | 24,678 |
| 4* | 25,224 | 24,890 | 24,991 | 25,226 | 24,776 | 25,050 | 24,767 | 24,935 | 24,991 | 24,872 | 25,000 | 24,895 | 24,787 | 24,836 | 24,997 | 25,005 |
| 5* | 25,040 | 24,872 | 25,070 | 24,988 | 24,757 | 24,900 | 24,966 | 24,774 | 25,092 | 25,037 | 24,818 | 24,972 | 25,138 | 24,809 | 24,984 | 24,937 |
| 6* | 24,933 | 24,901 | 24,615 | 24,935 | 24,932 | 24,860 | 24,923 | 24,884 | 24,830 | 24,861 | 25,068 | 24,763 | 24,769 | 24,834 | 24,947 | 24,830 |
| 7* | 24,882 | 24,981 | 24,838 | 24,774 | 25,040 | 24,985 | 24,728 | 25,078 | 25,050 | 24,478 | 24,808 | 24,837 | 24,904 | 24,993 | 24,829 | 25,181 |
| 8* | 25,101 | 24,879 | 24,721 | 24,771 | 25,071 | 24,927 | 24,799 | 24,789 | 24,919 | 24,780 | 24,868 | 25,101 | 24,853 | 24,821 | 24,645 | 24,790 |
| 9* | 24,977 | 24,857 | 24,603 | 25,034 | 25,147 | 24,888 | 24,882 | 24,876 | 24,990 | 24,617 | 24,940 | 24,860 | 25,290 | 24,954 | 24,635 | 25,132 |
| A* | 24,918 | 24,751 | 24,979 | 24,961 | 25,000 | 24,743 | 25,220 | 25,007 | 24,710 | 24,970 | 24,639 | 25,112 | 24,887 | 25,173 | 24,784 | 25,269 |
| B* | 24,658 | 25,120 | 25,035 | 25,025 | 25,174 | 25,098 | 24,782 | 24,806 | 25,046 | 24,782 | 24,790 | 25,116 | 24,746 | 24,572 | 24,897 | 24,840 |
| C* | 24,590 | 24,753 | 24,836 | 25,251 | 24,834 | 24,852 | 24,981 | 24,742 | 24,726 | 24,620 | 24,699 | 24,993 | 24,853 | 24,991 | 25,087 | 24,813 |
| D* | 24,950 | 24,823 | 24,768 | 24,792 | 24,966 | 24,867 | 24,878 | 24,800 | 24,808 | 25,293 | 24,828 | 24,714 | 25,050 | 24,928 | 24,826 | 24,630 |
| E* | 25,023 | 24,729 | 25,111 | 25,034 | 24,904 | 24,877 | 24,661 | 24,815 | 24,614 | 24,736 | 25,204 | 24,835 | 24,743 | 25,009 | 24,747 | 24,899 |
| F* | 24,806 | 25,201 | 25,079 | 24,909 | 25,201 | 25,087 | 25,274 | 24,918 | 24,933 | 24,807 | 24,809 | 24,842 | 24,937 | 24,696 | 25,023 | 24,942 |

Table gives distribution of binary data occurrence frequencies in ciphertext generated by encrypting Hepl.lzh file with encryption key "acc1123456n######qwuatq利&&&&&&&pekingte".

|    | *0 | *1 | *2 | *3 | *4 | *5 | *6 | *7 | *8 | *9 | *A | *B | *C | *D | *E | *F |
|----|----|----|----|----|----|----|----|----|----|----|----|----|----|----|----|----|
| 0* | 24,859 | 24,728 | 24,876 | 25,139 | 24,760 | 24,960 | 25,201 | 24,792 | 24,808 | 25,057 | 24,905 | 25,030 | 24,762 | 24,935 | 24,688 | 25,205 |
| 1* | 24,991 | 24,881 | 24,819 | 24,651 | 24,792 | 24,954 | 24,762 | 24,661 | 24,498 | 24,756 | 25,123 | 24,970 | 24,769 | 25,106 | 24,724 | 24,709 |
| 2* | 24,891 | 24,932 | 24,811 | 24,658 | 24,726 | 24,776 | 24,979 | 24,893 | 24,734 | 24,427 | 24,936 | 25,088 | 24,751 | 25,266 | 25,055 | 24,723 |
| 3* | 25,006 | 24,766 | 24,856 | 24,808 | 24,763 | 24,904 | 24,893 | 25,150 | 24,838 | 24,927 | 24,636 | 24,951 | 24,776 | 24,904 | 24,836 | 24,893 |
| 4* | 24,852 | 25,063 | 24,815 | 25,011 | 25,100 | 24,827 | 24,751 | 24,805 | 24,658 | 25,060 | 24,828 | 25,119 | 24,847 | 25,053 | 25,170 | 25,138 |
| 5* | 25,174 | 25,043 | 24,783 | 24,731 | 24,714 | 25,192 | 24,496 | 24,778 | 24,857 | 24,951 | 24,764 | 25,018 | 25,071 | 25,056 | 24,839 | 24,994 |
| 6* | 24,533 | 24,548 | 25,289 | 24,820 | 24,825 | 24,942 | 25,064 | 24,858 | 24,898 | 24,731 | 25,096 | 25,115 | 25,012 | 25,058 | 24,967 | 24,775 |
| 7* | 25,075 | 24,947 | 24,731 | 24,744 | 24,820 | 24,833 | 25,001 | 25,007 | 25,120 | 24,711 | 25,118 | 25,251 | 25,294 | 25,154 | 24,653 | 25,079 |
| 8* | 24,937 | 24,948 | 24,955 | 24,829 | 24,982 | 25,014 | 25,127 | 24,950 | 24,863 | 24,830 | 24,756 | 24,880 | 25,220 | 25,149 | 24,982 | 24,985 |
| 9* | 24,625 | 24,678 | 25,172 | 24,813 | 25,084 | 24,928 | 24,883 | 24,909 | 24,986 | 24,922 | 24,918 | 24,903 | 25,011 | 24,891 | 24,797 | 25,045 |
| A* | 24,707 | 24,676 | 24,899 | 25,028 | 24,965 | 24,861 | 25,050 | 24,850 | 24,828 | 24,767 | 24,738 | 24,931 | 24,771 | 24,640 | 24,839 | 24,935 |
| B* | 24,929 | 24,697 | 24,959 | 24,578 | 24,885 | 24,926 | 25,057 | 25,074 | 24,845 | 25,024 | 24,948 | 24,937 | 24,748 | 24,768 | 24,907 | 25,006 |
| C* | 24,768 | 25,113 | 24,835 | 24,804 | 24,717 | 24,762 | 24,836 | 25,296 | 24,699 | 25,116 | 24,718 | 24,803 | 25,104 | 25,303 | 24,847 | 25,206 |
| D* | 24,833 | 24,884 | 25,165 | 24,992 | 24,970 | 24,904 | 24,907 | 24,914 | 25,318 | 24,963 | 25,084 | 24,609 | 25,069 | 24,602 | 25,032 | 24,872 |
| E* | 24,884 | 24,859 | 24,808 | 24,866 | 25,084 | 25,291 | 24,970 | 25,084 | 25,001 | 25,009 | 24,960 | 25,126 | 24,895 | 24,628 | 24,821 | 24,638 |
| F* | 25,077 | 24,739 | 24,965 | 24,966 | 24,762 | 25,037 | 24,984 | 24,906 | 25,057 | 25,117 | 25,062 | 24,894 | 24,660 | 24,873 | 24,902 | 24,821 |

Table gives distribution of binary data occurrence frequencies in decrypted plaintext generated by decrypting encrypted Help.lzh file with decryption key "acc1123456n######qwuatq利&&&&&&&pekingtf".

FIG.21

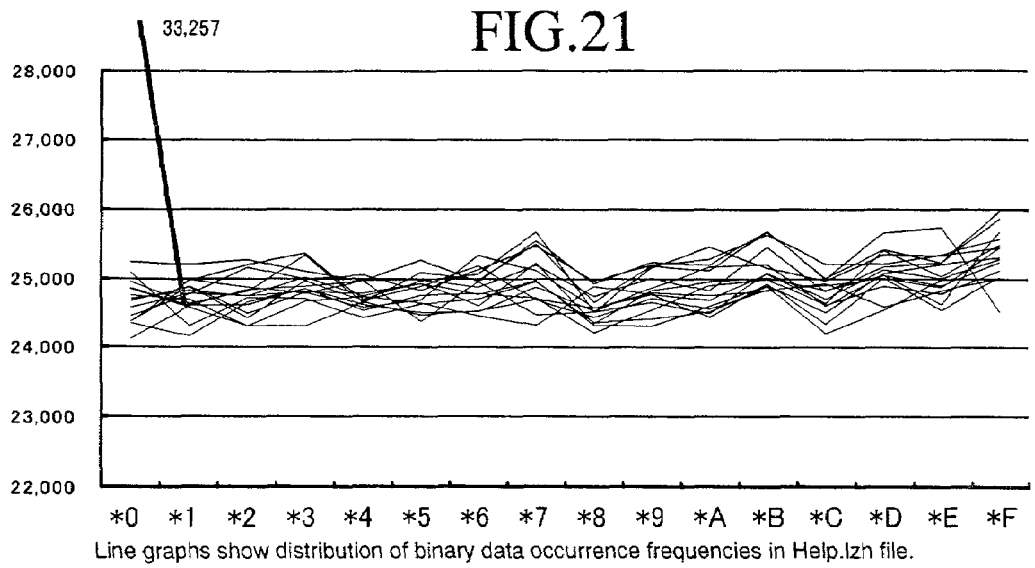

Line graphs show distribution of binary data occurrence frequencies in Help.lzh file.

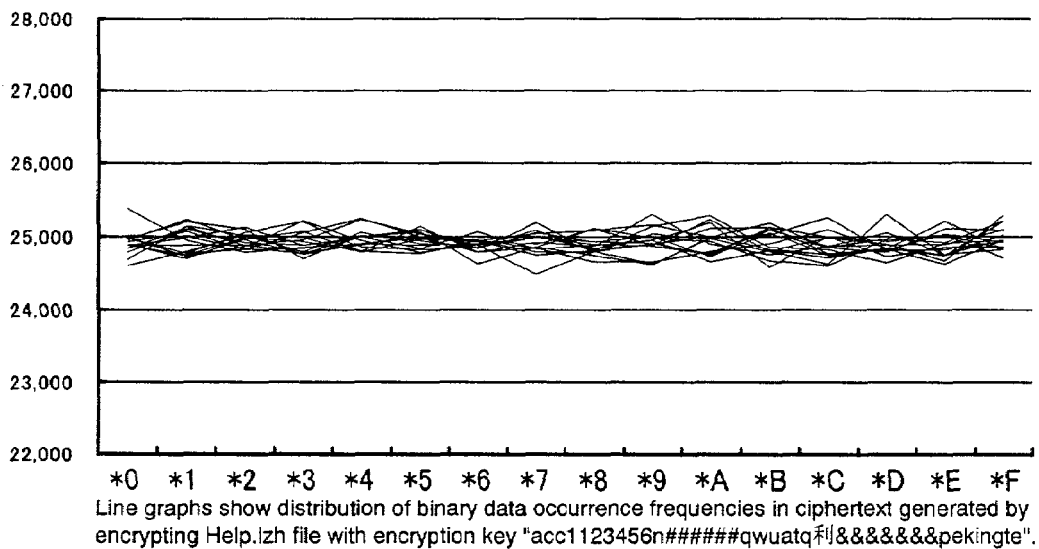

Line graphs show distribution of binary data occurrence frequencies in ciphertext generated by encrypting Help.lzh file with encryption key "acc1123456n######qwuatq利|&&&&&&&pekingte".

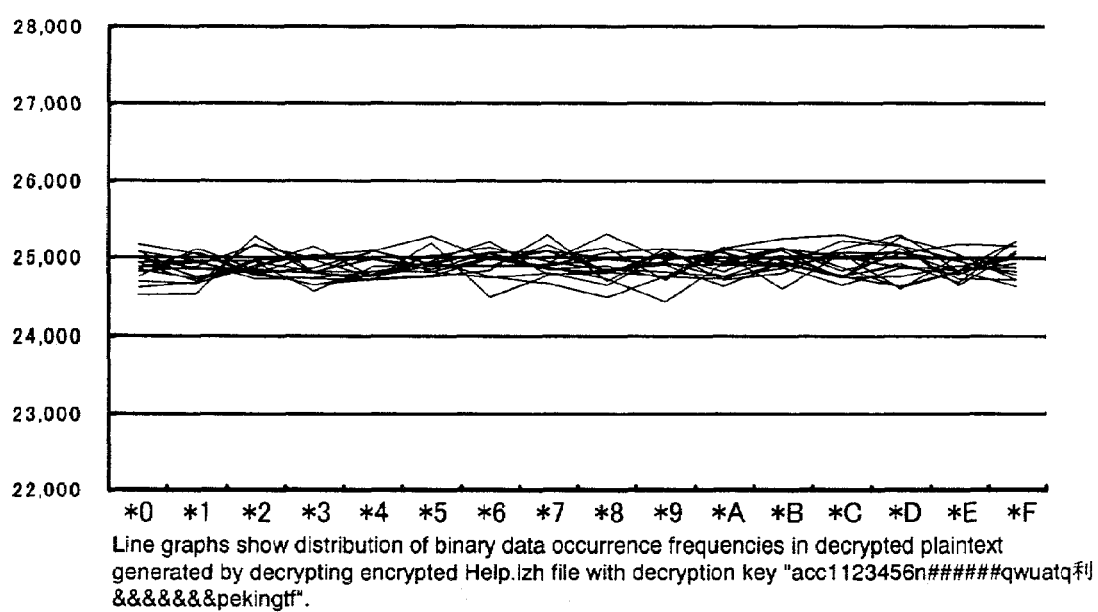

Line graphs show distribution of binary data occurrence frequencies in decrypted plaintext generated by decrypting encrypted Help.lzh file with decryption key "acc1123456n######qwuatq利|&&&&&&&pekingtf".

FIG. 2.5 Non-linear transformation ρ

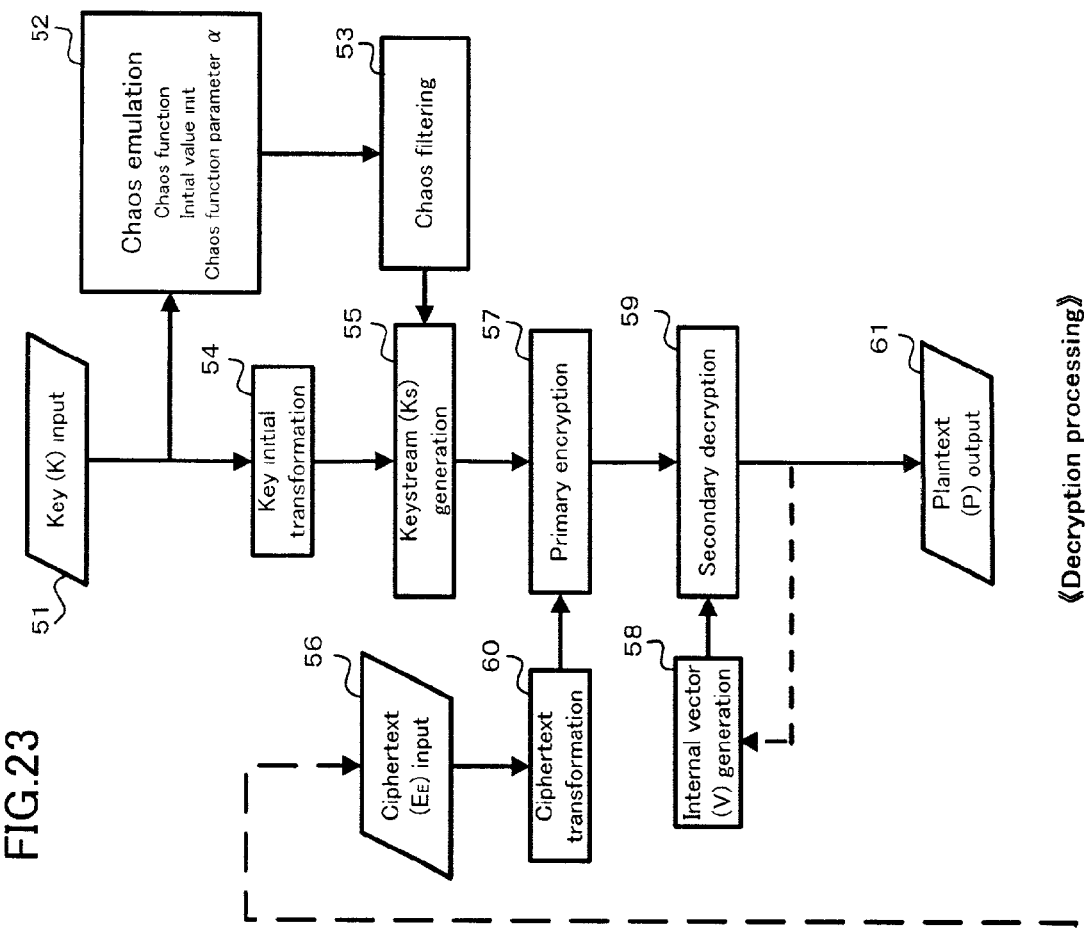
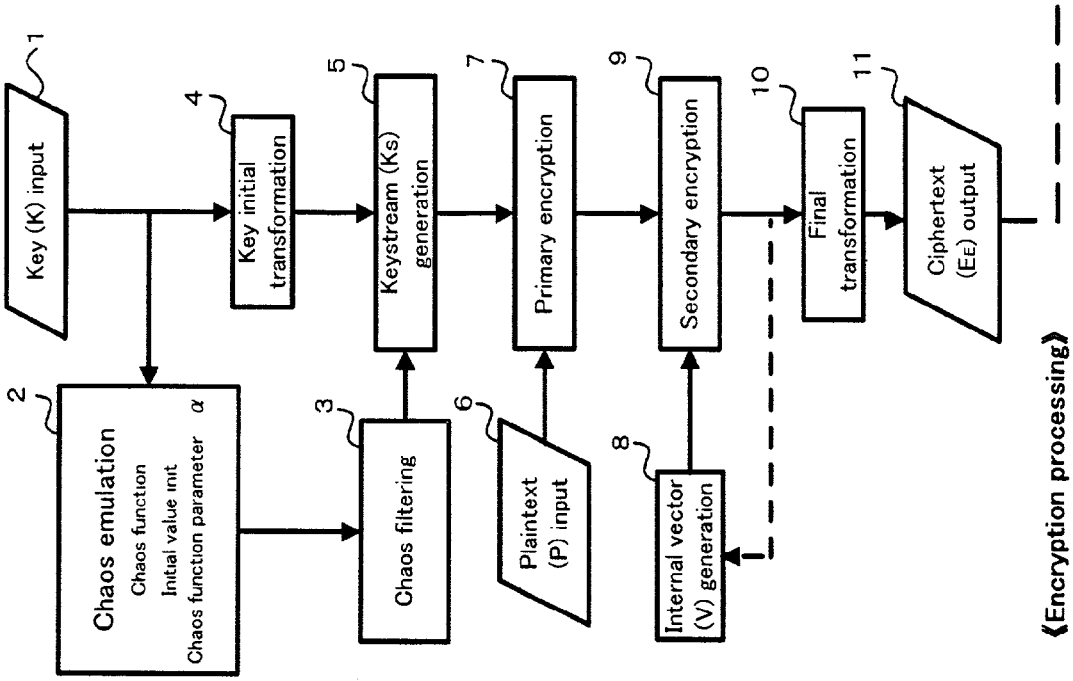
FIG.23

ENCRYPTION METHOD, PROGRAM FOR ENCRYPTION, MEMORY MEDIUM FOR STORING THE PROGRAM, AND ENCRYPTION APPARATUS, AS WELL AS DECRYPTION METHOD AND DECRYPTION APPARATUS

BACKGROUND OF THE INVENTION

1. Field of the Invention

The present invention relates to an encryption method for encrypting a message in communication through the internet or the like using an encryption algorithm, a decryption method, a program for the encryption algorithm for executing the method, and a memory medium for storing the program. Particularly, the present invention relates to a cryptosystem which enhances the encryption strength by grasping a group of data to be handled inside the encryption algorithm as a virtual data space; recognizing a ciphertext generated using the encryption algorithm as a directional component; utilizing the data in the virtual data space designated by the directional component inside the encryption algorithm for making the ciphertext intricate; and utilizing a chaos signal for the encryption algorithm.

2. Description of the Prior Art

The internet is being evolved to an open network system to which not only computers but also portable telephones and general home appliances can be connected. With the internet, electronic commerce and the like are making a rapid progress. The information which is handled in them is personal data, settlement data, and the like, requiring a high confidentiality. Then, to prevent leakage of data, and to protect the users of communication network against an information offense, such as a so-called disguise, various cryptosystems have been practiced. A cryptosystem consists of an encryption system and a decryption system, however, the decryption system can be realized as a system having the same configuration as that of the encryption system, therefore, the following description will be given mainly about the encryption system.

Cryptosystems can be mainly classified by the method of key generation: common key cryptosystem and public-key cryptosystem. The common key cryptosystem is also known as the symmetry cryptosystem, using the same key for both encryption and decryption. On the other hand, the public-key cryptosystem is also referred to as the non-symmetry cryptosystem, using different keys for encryption and decryption. With the common key cryptosystem, the key used for encryption is the same as that for decryption, therefore every time a ciphertext is sent and received, a special key is required, resulting in the control of the keys being complex. In addition, the encryption key can be used for decryption, the key must be sent to the other party secretly to the third party, and the way of sending the key must be carefully selected.

The public-key cryptosystem has eliminated these drawbacks of the common key cryptosystem. The public-key cryptosystem is a cryptosystem which uses a unique algorithm for performing encryption and decryption, and employs the encryption and decryption keys which are different from each other. With this cryptosystem, the disadvantages of the common key cryptosystem, such as complex key control, and difficulty of sending the key with the possibility of leakage being minimized have been overcome. The public-key cryptosystem can be said to be a cryptosystem which adds a special algorithm for generating a public key to the common key cryptosystem. It can be said that this public-key cryptosystem is excellent in convenience as a cryptosystem, and provides a high encryption strength, however, the encryption speed tends to be inevitably slow. For details, refer to [NK97] in the list of reference literature given at the end of this specification.

Cryptosystems can be mainly classified by the method of processing of the data to be encrypted: block cryptosystem and stream cryptosystem. As described in "Cryptograph and Information Security" edited and written by Shigeo Tsujii and Masao Sasahara (published by Shokodo, 1990), the block cryptosystem performs encryption and decryption every relatively long data block of several ten bits or more. If the plaintext block is expressed as M, the key block as K, and the ciphertext block as C, the encryption and decryption can be expressed as follows:

Encryption: $C = E_K(M)$

Decryption: $M = D_K(C)$

On the other hand, the stream cryptosystem is a cryptosystem which encrypts a plaintext by using pseudo-random numbers known as a keystream as the encryption key. With the stream cryptosystem, encryption and decryption are sequentially performed every small data block of 1 bit or a few bits (for example 1 byte). The Vernam cryptosystem is a typical stream cryptosystem. If the symbol series representing the plaintext is M, the symbol series representing the ciphertext block is C, the symbol series representing the random numbers is K, and the operator for the exclusive OR operation is XOR, the Vernam cryptosystem can be expressed as follows:

Encryption: $C = M \text{ XOR } K$

Decryption: $M = C \text{ XOR } K$

The random number symbol series K in the Vernam cryptosystem corresponds to the key in the block cryptosystem.

Because the block cryptosystem divides the plaintext into fixed lengths for processing, the rule for encryption processing by the encryption algorithm or the like can easily be found out. On the other hand, it is said that, with the stream cryptosystem, the rule for encryption processing is difficult to be found out. However, because the stream cryptosystem encrypts the plaintext with the use of the pseudo-random numbers inside the encryption algorithm, the degree of difficulty in decoding the pseudo-random numbers can have a direct effect on the encryption strength. If a stream cryptography is built by using a pseudo-random number sequence which is cryptologically high in safety, the stream cryptosystem can allow building an encryption system with a high safety strength.

However, any of the conventional pseudo-random number sequences lacks safety, and the insufficient safety of the pseudo-random number sequence is a weak point of the stream cryptosystem, the weak point having not been eliminated. Then, as the cryptosystem, the block cryptosystem has been adopted, and to prevent the rule for encryption processing from being found out, some other technology has been added to the block cryptosystem to develop many cryptosystems which are different from the block cryptosystem used as the basis. For details, refer to [NK97] in the list of reference literature given at the end of this specification.

With a cryptosystem, the balance between the speed of processing the data for encryption and decryption, and the encryption strength is critical. As a popular cryptosystem, DES (Data Encryption Standard) which was adopted by the National Institute of Standards and Technology of the United States in 1977 is available. Belonging to the block cryptosystem, DES is a cryptosystem which has been cryptoanalyzed in the basic technology. At present, it has been developed to 3DES, which repeats the same encryption processing three times for increasing the difficulty of decryption.

As another cryptosystem, the chaos cryptosystem is available. For detailed description of the chaos, refer to [AI90] and [AI00] in the list of reference literature given at the end of this specification. The chaos cryptosystem generates a chaos signal in accordance with a chaos function, and uses this chaos signal to make the ciphertext intricate for enhancing the encryption strength. The chaos cryptosystem utilizes the following characteristics of the chaos function.
① Sensitivity to initial value (sensitive dependence on initial condition).
② A property of one way.
③ It has a strange attractor.

The chaos cryptosystem which utilizes these characteristics is said to have a high processing speed, operate with a light program, and be high in encryption strength. As the chaos coating method (the method of accommodating the chaos function in the cryptosystem), the technique which is used with the encryption function in the block cryptosystem, and the technique which is used for generating a keystream in the stream cryptosystem are known.

With the above-mentioned 3DES, the same processing is repetitively performed with the encryption processing speed being sacrificed. In other words, the user of 3DES can only select lowering the encryption processing speed to maintain a desired encryption strength, at present. Any portable telephone, which is capable of performing electronic mail and internet communications, requires to be loaded with a cryptosystem. However, with the computer program for realizing the encryption algorithm for 3DES, the number of program steps is large, and a large memory capacity is required, therefore, 3DES is practically difficult to be loaded in the portable telephone. In addition, the block cryptosystem, such as 3DES, performs encryption processing every fixed length, thus, depending upon the set mode, the ciphertext has a periodicity, and when a file providing a specific pattern, such as image data, is encrypted, the ciphertext is easy to be decrypted, which makes the block cryptosystem, such as 3DES, unsuitable for multi-media.

Because the chaos cryptosystem utilizes the above-mentioned characteristics of the chaos function, it can be said that the chaos cryptosystem is provided with excellent basic characteristics as a cryptosystem. However, among the conventional chaos cryptosystems, the block cryptosystem uses the cut map or the tent map as it is, which has a segment linearity, therefore, if the block cryptosystem is a chaos cryptosystem, the ciphertext is cryptoanalyzed by the difference decoding technique.

Among the chaos cryptosystems, the stream cryptosystem, which uses a chaos signal for generating a keystream, is required to have an improved safety of the keystream as pseudo-random numbers. To meet this requirement, it has been conventionally performed that the key is first used as the initial value or parameter of the chaos function for generating a first chaos signal using the chaos function; then, using the first chaos signal as the initial value or parameter of that chaos function, a second chaos signal is generated; further, using the second chaos signal as the initial value or parameter of that chaos function, a third chaos signal is generated; thus, between the input and the output of the chaos signal generating means (corresponding to the chaos emulator in the present application), the feedback is repeated for increasing the complexity of the chaos signal; and the chaos signal obtained as a result of many times of circulation is used as the keystream. With this conventional keystream generating method, the processing time is increased with the number of times of circulating the chaos signal being increased, and if the circulation is performed many times, but the chaos function is known, the possibility of the ciphertext being decrypted is not completely eliminated.

The stream-chaos cryptosystem is known; with it, to improve the encryption strength of the chaos cryptosystem (stream-chaos cryptosystem) which generates a keystream on the basis of a chaos signal, a plurality of chaos functions are previously provided inside the encryption algorithm, and the chaos function is changed over from one to another on the way of encryption processing. With one method of this cryptosystem, a logic which changes over the chaos function to be used, every specific length of the plaintext (10,000 bytes, for example), is previously incorporated in the encryption logic. With another method, the information for switchover of the chaos function is inserted in the middle of the ciphertext. But, if the chaos function is switched over from one to another every specific length of the plaintext, the characteristics of the ciphertext are changed with the switchover, and this change of the characteristics of the ciphertext may give an opportunity of decryption. On the other hand, if an instruction for changeover of the chaos function is inserted in the middle of the ciphertext, the changeover instruction may give a chance of decryption. Thus, the chaos cryptosystem with which a plurality of chaos functions are provided for switchover of the chaos function has been devised in the intension of improving the encryption strength by making the chaos function difficult to be comprehend, however, whether the switchover is provided by previously incorporating the switchover locations in the encryption logic or inserting the instruction for changeover of the chaos function in the middle of the ciphertext, there is a great possibility of the information for switchover rather causing the encryption strength to be lowered.

With the stream-chaos cryptosystem, which uses the information of the key as the initial value of the chaos function for generating the value of the chaos function in the form of a floating point number as a chaos signal, and generates a keystream on the chaos signal, the chaos signal value varies only in a narrow range in the vicinity of 0 or in the vicinity of 1. If the chaos function value varies only in a narrow range in the vicinity of a particular value, the distribution range of the data in the keystream is extremely narrowed, which results in the data in the ciphertext being distributed in a narrow range, and thus the encryption strength being lowered.

With conventional cryptosystems, the length of the key is fixed. If a key having a length shorter than the predetermined length of the key is input, the data which is lacking is regarded as 0, and on the basis of the data of 0, the decryption of the key is facilitated, resulting in the strength of the key being substantially lowered. If a key having a length exceeding the predetermined length of the key is input, the excess data is not processed, and thus however long a key is used, the encryption strength will not be improved. In other words, with conventional cryptosystems, the encryption strength is fixed, and cannot be freely set by the user. With a cryptosystem providing a greater length of key, the encryption strength is high, but the processing speed is low. Thus, with conventional cryptosystems, the user cannot select the processing speed and the encryption strength as required, because the length of the key is fixed.

SUMMARY OF THE INVENTION

Then, one purpose of the present invention is to provide an encryption method and system, and a decryption method and system wherein the encryption algorithm requires a small size of real-storage area in the computer, which allows it to be easily loaded in a portable telephone, and provides a high encryption speed and a high cryptographic strength, and in addition, computer programs for realizing these encryption method and decryption method, and a memory medium for storing those computer programs. Another purpose of the present invention is to provide an encryption/decryption system with which, if a file providing a specific pattern, such as image data, is encrypted, the pattern in the plaintext will not easily be developed in the ciphertext, and thus the cryptographic strength is high. Another purpose of the present invention is to provide an encryption/decryption system with which the length of the key is optional, and thus the processing speed and the cryptographic strength can be selected as required by the user.

These purposes of the present invention can be achieved by:

[1] An encryption method which uses an encryption algorithm for executing data processing involving inputting a common key K and a plaintext P; generating an internal key, which is data related to the common key K, on the basis of the common key K; using plaintext processed data obtained by processing the plaintext P or the plaintext itself as plaintext information data for performing a first exclusive OR operation between the plaintext information and the internal key for generating a primary ciphertext $E_1$ for the plaintext P; and performing a second exclusive OR operation between the primary ciphertext $E_1$ and data for secondary encryption, V, for generating a secondary ciphertext $E_2$ of the plaintext P, wherein a group of data to be handled with the encryption algorithm, i.e., the common key K, the plaintext P and the initial values which are previously loaded in the algorithm, or the common key K, the plaintext P and the data generated by processing the initial values, is grasped as a virtual data space; the result of said second exclusive OR operation is recognized as a vector directional component designating data in the virtual data space; the data designated by the vector directional component is recognized as a vector quantitative component; a logical operation for the vector quantitative component is performed for generating vector data; and the vector data is handled as said data for secondary encryption, V.

[2] An encryption method involving inputting a common key K and a plaintext P; generating an internal key, which is data related to the common key K, on the basis of the common key K; using plaintext processed data obtained by processing the plaintext P or the plaintext itself as plaintext information data for performing a first exclusive OR operation between the plaintext information and the internal key for generating a primary ciphertext $E_1$ for the plaintext P; and performing a second exclusive OR operation between the primary ciphertext $E_1$ and data for secondary encryption, V, for generating a secondary ciphertext $E_2$ of the plaintext P, wherein said data for secondary encryption, V, consists of $\psi$ data ($\psi$ is 1 or an integer greater than 1), $V_{(1)}, V_{(2)}, V_{(3)}, \ldots, V_{(\psi)}$, each having a length of $\rho$ ($\rho$ is 1 or an integer greater than 1), the initial values of $V_{(1)}, V_{(2)}, V_{(3)}, \ldots, V_{(\psi)}$ are $\Psi_{(1)}, \Psi_{(2)}, \Psi_{(3)}, \ldots, \Psi_{(\psi)}$, if data located every specific length of $\rho$, counting from the head of the primary ciphertext $E_1$, is $E_{1(1)}, E_{1(2)}, E_{1(3)}, \ldots, E_{1(m)}, \ldots$ (m is 2 or an integer greater than 2), respectively, and data located every specific length of $\rho$, counting from the head of the secondary ciphertext $E_2$, is $E_{2(1)}, E_{2(2)}, E_{2(3)}, \ldots, E_{2(m)}, \ldots$, respectively, said second exclusive OR operation is performed for the first $\psi$ data, $E_{1(1)}, E_{1(2)}, E_{1(3)}, \ldots, E_{1(\psi)}$ in the primary ciphertext $E_1$, using said initial values $\Psi_{(1)}, \Psi_{(2)}, \Psi_{(3)}, \ldots, \Psi_{(\psi)}$ as said data for secondary encryption, V, a group of data, i.e., said internal key, and the plaintext information data and other data related to the key K or the plaintext P, as well as settings previously given or data obtained by transforming the settings, is grasped as a virtual data space; when $1 \leq n \leq \psi$ (n is an integer), the first exclusive OR operation is performed on the data in said virtual data space designated using $E_{2(n)}$ as the address, and the generated operation value is used as data for secondary encryption, $V_{(n)}$ for replacing the initial value $\Psi_{(n)}$ with the $V_{(n)}$; and when $n \leq \psi+1$, the first exclusive OR operation is performed on the data in said virtual data space designated using $E_{2(n)}$ as the address, and the generated operation value is used as new data for secondary encryption, $V_{(n)}$ for replacing the former data for secondary encryption, $V_{(n)}$ with the new $V_{(n)}$.

[3] An encryption method as claimed in claim 2, wherein, if said data length $\rho$ is 1 byte and the number of bytes for said internal key is $\eta$, a table for the data for secondary encryption of $\psi$ bytes ($\psi \leq \eta$) for storing said data for secondary encryption, V ($V = V_{(1)}, V_{(2)}, V_{(3)}, \ldots, V_{(n)}, \ldots, V_{(\psi)}$ is provided; in the table for the data for secondary encryption, $\Psi_{(1)}, \Psi_{(2)}, \Psi_{(3)}, \ldots, \Psi_{(\psi)}$ are previously stored as initial values in $V_{(1)}, V_{(2)}, V_{(3)}, \ldots, V_{(n)}, \ldots, V_{(\psi)}$, respectively; the data for said internal key designated using $E_{2(1)}, E_{2(2)}, E_{2(3)}, \ldots, E_{2(m)}, \ldots$ as the address is $S_{E2(m)}$; and if exclusive OR operation is expressed as XOR, the value expressed by the right side of the logical operation expression:

$$S_{E2(m)} XOR\ V_{(n)} XOR\ V_{(n+1)} = V_{(n)} \quad (1)$$

is replaced with $V_{(n)}$, sequentially. (Here, $n = m\ \mathrm{mod}\ \psi$.)

[4] An encryption method involving inputting a common key K and a plaintext P; generating an internal key, which is data related to the common key K, on the basis of the common key K; using plaintext processed data obtained by processing the plaintext P or the plaintext itself as plaintext information data for performing a first exclusive OR operation between the plaintext information and the internal key for generating a primary ciphertext $E_1$ for the plaintext P; and performing a second exclusive OR operation between the primary ciphertext $E_1$ and data for secondary encryption, V, for generating a secondary ciphertext $E_2$ of the plaintext P, wherein said second exclusive OR operation is performed between the primary ciphertext $E_1$ and data for secondary encryption, V, every specific length of $\rho$, the data for secondary encryption, $V_{(1)}$, of the specific length of $\rho$ between which and the data $E_{1(1)}$ of the specific length of $\rho$ at the head of the primary ciphertext $E_1$ said second exclusive OR operation is performed is the initial value $\Psi_{(1)}$, a group of data, i.e., said internal key, and the plaintext information data and other data related to the key K or the plaintext P, as well as settings previously given or data obtained by transforming the settings, is grasped as a virtual data space; if the secondary ciphertext $E_2$ of a length of $\rho$ generated by said second exclusive OR operation performed between the data $E_{1(1)}$ and the initial value $\Psi_{(1)}$, is $E_{2(1)}$, the data for secondary encryption, $V_{(2)}$, of a length of $\rho$ between which and the data $E_{1(2)}$ of a length of $\rho$ following the data $E_{1(1)}$ in the primary ciphertext $E_1$ said second exclusive OR operation is performed is generated by performing the first exclusive OR operation on the data designated in said virtual data space using $E_{2(1)}$ as the address; and subsequently the data for secondary encryption, $V_{(3)}, V_{(4)}, V_{(5)}, \ldots$ following $V_{(2)}$ of a length of $\rho$ is generated by performing the first exclusive OR operation on the data designated in said virtual data space using the secondary ciphertexts $E_{2(2)}, E_{2(3)}, E_{2(4)}, \ldots, E_{2(m)}, \ldots$ (m is 1 or an integer greater than 1) following $E_{2(1)}$ of a length of $\rho$ as the address, respectively.

[5] An encryption method as claimed in claim 4, wherein, if said data length $\rho$ is 1 byte and the number of bytes for said internal key is $\eta$, a table for the data for secondary encryption of $\psi$ bytes ($\psi \leq \eta$) for storing said data for secondary encryption, V ($V = V_{(1)}, V_{(2)}, V_{(3)}, \ldots, V_{(n)}, \ldots, V_{(\psi)}$) is provided; in the table for the data for secondary encryption, $\Psi_{(1)}, \Psi_{(2)}, \Psi_{(3)}, \ldots, \Psi_{(\psi)}$ are previously stored as initial values in $V_{(1)}, V_{(2)}, V_{(3)}, \ldots, V_{(n)}, \ldots, V_{(\psi)}$, respectively; the data for said internal key designated using $E_{2(1)}, E_{2(2)}, E_{2(3)}, \ldots, E_{2(m)}, \ldots$ as the address is $S_{E2(m)}$; and when exclusive OR operation is expressed as XOR, the value expressed by the right side of the logical operation expression:

$$S_{E2(m)} XOR\ V_{(n)} XOR\ V_{(n+1)} = V_{(n+1)} \quad (1a)$$

is replaced with $V_{(n+1)}$, sequentially. (Here, n=m mod $\psi$.)

[6] An encryption method as claimed in any one of claims 2 to 5, wherein, by performing a first key transformation processing on the common key K, first common key transformation data including information of the key K is generated; a digital chaos signal C is generated in accordance with a chaos function using the first common key transformation data as the initial value init; and digital chaos signal C information containing data including the information of the digital chaos signal C is used as said internal key or data obtained by processing the digital chaos signal C information containing data is used as said internal key.

[7] An encryption method as claimed in claim 6, wherein said first key transformation processing is a processing involving extracting at least a part of the data in the common key K; generating an add value by performing an operation of adding the partial key to the preset base value; and using the add value as said first common key transformation data.

[8] An encryption method as claimed in claim 6, wherein, if the number of bytes for the common key K is $\lambda$ ($\lambda$ is 1 or an integer greater than 1), $\Lambda$ partial keys ($1 \leq \Lambda \leq \lambda$) of $\nu$ bytes ($1 \leq \nu \leq \lambda$) are extracted from the common key K; by adding the preset base value to the partial key, $\Lambda$ addition values are generated; using the addition values as the initial values $init_{(1)}, init_{(2)}, init_{(3)}, \ldots, init_{(n)}, \ldots, init_{(\Lambda)}$, respectively, (n is an integer, meeting $1 \leq n \leq \Lambda$), digital chaos signals $C_{(1)}, C_{(2)}, C_{(3)}, \ldots, C_{(n)}, \ldots, C_{(\Lambda)}$ are generated for the initial values $init_{(1)}, init_{(2)}, init_{(3)}, \ldots, init_{(n)}, \ldots, init_{(\Lambda)}$, respectively; and by processing the digital chaos signals $C_{(1)}, C_{(2)}, \ldots, C_{(3)}, \ldots, C_{(n)}, \ldots, C_{(\Lambda)}$, said digital chaos signal C information containing data is generated.

[9] An encryption method as claimed in claim 8, wherein the processing of said digital chaos signals $C_{(1)}, C_{(2)}, C_{(3)}, \ldots, C_{(n)}, \ldots, C_{(\Lambda)}$ is an operation of $C_{(1)}, C_{(2)}, C_{F(1)}, C_{(2)} + C_{F(1)} = C_{F(2)}, C_{(3)} + C_{F(2)} = C_{F(3)}, \ldots, C_{(n)} + C_{F(n-1)} = C_{F(n)}, \ldots, C_{(\Lambda)} + C_{F(\Lambda-1)} = C_{F(\Lambda)}$ and $C_{F(\Lambda)}$ is said digital chaos signal C information containing data.

[10] An encryption method as claimed in any one of claims 2 to 9, wherein, by performing a second key transformation processing on the common key K, a second common key transformation data including the information of the common key K is generated; and by stirring said digital chaos signal C containing information and said second common key transformation data, said internal key is generated.

[11] An encryption method as claimed in any one of claims 2 to 10, wherein the data designated in said virtual data space using $E_{2(1)}, E_{2(2)}, E_{2(3)}, \ldots, E_{2(m)}, \ldots$ as the address is said internal key.

[12] A computer program wherein an encryption algorithm for executing the encryption method as claimed in claims 1 to 11 is stated in a computer language.

[13] A memory medium wherein the computer program as claimed in claim 12 is stored.

[14] An encryption apparatus which uses an encryption algorithm for executing data processing involving inputting a common key K and a plaintext P; generating an internal key, which is data related to the common key K, on the basis of the common key K; using plaintext processed data obtained by processing the plaintext P or the plaintext itself as plaintext information data for performing a first exclusive OR operation between the plaintext information and the internal key for generating a primary ciphertext $E_1$ for the plaintext P; and performing a second exclusive OR operation between the primary ciphertext $E_1$, and data for secondary encryption, V, for generating a secondary ciphertext $E_2$ of the plaintext P, wherein secondary encryption data V generating means for generating secondary encryption data V is provided, said secondary encryption data V generating means grasp as a virtual data space a group of data to be handled with the encryption algorithm, i.e., the common key K, the plaintext P and the initial values which are previously loaded in the algorithm, or the common key K, the plaintext P and the data generated by processing the initial values; recognizes the result of said second exclusive OR operation as a vector directional component designating data in the virtual data space; recognizes the data designated by the vector directional component as a vector quantitative component; performs a logical operation for the vector quantitative component for generating vector data; and handles the vector data as said data for secondary encryption, V.

[15] A decryption method which decrypts a ciphertext generated by the encryption method as claimed in claims 1 to 11, wherein the configuration is the same as that for the encryption method as claimed in claims 1 to 11, said ciphertext is input instead of said plaintext, and said ciphertext input is decrypted using the same common key as said common key used by the encryption method as claimed in claims 1 to 11.

[16] A decryption apparatus which decrypts a ciphertext generated using the encryption apparatus as claimed in claim 14, wherein the configuration is the same as that of the encryption apparatus as claimed in claim 14, said ciphertext is input instead of said plaintext, and said ciphertext input is decrypted using the same common key as said common key used with the encryption apparatus as claimed in claim 14.

BRIEF DESCRIPTION OF THE DRAWINGS

FIG. 11 is a conceptual diagram showing the stirring processing between the chaos signal Cd and the subkey set L that is performed in the keystream (Ks) generation section 105 in the encryption system as shown in FIG. 3.

FIG. 12(A), FIG. 12(B), and FIG. 12(C)—as examples of plaintext P which is encrypted according to the embodiment as illustrated in FIG. 2 and FIG. 3, FIG. 12(A) shows a solid black figure, FIG. 12(B) a solid white figure, and FIG. 12(C) a figure which is black in the upper half area, and white in the lower half one.

FIG. 13 provides a table which gives frequencies of occurrence of 0 and 1 in the plaintext, the ciphertext, and the decrypted plaintext, when the solid black figure, FIG. 12(A), the solid white figure, FIG. 12(B), and the black and white figure, FIG. 12(C), as well as the data obtained as an LZH file by compressing the entire Help folder (13.4 MB) in the Japanese edition of Microsoft Visio 2000 SRI (The Visual Language of Business) using compression software are each input to the encryption system as shown in FIG. 3 as a plaintext P for encrypting the plaintext P, and then decrypting the ciphertext.

FIG. 14 provides tables which give the distribution of frequencies of occurrence of each binary data when the densities of the picture elements (pixels) in the plaintext, the ciphertext, and the decrypted plaintext for the solid black figure, FIG. 12 (A), are expressed as binary data of 2-digit hexadecimal numbers (i.e., binary data of 256 tones), the ordinate representing the second digit of the two-digit hexadecimal numbers, and the abscissa the first digit of the two-digit hexadecimal numbers.

FIG. 15 provides line graphs which show the distribution of frequencies of occurrence of each binary data when the densities of the picture elements (pixels) in the plaintext, the ciphertext, and the decrypted plaintext for the solid black figure, FIG. 12 (A), are expressed as binary data of 2-digit hexadecimal numbers (i.e., binary data of 256 tones), the ordinate representing the frequency of occurrence, and the abscissa the first digit of the two-digit hexadecimal numbers. A particular broken line corresponds to 0*, 1*, 2*, . . . , E*, or F* in the leftmost column (ordinate column) in the table as given in FIG. 14.

FIG. 16 provides tables for the solid white figure as shown in FIG. 12(B), which are similar to those in FIG. 14.

FIG. 17 provides line graphs for the solid white figure as shown in FIG. 12(B), which are similar to those in FIG. 15. A particular broken line corresponds to 0*, 1*, 2*, . . . , E *, or F* in the leftmost column (ordinate column) in the table as given in FIG. 16.

FIG. 18 provides tables for the black and white figure as shown in FIG. 12(C), which are similar to those in FIG. 14.

FIG. 19 provides line graphs for the black and white figure as shown in FIG. 12(C), which are similar to those in FIG. 15. A particular broken line corresponds to 0*, 1*, 2*, . . . , E *, or F* in the leftmost column (ordinate column) in the table as given in FIG. 18.

FIG. 20 provides tables which give the distribution of frequencies of occurrence of each binary data when the data in the plaintext, the ciphertext, and the decrypted plaintext for the Help.Izh (Visio) file as given in FIG. 13 is expressed as binary data of 2-digit hexadecimal numbers, the ordinate representing the second digit of the two-digit hexadecimal numbers, and the abscissa the first digit of the two-digit hexadecimal numbers.

FIG. 21 provides line graphs which show the distribution of frequencies of occurrence of each binary data when the data in the plaintext, the ciphertext, and the decrypted plaintext for the Help.Izh (Visio) file as given in FIG. 13 is expressed as binary data of 2-digit hexadecimal numbers, the ordinate representing the frequency of occurrence, and the abscissa the first digit of the two-digit hexadecimal numbers. A particular broken line corresponds to 0*, 1*, 2*, . . . , E*, or F* in the leftmost column (ordinate column) in the table in FIG. 20.

FIG. 23 is a flowchart showing the procedure for the processing involved in an encryption method, which is a variation of the encryption method as illustrated in FIG. 2, and the procedure for the processing involved in a decryption method of decrypting the ciphertext obtained using this encryption method to the plaintext.

DESCRIPTION OF THE PREFERRED EMBODIMENT

Hereinbelow, an embodiment of the present invention will be more specifically explained with reference to the drawings.

Figure 2:
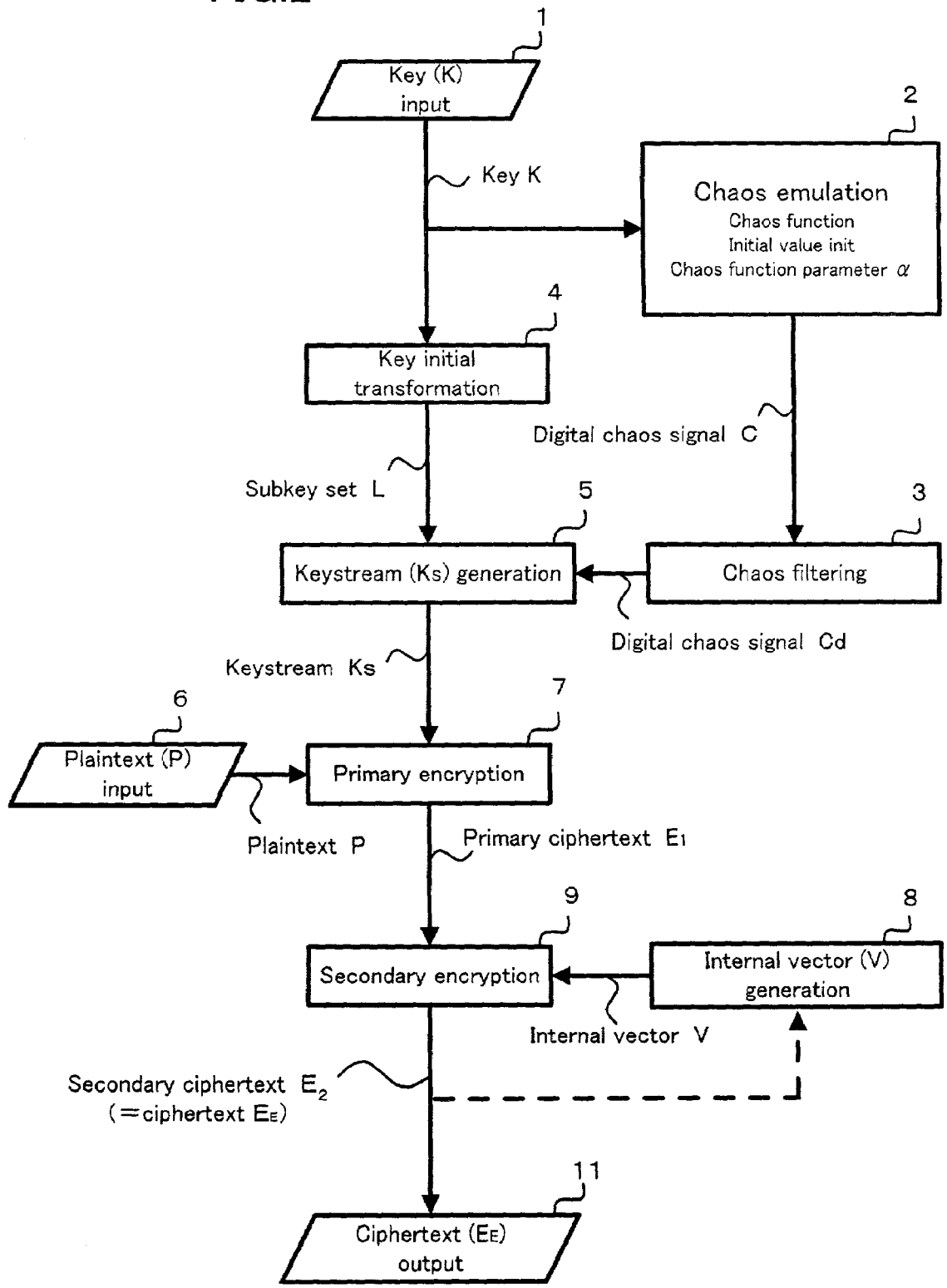
FIG. 2 is a flowchart showing the procedure for the encryption processing involved in the encryption algorithm for executing the encryption method according to one embodiment of the present invention.
Figure 3:
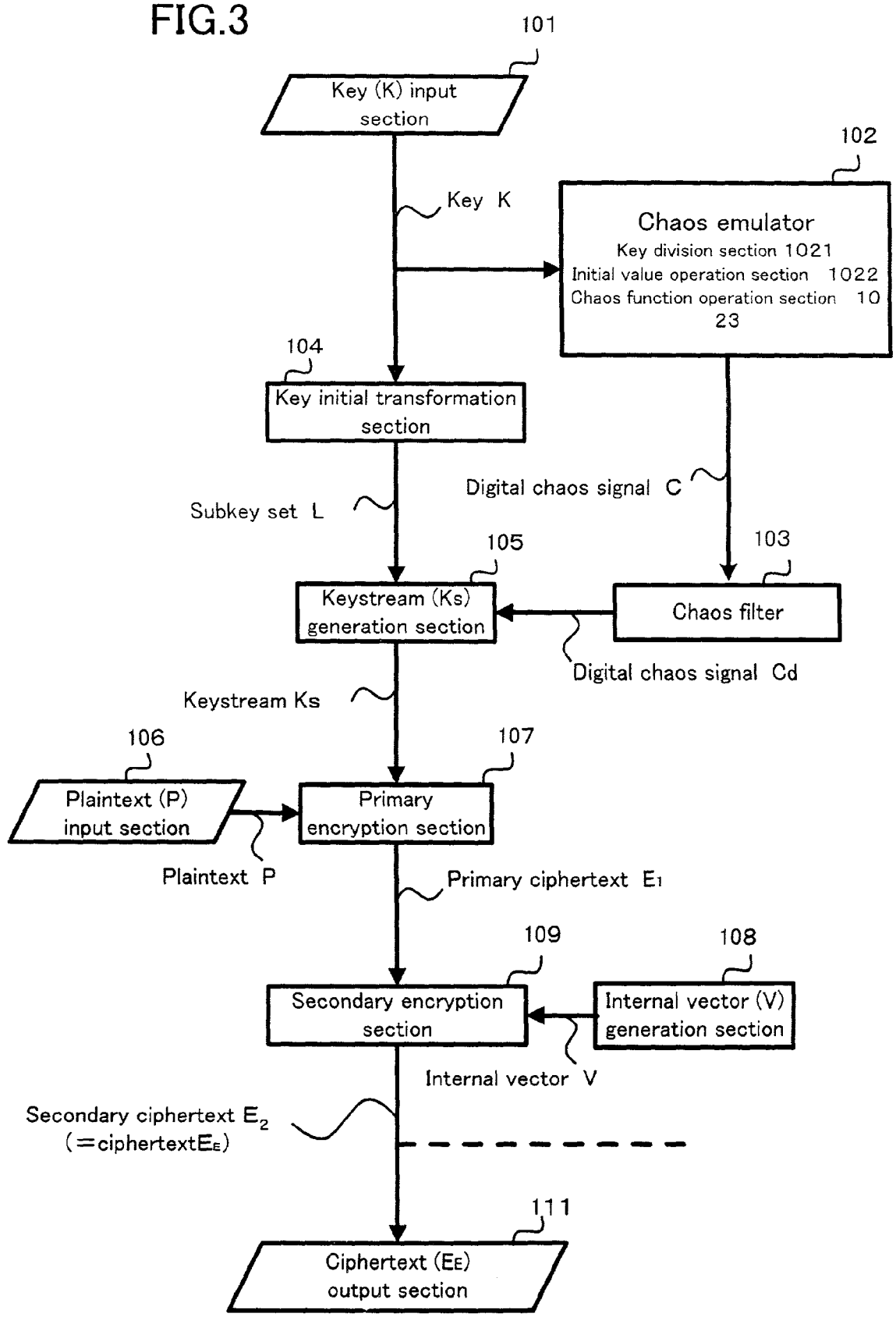
FIG. 3 is a flowchart showing the configuration of an encryption system (an encryption system according to one embodiment of the present invention) which implements the encryption algorithm as illustrated in FIG. 2.

FIG. 2 is a flowchart showing the procedure for the processing involved in the encryption method according to one embodiment of the present invention. This encryption method is of a stream cryptosystem of common key type, or of a chaos cryptosystem, because a chaos signal is generated in accordance with a chaos function, and this chaos signal is used for generation of a keystream. This encryption method is described as an encryption algorithm in a computer programming language, such as the Java language. The program of this encryption algorithm is loaded in a computer, such as a personal computer, an MPU (microprocessor unit) in a portable telephone, and a PDA (personal digital assistant). FIG. 3 is an encryption system which implements the encryption method as illustrated in FIG. 2. This encryption system comprises a computer program which describes the encryption algorithm and a computer (hardware and software, such as an operating system) which carries this computer program.

In FIG. 2, reference numerals 1 to 9 and 11 indicate the steps of processing which are components of the encryption method. These steps of processing are executed by the corresponding means as shown in FIG. 3. In FIG. 2, Step 1 performs inputting a key (K); Step 2 chaos emulation which generates a digital chaos signal C; Step 3 chaos filtering; Step 4 key initial transformation; Step 5 generating a keystream (Ks); Step 6 inputting a plaintext (P); Step 7 primary encryption; Step 8 generating an internal vector (V); Step 9 secondary encryption; and Step 11 outputting a ciphertext ($E_E$). The encryption system as shown in FIG. 3 comprises a key (K) input section 101; a chaos emulator 102 which generates a digital chaos signal C; a chaos filter 103; a key initial transformation section 104; a keystream (Ks) generation section 105; a plaintext (P) input section 106; a primary encryption section 107; an internal vector (V) generation section 108; a secondary encryption section 109; and a ciphertext ($E_E$) output section 111.

In Step 1, a common key K of λ bytes (λ denotes 1 or any positive integer greater than 1) is input. Methods for inputting a common key K include the method which manually inputs it byte by byte from the keyboard in sequence, and the method which previously stores the key K on the memory means, such as a hard disk, and reads out it from that memory means before executing this encryption method. In the chaos emulation in Step 2, λ sets of non-linear digital chaos signals (in this specification, non-linear digital chaos signal is abbreviated to digital chaos signal) of μ bytes (μ denotes 2 or any positive integer greater than 2) are generated on the basis of the key K. The digital chaos signal C represents the entire λ sets of non-linear digital chaos signals (of μ bytes). In chaos filtering in Step 3, the λ sets of digital chaos signals are processed for generating only one digital chaos signal of μ bytes, which is output as a digital chaos signal Cd.

In the key initial transformation in Step 4, the key K input in Step 1 is processed for generating a subkey set L of ξ (ξ denotes 2 or any positive integer greater than 2). In the key stream generation in Step 5, a keystream Ks (which is equivalent to the above-mentioned internal key) of η bytes (η=μ+ξ) is generated on the basis of the digital chaos signal Cd and the subkey set L. The keystream Ks is stored in the keystream table [Ks] in the keystream generation section 105. If the number of bytes for the plaintext P exceeds η, the keystream Ks of η bytes is repeatedly output from the keystream table [Ks] for generating the keystream with the number of bytes that is required for encryption of the plaintext P.

The key can have a great effect on the result of encryption (the ciphertext). Therefore, it is said that, if a key for which no transformation is provided is used for encrypting a plaintext, the ciphertext will undesirably have a low cryptographic strength. For example, with the above-mentioned DES, the parity bit in the key is removed before performing a bit shift and a bit extension for transformation of the key. In the present embodiment, the key K is transformed into the keystream Ks by performing the processes in Steps 2 to 5.

In the plaintext input in Step 6, data (plaintext P) which is to be encrypted is input. The plaintext P to be encrypted is text data, figure data, image data, sound data, or the like. In the primary encryption in Step 7, an exclusive OR operation between the plaintext P and the keystream Ks is performed for generating a primary ciphertext $E_1$.

The internal vector generation section 108 has a vector data table [V], in which vector data initial values are previously stored. The vector data table [V] corresponds to the above-mentioned data table for secondary encryption, having ψ fields, each of which stores vector data of ρ bytes. In the internal vector generation in Step 8, the first vector data initial value $\Psi_{(1)}$ of ρ bytes in the vector data table [V] is read out. In the secondary encryption in Step 9, an exclusive OR operation is performed for the first data $E_{1(1)}$ of ρ bytes in the primary ciphertext $E_1$ with the use of the vector data initial value $\Psi_{(1)}$ of ρ bytes for generating a secondary ciphertext $E_{2(1)}$ of ρ bytes.

In the internal vector generation in Step 8, as shown with a dotted line in FIG. 2, the secondary ciphertext $E_{2(1)}$ of ρ bytes is received, and this secondary ciphertext $E_{2(1)}$ of ρ bytes is recognized as the directional component IR of the vector. Here, the designation IR of the directional component is derived from irregular reference of data in the virtual data space by means of this directional component, as described later. The directional component IR points to the data Ks (IR) of the address IR in the keystream table [Ks]. In the internal vector generation in Step 8, the data Ks (IR) is read out from the keystream table [Ks]; the data Ks (IR) is recognized as the quantitative component of the vector; a logical operation (corresponding to the above-mentioned first logical operation) is performed on the data Ks (IR) of the quantitative component; vector data $V_{(1)}$ of ρ bytes is generated; and the first vector data initial value $\Psi_{(1)}$ of ρ bytes in the vector data table [V] is replaced with the vector data $V_{(1)}$.

In the secondary encryption (Step 9), an exclusive OR operation between the second vector data initial value $\Psi_{(2)}$ of ρ bytes in the physical sequence and the next primary ciphertext $E_{1(2)}$ of ρ bytes is performed for generating a next secondary ciphertext $E_{2(2)}$ of ρ bytes. Hereafter in the same way, the secondary encryption is repeated every ρ bytes in the primary ciphertext $E_1$ for generating a secondary ciphertext $E_2$ of the same number of bytes as that in the primary ciphertext $E_1$. Assuming that ψ sets of data of ρ bytes are provided as the vector data initial values, the ψ sets of ρ-byte data (data of ρ*ψ bytes) from the beginning in the primary ciphertext $E_1$ are secondary-encrypted by an exclusive OR operation with the vector data initial value Ψ. Then, the next ψ sets of ρ-byte data and the subsequent in the primary ciphertext $E_1$ are secondary-encrypted by an exclusive OR operation with the internal vector data $V_{(1)}$, $V_{(2)}$, $V_{(3)}$, ..., $V_{(n)}$, ..., $V_{(\psi)}$, which are generated by a logical operation on the data Ks (IR) designated by the vector directional component IR. These internal vector data $V_{(1)}$, $V_{(2)}$, $V_{(3)}$, ..., $V_{(n)}$, ..., $V_{(\psi)}$ are sequentially updated for each secondary ciphertext $E_2$ of ρ bytes.

As stated above, in the internal vector generation in Step 8, the directional component IR of the vector designates the data in the keystream table [Ks]. However, with the present invention, the data which is designated by the directional component IR of the vector is not limited to the data in the keystream table [Ks]. By grasping a group of data to be handled with the encryption algorithm, i.e., the common key K, the plaintext P and the initial values which are previously loaded in the algorithm, or the common key K, the plaintext P and the data generated by processing the initial values, as a virtual data space, the range of data which is designated by the directional component IR of the vector may be expanded to the virtual data space. However, by assuming that the directional component IR of the vector designates the data in the keystream table [Ks], the following explanation of the present embodiment is simplified.

In the present embodiment, the secondary ciphertext $E_2$ of ρ bytes which is generated for the first time when the secondary encryption (Step 9) is completed by taking Steps 8 and 9 is recognized as the directional component IR of the vector; the data Ks (IR) in the keystream table [Ks] is designated by the directional component IR of the vector; and the operation value obtained by performing an operation on the data Ks (IR) is used as the next vector data of ρ bytes, which is one of the characteristics of the present embodiment.

In the present embodiment, the cryptographic strength is based on the encryption using a digital chaos signal C from the chaos emulator 102, the keystream Ks generated based on this digital chaos signal C, and the internal vector data V from the internal vector generation section 108. With the conventional DES, the cryptographic strength is assured by repeating the same process many times, thus the encryption speed is low, and the program occupies a large portion of the storage capacity of the computer. On the other hand, the chaos emulator 102 and the internal vector generation section 108, which are the critical components for encryption in the present embodiment, are each capable of high speed processing, therefore, the encryption algorithm in the present embodiment requires a small size of real-storage area in the computer, which allows it to be loaded in a portable telephone, and provides a high encryption speed and a high cryptographic strength.

Figure 1:
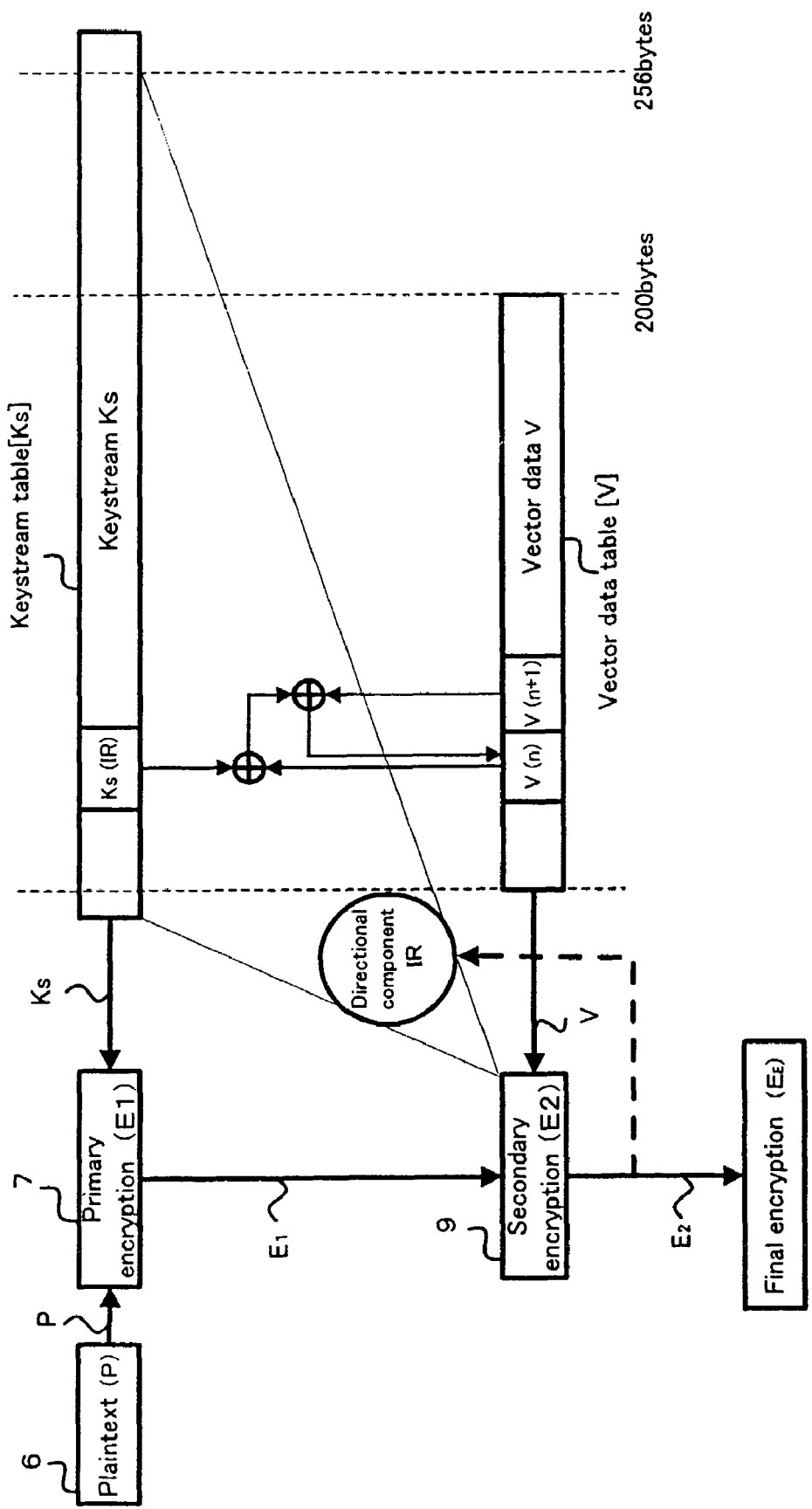
FIG. 1 is a conceptual diagram showing the way of generating vector data involved in the encryption method according to one embodiment of the present invention.
Figure 4:
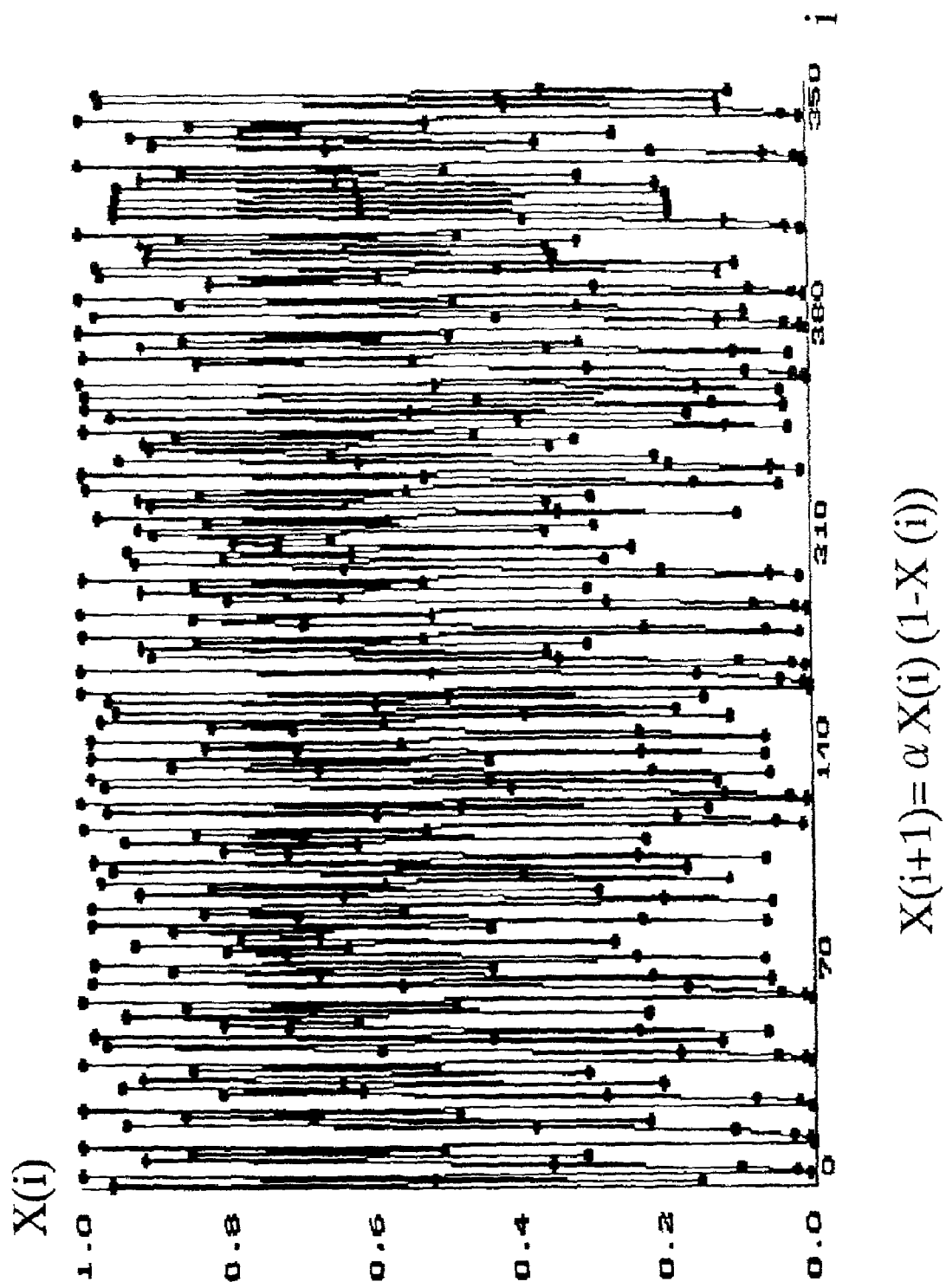
FIG. 4 is a diagram exemplifying the irregularity of the logistic map by choosing i as the abscissa and X(i) as the ordinate.
Figure 5:
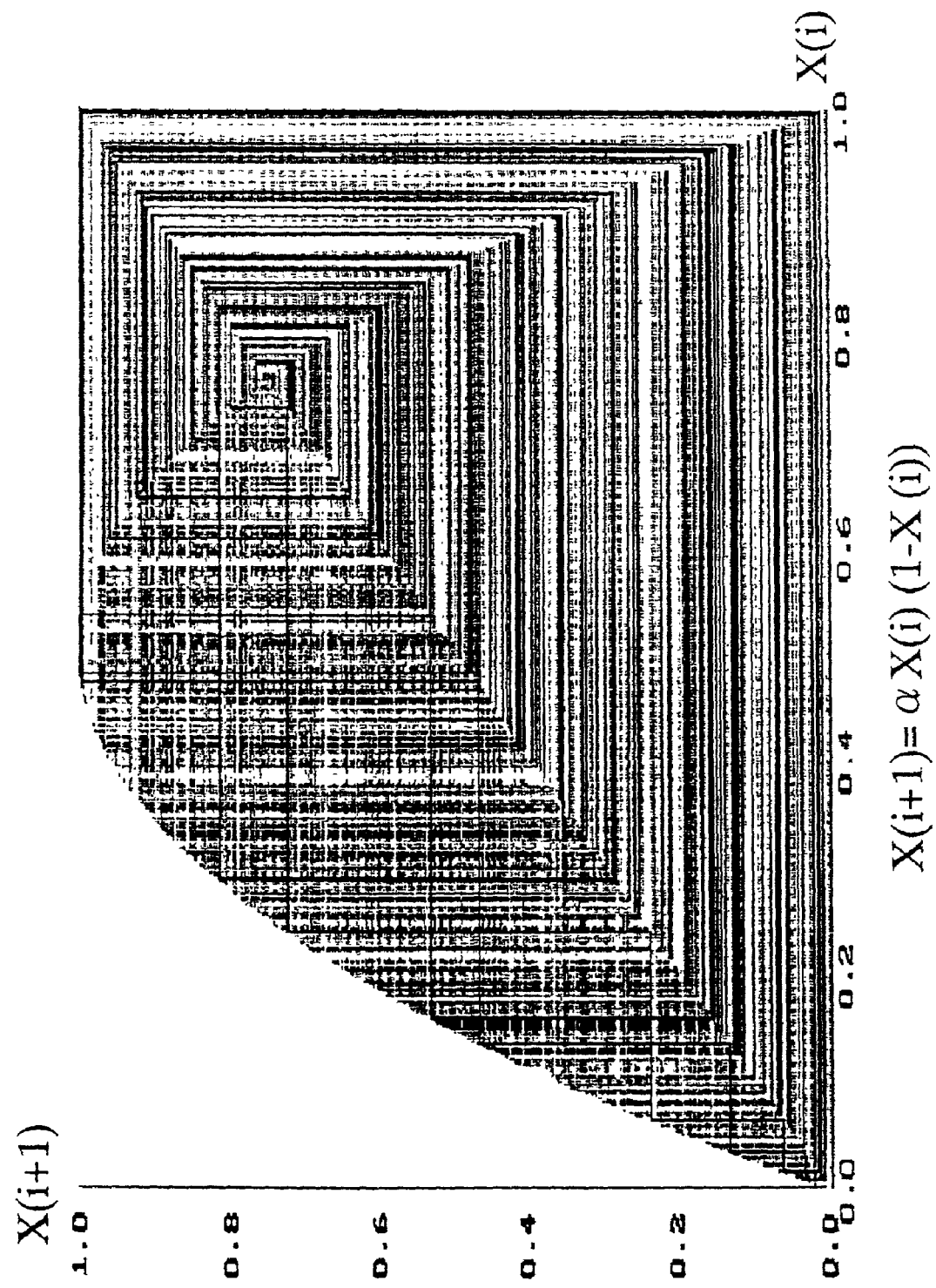
FIG. 5 is a characteristic diagram of the logistic map that is expressed by choosing X(i) as the abscissa and X(i+1) as the ordinate.
Figure 6:
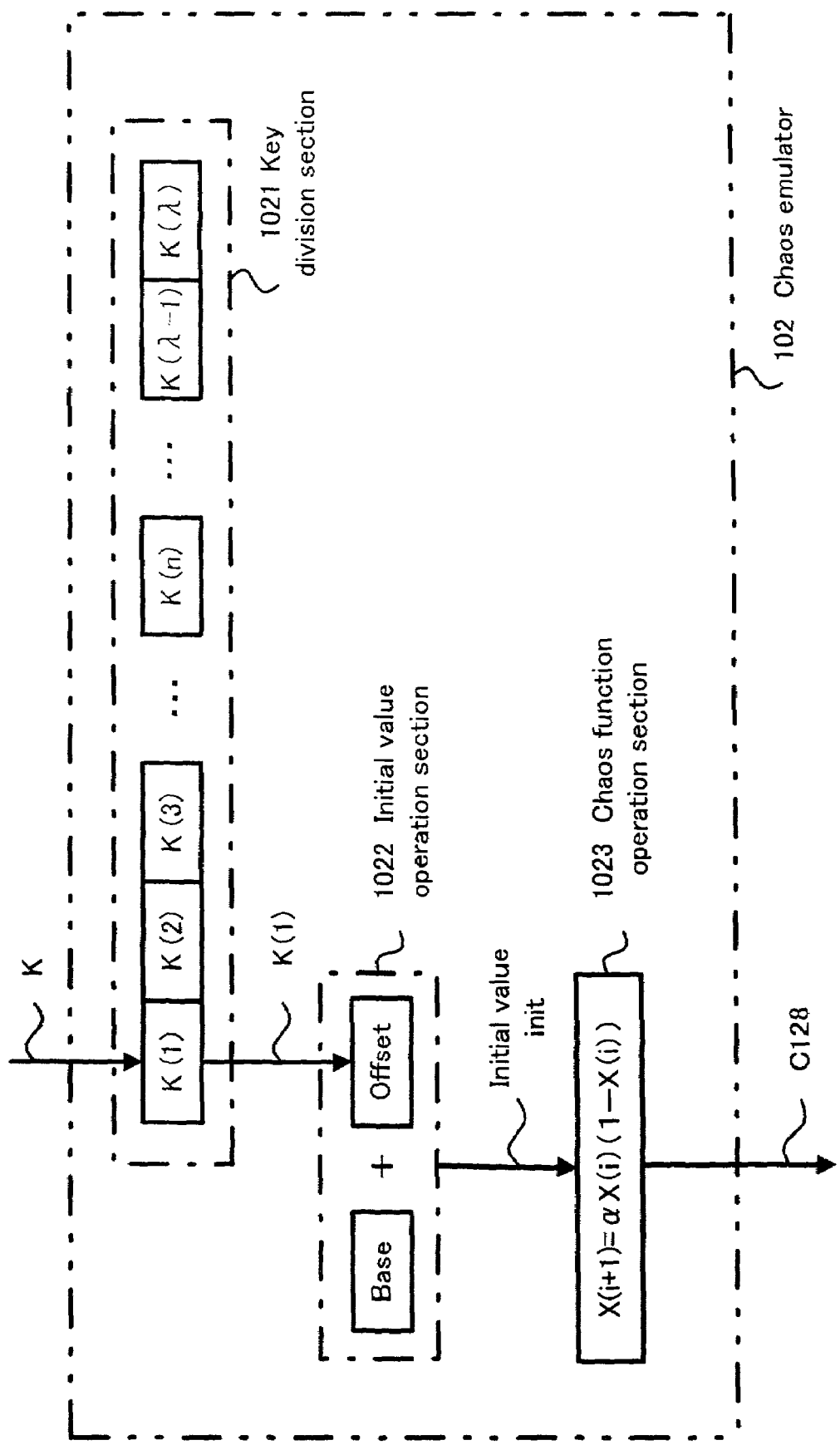
FIG. 6 is a diagram showing the configuration of the chaos emulator 102 in the encryption system as shown in FIG. 3.
Figure 7:
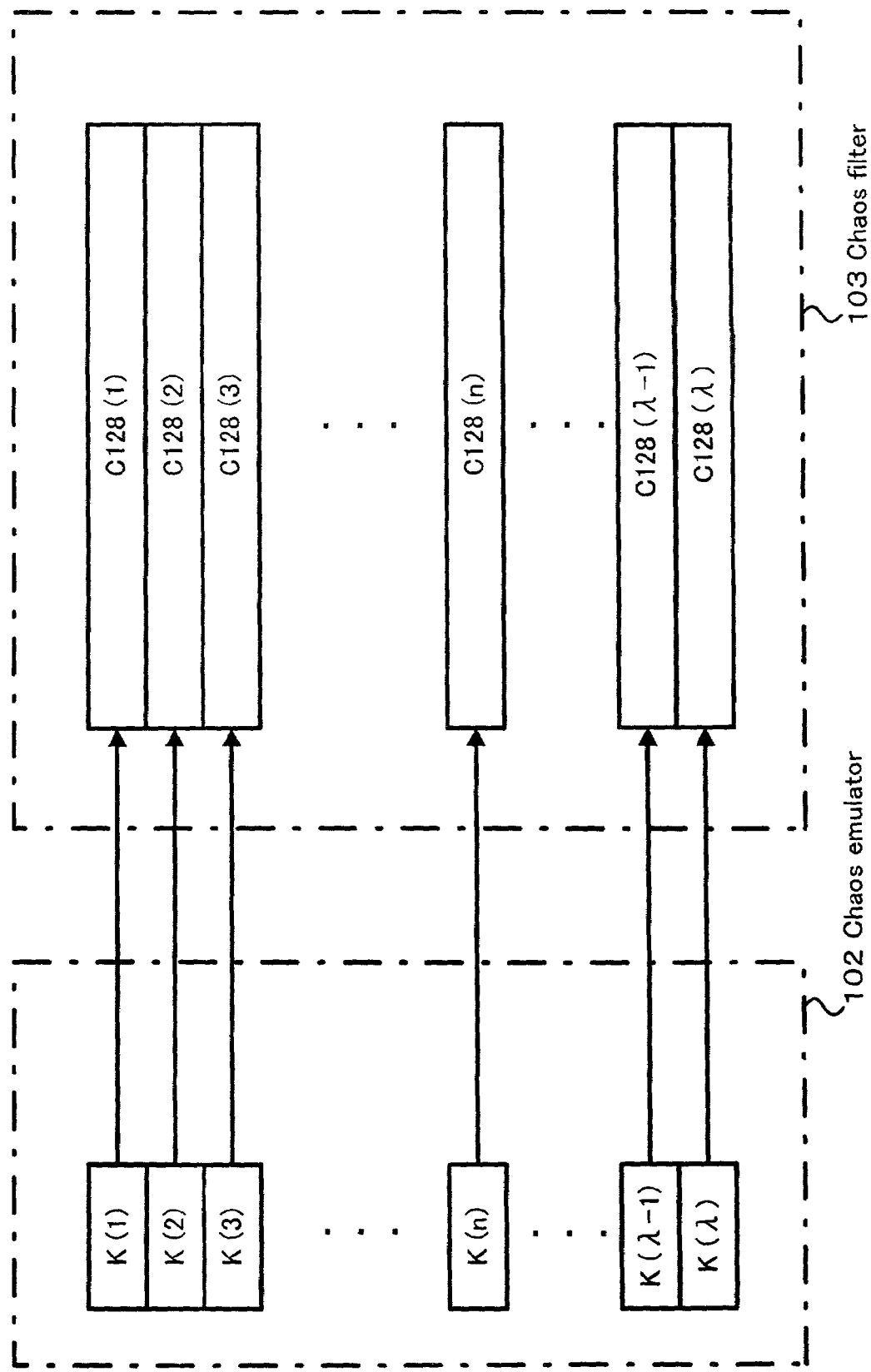
FIG. 7 is a conceptual diagram showing the flow of data between the chaos emulator 102 and the chaos filter 103 in the encryption system as shown in FIG. 3.
Figure 8:
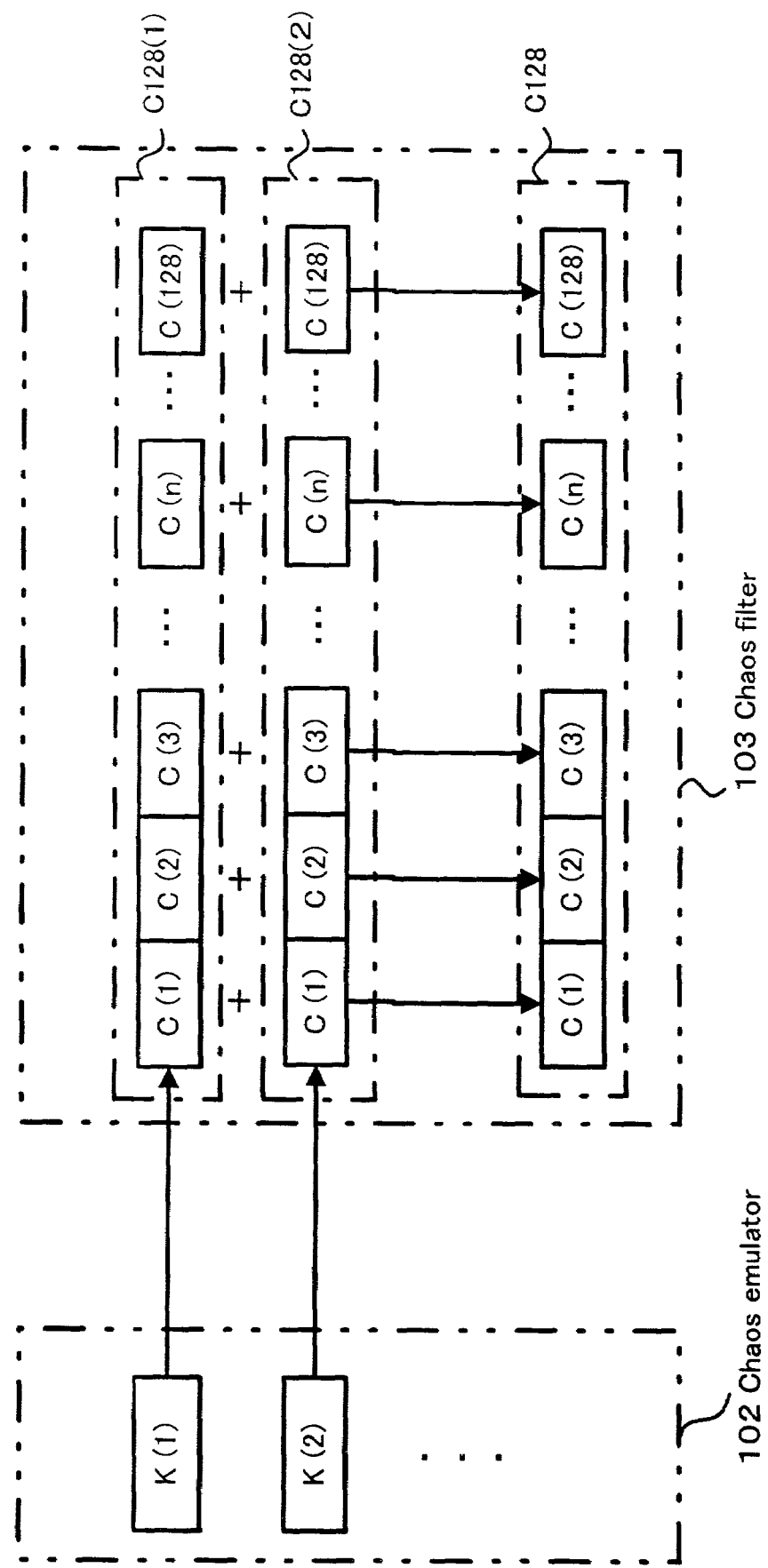
FIG. 8 is a conceptual diagram partially showing the processing of data in the chaos filter 103 in the encryption system as shown in FIG. 3.
Figure 9:
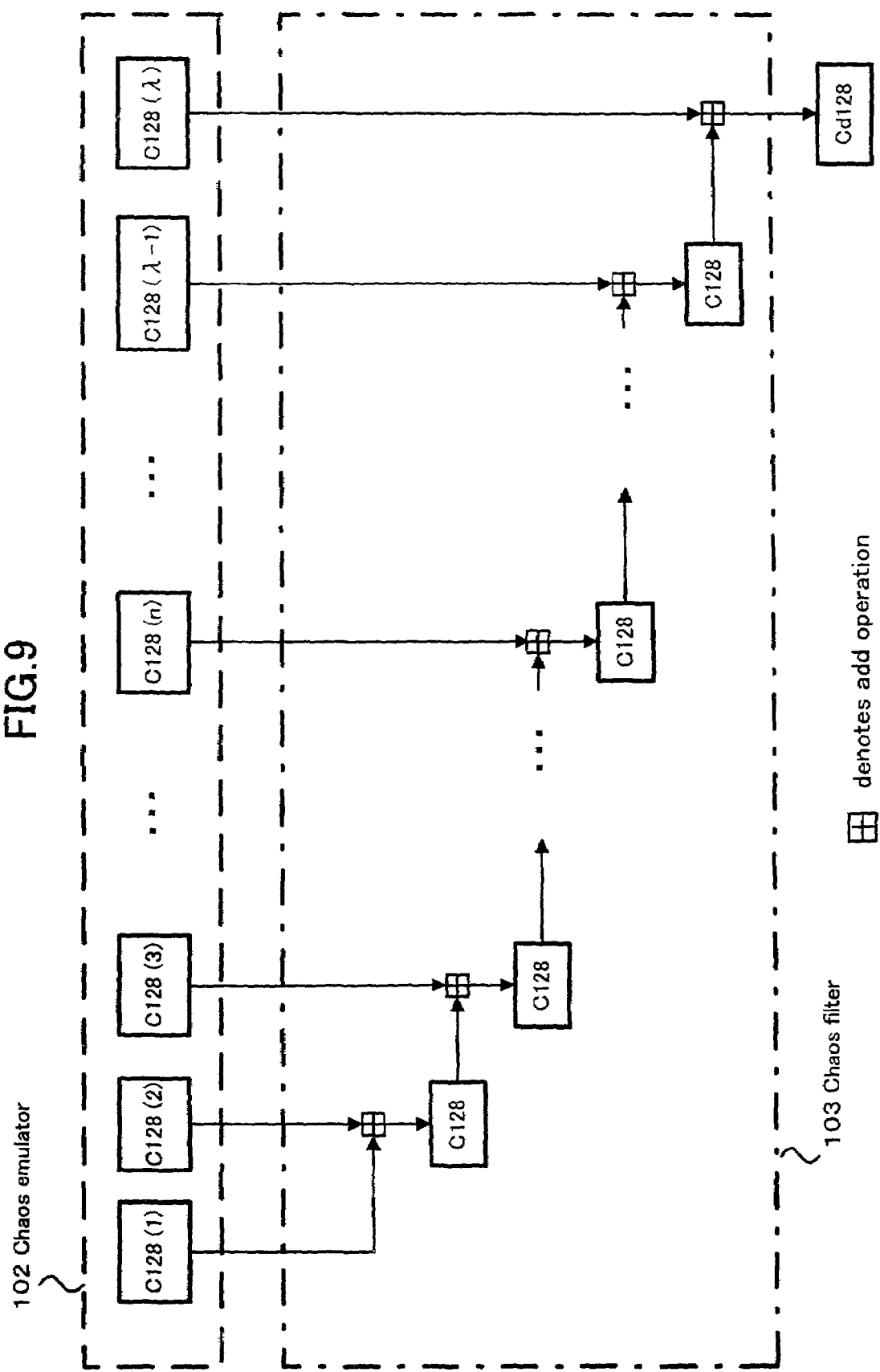
FIG. 9 is a conceptual diagram showing the processing which is performed in the chaos filter 103 for the data sent from the chaos emulator 102 in the encryption system as shown in FIG. 3.
Figure 10:
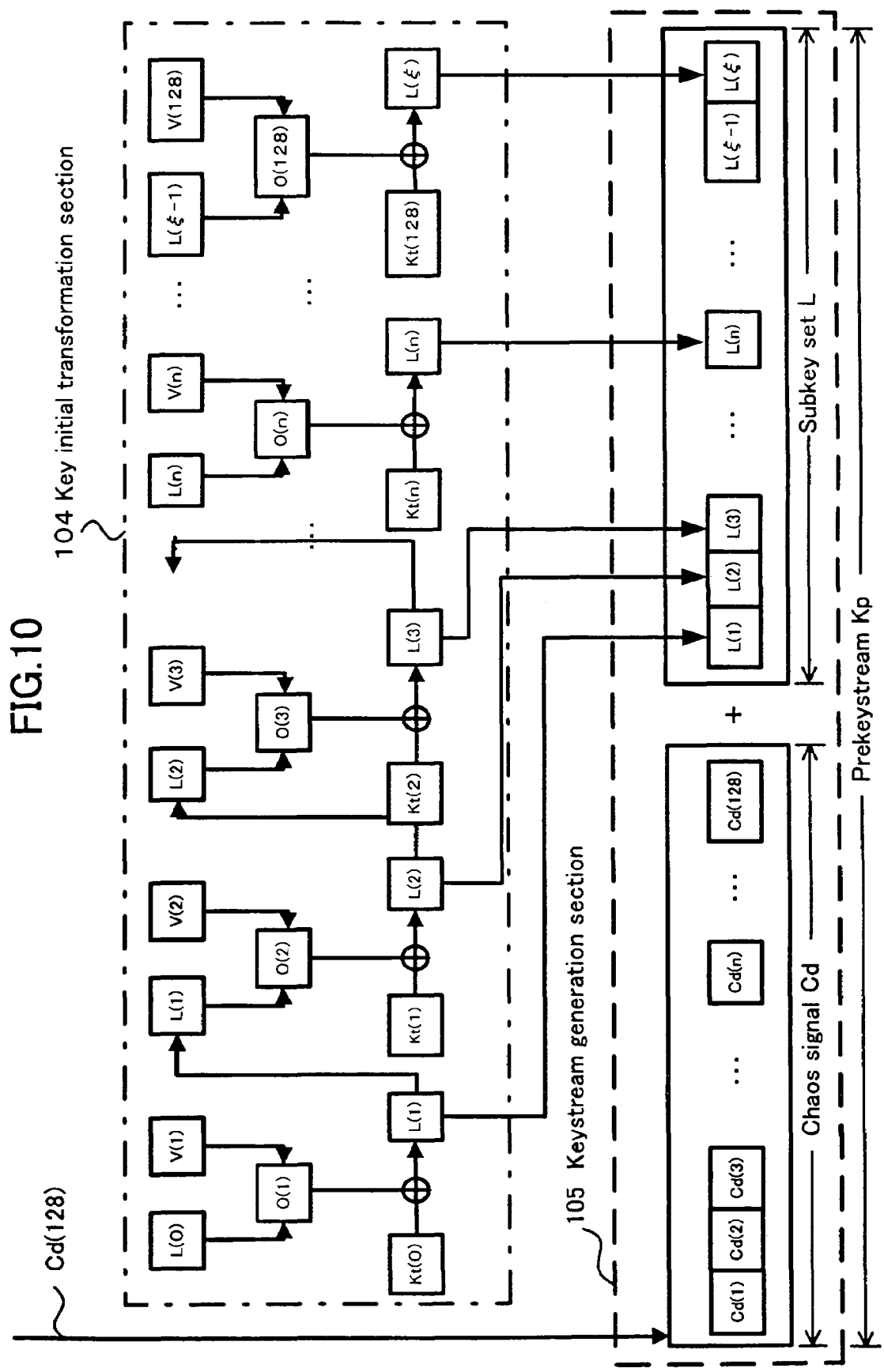
FIG. 10 is a diagram showing the configuration of the key initial transformation section 104 which generates a subkey set L in the encryption system as shown in FIG. 3, and the relationship between the chaos signal Cd and the subkey set L, which are input to the keystream (Ks) generation section 105 and stirred.

Next, the encryption method and the encryption system according to the embodiment of the present invention which have been described with reference to FIG. 2 and FIG. 3 will be still more specifically explained with reference to FIG. 1 and FIG. 4 to FIG. 11. FIG. 1 is a conceptual diagram showing the way of generating vector data involved in the encryption method and the encryption system according to the embodiment as illustrated in FIG. 2 and FIG. 3. FIG. 4 is a diagram exemplifying the irregularity of the logistic map by choosing i as the abscissa and X(i) as the ordinate. FIG. 5 is a characteristic diagram of the logistic map that is expressed by choosing X(i) as the abscissa and X(i+1) as the ordinate. FIG. 6 is a diagram showing the configuration of the chaos emulator 102 in the encryption system as shown in FIG. 3. FIG. 7 is a conceptual diagram showing the flow of data between the chaos emulator 102 and the chaos filter 103. FIG. 8 is a conceptual diagram partially showing the processing of data in the chaos filter 103 in the encryption system as shown in FIG. 3. FIG. 9 is a conceptual diagram showing the processing which is performed in the chaos filter 103 for the data sent from the chaos emulator 102 in the encryption system as shown in FIG. 3. FIG. 10 is a diagram showing the configuration of the key initial transformation section 104 which generates a subkey set L in the encryption system as shown in FIG. 3, and the relationship between the chaos signal Cd and the subkey set L, which are input to the keystream (Ks) generation section 105 and stirred. FIG. 11 is a conceptual diagram showing the stirring processing between the chaos signal Cd and the subkey set L that is performed in the keystream (Ks) generation section 105 in the encryption system as shown in FIG. 3.

First, the notation which is used in the statements as given later and the drawings for reference will be explained here. Data will be expressed in such a manner as C(1), C128(1), Cd, and $E_{2(1)}$. In such notation, the first letter ("C", for example) and a letter with a suffix (for example, "d" in Cd and "2" in $E_{2(1)}$) denote a group of data (such as a digital chaos signal) which is to be provided with a certain name for identification, and the number following the first letter (128, for example) denotes the byte length. When the letter is not followed by any number, the byte length shall be interpreted to be one byte. The number in the parentheses ("1" in C(1) and "1" in $E_{2(1)}$, for example) denotes the ordinal number at which the pertinent data is located, being counted from the head of the data input for the processing. When the letter is not provided with a parenthesized number, it means that the data is to be processed as a batch with no discrimination of ordinal number. The data in the present embodiment is processed in bytes (one byte is equal to 8 bits) as a general rule. Thus, in the present embodiment, since the number in the parentheses denotes the ordinal number at which the pertinent data is located, being counted from the head, the parenthesized number also denotes the ordinal number at which the byte for the pertinent data is located, being counted from the head, as a general rule.

In the present embodiment, the length of the common key K is λ bytes, and λ denotes 1 or any positive integer greater than 1. The length λ of the key is important for the cryptograph technology, and the longer the key length λ, the wider the variation range for the data in the ciphertext will be, and the higher the cryptographic strength will be. If the key length λ is variable, in other words, the user of a cryptosystem can arbitrarily specify the key length λ, the variation range for the data in the ciphertext will be substantially widened. When a malicious third party tries to decrypt the ciphertext by taking a Brute Force attack, the key length λ being variable will provide a wide range of key which must be attacked on the Brute Force basis, compared to the range for a fixed length key, therefore it can be said that the cryptosystem of variable length key provides a cryptograph technology which is rigid also to a Brute Force attack. Judging from the fact that the restrictions on exports of the cryptograph technology in USA, i.e., "Title 22, Code of Federal Regulations, Parts 120–131 (International Traffic of Arms Regulations—ITAR)" is applicable to any cryptosystem involving a key with a length equal to or over a certain length, it is obvious that the length of the key can have a direct effect on the cryptographic strength.

FIG. 6 is a diagram showing the configuration of the chaos emulator 102 in the encryption system as shown in FIG. 3; 1021 indicating a key division section, 1022 an initial value operation section, and 1023 a chaos function operation section. The chaos emulator 102 receives the common key K, and performs the process of the chaos emulation in Step 2 in FIG. 2 for generating a digital chaos signal.

The data input to the chaos emulator 102 is the key K. The key K is data which is processed in bytes, and here it is assumed that the key K is of λ bytes. If data of 1 byte (8 bits) is expressed in hexadecimal notation, 256 values from 00 to FF can be given, however, for the key K in the present embodiment, 255 values from 01 to FF are permissible. In the key division section 1021, the key K of λ bytes is divided into partial keys of arbitral lengths from 1 byte to 8 bytes. It is assumed that the number of bytes for the partial keys is ν. For example, if λ =10, K=1234567890, and ν=2, the key division section 1021 divides the key K into five different partial keys of 12, 34, 56, 78, and 90. In the following description and the accompanying drawings, assuming that ν=1, the key K of λ bytes is divided into λ partial keys of K(1), K(2), K(3), . . . , K(n), . . . , K(1−λ), and K(λ) (1≦n≦λ) (in the present embodiment, it is assumed that ν=1, thus the above-mentioned Λ is equal to λ).

The initial value operation section 1022 previously stores the base value, and receives the partial keys of K(1), K(2), K(3), . . . , K(n), . . . , K(1−λ), and K(λ) provided by the key division section 1021 as offset values in sequence for performing an add operation which adds the respective offset values to the base value. The sums generated by the add operation in the initial value operation section 1022 are provided for the chaos function operation section 1023 as the initial value init for the chaos function in the chaos function operation section 1023.

The chaos function operation section 1023 receives the initial value init for the chaos function, and generates a non-linear digital chaos signal from the logistic map, which is a typical chaos function. The logistic map is expressed as:

$$X(i+1)=\alpha X(i)(1-X(i)) \qquad (2)$$

Where i is a positive integer of 1 or greater, and α is a driving parameter, being a parameter for the chaos function. X(1) is the initial value init. FIG. 4 is a diagram exemplifying the irregularity of the logistic map by choosing i as the abscissa and X(i) as the ordinate. FIG. 5 is a characteristic diagram of the logistic map that is expressed by choosing X(i) as the abscissa and X(i+1) as the ordinate. As exemplified in FIG. 5, the logistic map provides a great number of X(i+1) values on the ordinate corresponding to a specific value of X(i) on the abscissa, and FIG. 5 suggests the difficulty of predicting the values of X(i+1) from a specific value of X(i).

The chaos signal X(i) is generated in the form of a floating point number, however, the chaos function operation section 1023 handles the chaos signal X(i) in the form of a floating point number as an 8-byte integer type signal. By handling the chaos signal as an 8-byte integer type one, the chaos signal can be easily handled in the Java language, which does not depend upon the model. The chaos emulator 102 is a chaos signal generator, generating a digital non-linear chaos signal C of 8-byte integer type. The chaos function operation section 1023 generates a digital chaos signal C for each initial value init. Then, the number of digital chaos signals C output from the chaos function operation section 1023 is equal to the byte length λ of the key K. The data length of the digital chaos signal C generated by the chaos function operation section 1023 is μ bytes. Because the above-mentioned i is not provided with an upper limit, the data length of μ bytes of the digital chaos signal which can be generated by the chaos function operation section 1023 is not limited, however, with the cryptosystem (method and system) in the present embodiment, it is assumed that μ=128, in order to provide a practical compromise between the processing time and the cryptographic strength.

Here is a description of the reasons why the base value is used for obtaining the initial value init in the chaos emulator 102. When the chaos function is used for generating a digital chaos signal, the chaos function value X(i), i.e., the chaos signal provides a floating point number which moves (varies) intricately between 0 and 1, as shown in FIG. 4. This chaos function value X(i) may repeat a fine movement only in the vicinity of the bottom of the graph as shown in FIG. 4, i.e., in the extreme vicinity of zero value, or only in the vicinity of the top of the graph in the same figure, depending upon the initial value init of the chaos function. When the chaos function value repeats a fine movement only in the vicinity of a certain value as stated above, in other words, the chaos function values are non-uniformly distributed into a particular narrow range, rather than basically uniformly between 0 and 1, it can be said that the digital chaos signal provides a small amount of movement. When a keystream is generated on the basis of a digital chaos signal giving a small amount of movement, and this keystream is used to encrypt a plaintext, the plaintext provides a small amount of variation. With a plaintext providing a small amount of variation, it is difficult to maintain the cryptographic strength at a desired level.

As a solution to the problem of that the chaos function values may be non-uniformly distributed into a particular narrow range, depending upon the initial value init, the present embodiment uses a base value. The base value is selected in consideration of all the values of the key K that can be expected to be input by the user from such an input device as the keyboard, or all the keys which can be expected to be used. The base value must be an optimum value with which the chaos function value in the form of a floating point number that is generated when the initial value init is substituted into the chaos function is widely moved between 0 and 1, resulting in a basically uniform distribution of the chaos function values. The digital chaos signal C is generated by transforming the chaos function value in the form of a floating point number into an 8-byte integer type signal in the chaos function operation section 1023, therefore, when the chaos function is widely moved between 0 and 1, resulting in a basically uniform distribution of the chaos function values, the amount of movement of the digital chaos signal C is large, and the distribution of the amounts of movement is uniform. The initial value init of the chaos function is a value which is deviated from the base value by the offset value, which is the partial key K (n), therefore, by selecting the base value as stated above, the digital chaos signal C is widely moved for each partial key, resulting in a uniform distribution of the amounts of movements. It can be said that the technique which sets the initial value init of the chaos function by using the base value as the basis and the partial key as an offset value is an approach which can fully realize the superiority in utilizing the chaos function for the cryptograph technology. The base value varies with the chaos function. By combining the chaos function with the base value, the chaos function is fixed, and the structure of the algorithm related to generation of a digital chaos signal is stabilized, which allows the algorithm to be executed at a higher speed.

The chaos function operation section 1023 uses the initial value init of the chaos function determined by the above-mentioned processing in the initial value operation section 1022, the preset parameter(s) α for the chaos function, and the chaos function for generating a digital chaos signal C128. Thus, the digital chaos signal C128 is generated on the basis of the initial value init of the chaos function that is derived from the key K, the chaos function parameter(s), and the chaos function.

As the chaos function to be used in the chaos function operation section 1023, a variety of chaos functions can be substituted, and when a chaos function which has a property more suitable for the present invention is discovered, it can be expected that the cryptographic strength and the processing speed are improved simply by applying that function to the present embodiment.

As shown in FIG. 7, the processing for multiplying the partial key K (n) which is of 1-byte length, being part of the key K, to 128 bytes is repeated by the number of times that is equal to the number of bytes for the key K, i.e., λ times. If the digital chaos signal of 128 bytes that is generated in the chaos emulator 102 is expressed as C128, and (n) is added to it for expressing the order of generation, n, from the first to the λ th of the respective digital chaos signals, the digital chaos signals output from the chaos emulator 102 can be expressed as C128(1), C128(2), C128(3), . . . , C128(n), . . . , C128(λ−1) C128(λ).

In the present embodiment, by using the information about the key K for the initial value init of the chaos function, the digital chaos signal C is varied for each key K input so that the cryptographic strength is enhanced. When a malicious third party tries to perform decryption with a counterfeit key, the initial value sensitivity of the chaos function will be exerted such that a minute discrepancy of the key is reflected in a great change in the decrypted plaintext, which makes it difficult to perform decryption.

In encryption processing, the key generation, the key transformation or the like tends to require a longer period of processing time than the encryption of the plaintext. In the present embodiment, for fully utilizing the superiority of the chaos function, which is processed at high speed, a technique which uses only one chaos function in the encryption algorithm for stabilizing the structure, and increasing the speed of encryption processing is adopted. In the above paragraph for explaining the problems to be solved by the present invention, the disadvantages of the chaos cryptosystem which provides a plurality of chaos functions for the encryption algorithm, and switches over the chaos function on the way of encryption are described. In the present embodiment, however, only one chaos function is provided for the encryption algorithm, therefore, the present embodiment is free from the drawbacks of the conventional chaos cryptosystem, which provides a plurality of chaos functions for the encryption algorithm.

Next, with reference to FIG. 8 and FIG. 9, the processing in the chaos filter 103 will be explained. More particularly, the operation in the chaos filter 103 when the λ sets of C128 which are generated for the partial keys K (n) constituting the key K are viewed in bytes will be explained. The C128(1) of 128 bytes which is generated on the basis of the partial key K(1) can be expressed as C(1), C(2), C(3), . . . , C(n), . . . , C(127), C(128) from the head in sequence, if the first byte is expressed as C(1). This is true also for the C128(2) which is generated on the basis of the partial key K(2). The bytes of the same order in C128(1) and C128(2) are added to each other, and the sum is output as one byte. This add operation in units of one byte is repeated for obtaining C128 as the result of addition for all 128 bytes (see FIG. 8). When the value of the result of operation exceeds one byte in the add operation, the value carried to the higher-order digit is discarded, the value of the same order digit being left. For example, when B9 and 8E in hexadecimal notation are added to each other, the sum is 147, but 1, which is carried to the higher-order digit, is discarded, 47 being left. When the above-stated processing is viewed in units of 128 bytes, the above-mentioned operation processing in bytes is performed for all C128, which is generated by λ, i.e., the number of bytes for the key K input, as shown in FIG. 9; the result of the operation on C128(1) and C128(2) being obtained, then the result of the operation on C128, which is the result of the previous operation, and C128(3) being obtained, and such processing being repeated for finally obtaining the digital chaos signal Cd based on the key components by 128 bytes. In other words, the number of bytes for the digital chaos signal Cd obtained in the chaos filter 103 is 128, which is the same as the number of bytes for each of C128(1), C128(2), C128(3), . . . , C128(n), . . . , C128(λ−1), C128(λ), which constitute the digital chaos signal C output from the chaos emulator 102.

As stated above, the data length of μ bytes of the digital chaos signal which can be generated in the chaos function operation section 1023 is not limited, therefore, on the digital chaos signal generation means, a digital chaos signal Cd of 128 bytes or over can be generated. Then, when the cryptographic strength is to be enhanced, it can be easily increased by obtaining a digital chaos signal Cd of 128 bytes or more. For the chaos emulation in Step 2, it has been assumed that ν=1, and the byte length of the partial key is 1, however, the value of ν may be 2 or larger, in other words, a digital chaos signal may be generated every 2 bytes or 8 bytes, for example. That is to say, with the digital chaos signal generating method according to the present embodiment, the partial key can be determined, the initial value init can be selected, and thus the digital chaos signal itself can be changed, depending upon every how many bytes of the key K input a digital chaos signal C is to be generated (what value of ν is to be selected). From the viewpoint of balance between the encryption speed and the cryptographic strength, it is practical to set the value of ν at 8 or so.

Further, the number of digital chaos signals can be set, depending upon how many partial keys the key K is to be divided in the key division section 1021, and the byte length of the digital chaos signal Cd can be arbitrarily set, depending upon the method of processing in the chaos filter 103. In other words, the present embodiment allows internal keys of an optional length to be generated from the key K.

Here is given an example of digital chaos signal Cd of 128 bytes. If the byte length λ of the key K is 9, the value of the key K is "123456789", and the byte length ν of the partial key is 1, the digital chaos signal Cd of 128 bytes can be expressed in hexadecimal notation as follows:

384EE9DF0C74D28E2769A7C635680FDF1636E85737
BDA71A0E7410E82BCB627B2E774F6B28F8486D3
33C38F61CC6DEC73B88B8EC00482E68011F5BFA04
67CA5E1051BCF02F679F8526CFAAF4362878E813
CBA0BD34E26E1F17D995CA393A178B0921A92D1
EEE1DB23B84EFCC005748C4015B23CA054CF821
13512C90343A07FC

FIG. 10 shows the configuration of the key initial transformation section 104. As stated above, the key initial transformation section 104 processes the key K input in the key input section 101 for generating a subkey set L of ξ bytes (ξ is a positive integer of 2 or greater). The subkey set L comprises a subkey L(1), L(2), L(3), . . . , L(n), . . . , L(ξ−1), L(ξ). The key initial transformation section 104 comprises ξ subkey generation blocks which generate each of these ξ subkeys.

The first subkey generation block which generates a subkey L(1) comprises an add section which performs add operation between the subkey initial value L(0) and the value V(1) of the first byte, counting from the head of the vector data initial values, for generating the sum O(1) of both, and an exclusive OR operation section which performs exclusive OR operation between the key data initial value Kt(0) and the sum O(1) for generating a subkey L(1). In the present embodiment, it is assumed that L(0)=Kt(0)=K(1). The vector data initial values are previously stored in the vector data table [V] in the internal vector generation section 108. The second subkey generation block which generates a subkey L(2) comprises an add section which performs add operation between the subkey initial value L(1) and the value V(2) of the second byte, counting from the head of the vector data initial values, for generating the sum O(2) of both, and an exclusive OR operation section which performs exclusive OR operation between the key data initial value Kt(1) and the sum O(2) for generating a subkey L(2). In the present embodiment, it is assumed that Kt(1)=K(1)+K(0). However, since K(0) is not given, K(0) must be equal to 0.

Hereafter, such processing is repeated. The nth subkey generation block which generates a subkey L(n) comprises an add section which performs add operation between the L(n−1) which is generated in the (n−1)th subkey generation block and the value V(n) of the nth byte, counting from the head of the vector data initial values, for generating the sum O(n) of both, and an exclusive OR operation section which performs exclusive OR operation (XOR) between the key data initial value Kt(n) and the sum O(n) for generating a subkey L(n). It is assumed that Kt(n)=K(n)+K(n−1). As can be seen from the above gradual explanation, in the key initial transformation section 104, the nth subkey generation block generates a subkey L(n) by performing the following operation (provided that λ>μ).

$$O(n) XOR\ Kt(n)=L(n) \quad (3)$$

$$O(n)=L(n-1)+V(n) \quad (4)$$

$$Kt(n)=K(n)+K(n-1) \quad (5)$$

provided that L(0)=Kt(0)=K(1), K(0)=0.

In the present embodiment, the byte length ξ of the subkey set L is set at a value equal to or larger than the byte length μ of the digital chaos signal Cd for maintaining the intensity of an internal key of the keystream Ks at a desired level or higher. If the equation (5) is used for generating the Kt(n) with the length λ of the key K being smaller than μ(λ<μ), the maximum value of n will be equal to the byte length λ of the key K, which results in a shortage of the key data Kt(n) for the (n=λ+1)th and subsequent subkey generation blocks. Then, in the present embodiment, the equation (5) is expanded to $$Kt(n)=K(n\ mod\lambda)+K\{(n-1)\ mod\lambda\} \quad (5a)$$

which is used for generating the key data Kt(n). For example, if λ=8, and the length μ=128, n =9 will provide Kt(9) by using Eq. (5a) as Kt(9)=K(9 mod 8)+K{(9−1) mod 8}=K(1)+K(0)=K(1). In this case, K(1), K(2), . . . , K(7), K(8) is repetitively used 16(=128÷8) times for generating the Kt(1), Kt(2), . . . , Kt(n), . . . , Kt(127) (as stated above, Kt(0)=K(1)).

If the length of the key K is the shortest, i.e., 1 byte, and λ=1, the present embodiment multiplies the key information to the same length as the byte length μ(=128) of the digital chaos signal Cd, resulting in the byte length ξ of the subkey set L being μ, and the intensity of an internal key of the keystream Ks, which is generated by stirring the digital chaos signal Cd and the subkey set L, being maintained at a desired or higher level.

If the byte length λ of the key K is equal to or greater than μ(λ≧μ), the maximum value of n is λ, and λ key data Kt(n) is produced, resulting in the byte length ξ of the subset L being λ. In the present embodiment, the intensity of the internal key corresponding to the byte length λ of the key K is assured. In the present embodiment, if the byte length λ of the key K is smaller than μ(λ21 μ), the number of times of repetitive use of K(1), K(2), . . . , K(λ) in generation of the key data Kt(n) is optional, therefore, the key data Kt(n) can be generated to a desired length, and thus the byte length ξ of the subkey set L can be optionally selected.

In the present embodiment, the vector data initial values V(1), V(2), V(3), . . . , V(n), . . . , V(ξ) which are previously stored in the vector data table [V] in the internal vector generation section 108 are added to the subkeys L(0), L(2), L(3), . . . , L(n), . . . , L(ξ−1), respectively, for generating sums O(1), O(2), O(3), . . . , O(n), . . . , O(ξ). However, if the vector data initial values V(1), V(2), V(3), . . . , V(n), . . . , V(ξ) are replaced with other initial values, the present invention can be practiced. In order to reduce the required number of data tables, the present embodiment has been configured such that the vector data table [V] in the internal vector generation section 108 can be used also in the key initial transformation section 104.

FIG. 11 is a conceptual diagram showing the stirring processing between the chaos signal Cd and the subkey set L that is performed in the keystream generation section 105 in the encryption system. As shown in FIG. 10, the digital chaos signal Cd of μ bytes and the subkey set L of ξ bytes are input to the keystream generation section 105. The digital chaos signal Cd and the subkey set L are stirred in the keystream generation section 105, resulting in a keystream Ks of η(=μ+ξ) bytes being created, thus, the data consisting of the digital chaos signal Cd and the subkey set L at the stage before being stirred, which are simply connected to each other in parallel as shown in FIG. 10, is called the prekeystream Kp. In the prekeystream Kp, the digital chaos signal Cd components and the subkey set L components are distributed non-uniformly. In the keystream generation section 105, in order to make the keystream Ks, i.e., the internal key at the final stage cryptographically rigid, a stirring processing is performed for providing a uniform distribution of the digital chaos signal Cd components and the subkey set L components.

The stirring processing in the keystream generation section 105 is performed as follows (various methods of stirring processing are available, however, the method which is adopted in the present invention will be described hereinbelow). First, the data <<Cd(1)>>, which is the bit-inverted chaos component Cd(1) in the prekeystream Kp, is generated as a first reference value; an add operation between the chaos component Cd(2) in the prekeystream Kp and the first reference value <<Cd(1)>>is performed; and Cd(2) is replaced with the sum of both, i.e., Cd(2)+<<Cd(1)>>. Next, a subtract operation between the first reference value <<Cd(1)>>and Cd(3) is performed, and Cd(3) is replaced with the difference of both, i.e., Cd(3)−<<Cd(1)>>. Hereafter in the same way, an add or subtract operation between the first reference value <<Cd(1)>>and the chaos component Cd(n) or the subkey set component L(n), which is followed by the replacement with the sum or difference as a result of the addition or subtraction, is repetitively performed to the final byte L(ξ) in the prekeystream Kp.

When the replacement processing using the first reference value <<Cd(1)>>is performed (η−1) times (η=μ+ξ) to the final byte L(ξ) in the prekeystream Kp, the components of Cd(2) to L(ξ) have been replaced, and a new intermediate-stage keystream of η bytes has been created. If this new first intermediate-stage keystream is expressed as $Km_1$, and $Km_1$ as $Km_1$(1), $Km_1$(2), $Km_1$(3), . . . , $Km_1$(n), . . . , $Km_1$(η), then $Km_1$(1)=Cd(1), $Km_1$(2)=Cd(2)+<<Cd(1)>>, $Km_1$(3)=Cd(3)−<<Cd(1) >>, . . . Next, $Km_1$(2) is bit-inverted for use as the second reference value <<$Km_1$(2)>>, and for the first intermediate-stage keystream $Km_1$ from $Km_1$(3) to $Km_1$(η), the same replacement processing is repeated (η−2) times. The reference value is sequentially transferred on the intermediate-stage keystream Km, and the replacement operation is repeated until the ηth byte data is made the reference value. If the intermediate-stage keystream Km when the replacement operation which makes the ηth byte data the reference value is completed, i.e., the final intermediate-stage keystream Km is $Km_\eta$, the $Km_{72}$ is the keystream Ks, being recorded in the keystream table [Ks].

Figure 22:
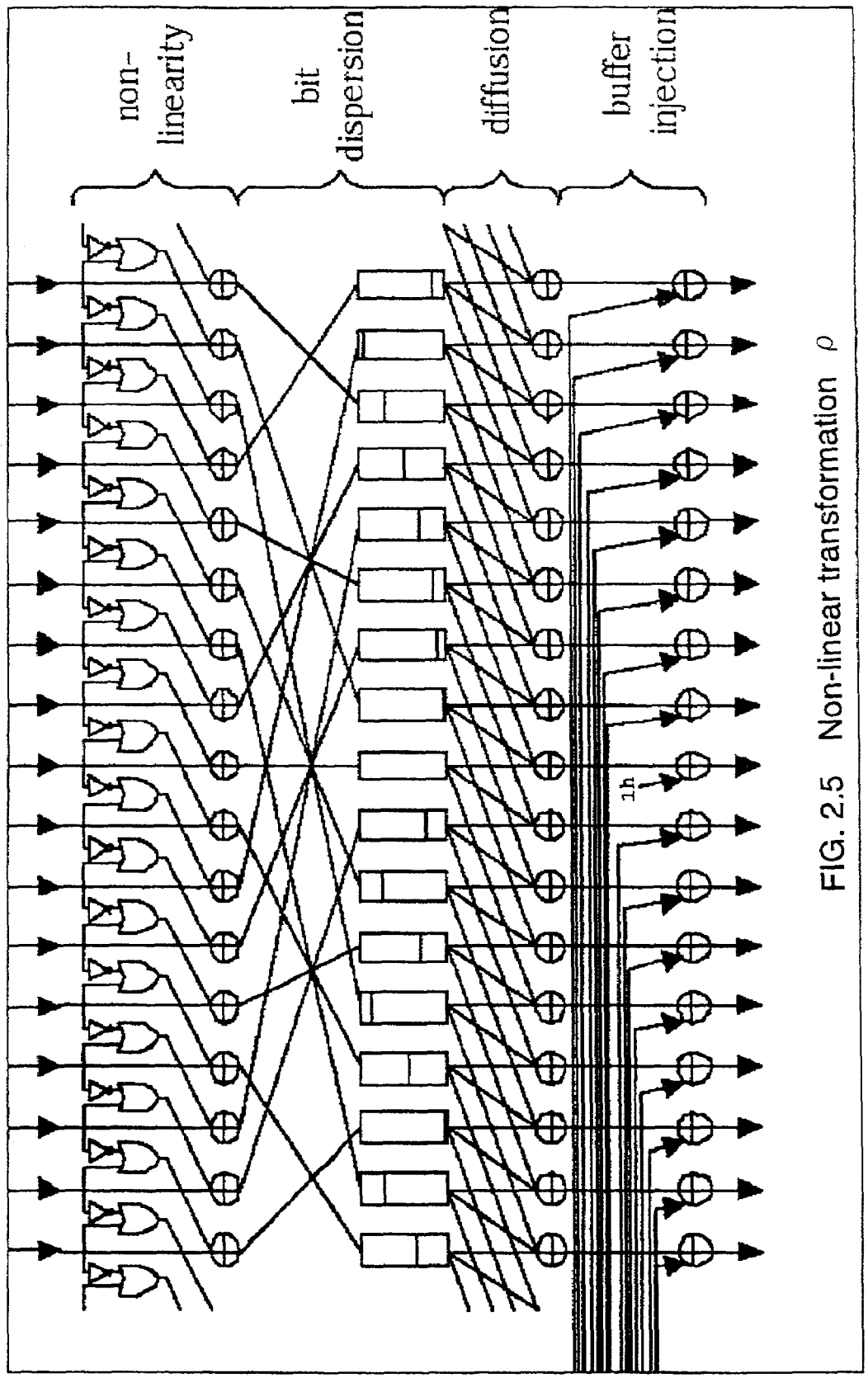
FIG. 22 is a circuit diagram showing a conventional key transformation circuit which corresponds to the key initial transformation section 104 as indicated in FIG. 10.

By performing the above stirring processing, the keystream Ks which provides pseudo random numbers including the key components, uniformly distributing the digital chaos signal Cd components and the subkey set L components, is generated. The above-described generation of the prekeystream Kp and stirring of the keystream Ks are performed by the method as shown in FIG. 22 in a similar stream cipher, MULTI-S01, which was developed by HITACHI, Ltd. The method according to the present embodiment as shown in FIG. 11 and FIG. 12 is simple in processing algorithm, as compared to the conventional processing method as shown in FIG. 22, and yet the cryptographic strength as the keystream is not impaired. Then, the present embodiment is useful even if it is viewed only from the generation of the keystream which is the internal key.

As stated above, in the present invention, even when the encryption processing is performed with the use of a key of 1 byte, which is the shortest key length allowable in the present embodiment, an encryption algorithm which can keep the cryptographic strength at a desired level is realized by, for example, setting the byte length μ of the digital chaos signal Cd at 128 bytes, the byte length ξ of the subkey set L at 128 bytes, using these key information containing data as the intermediate internal keys, and setting the byte length η of the keystream Ks, i.e., the final internal key, at 256 bytes, the sum of the byte lengths of both intermediate internal keys. In other words, in the present embodiment, if the byte length λ of the key K input is 1, the smallest, a keystream Ks of 256 bytes is generated, and when the key K input has a byte length of over 128 bytes, a keystream Ks of over 256 bytes is generated. Needless to say, the present embodiment can adjust the length of the subkey set L generated by the key initial transformation section 104 as well as that of the digital chaos signal Cd by the digital chaos signal generating means (the emulator 102 and the chaos filter 103), therefore, it allows freely selecting either enhancing the cryptographic strength or increasing the speed of encryption processing.

The plaintext input section 106 binary-codes a plaintext input by the user from a hard disk or other, and outputs a binary-coded plaintext P. The primary encryption section 107 is an exclusive OR operation means, receiving a plaintext P and a keystream Ks, and outputting the value of the result of the exclusive OR operation between both data as the primary ciphertext $E_1$. When the byte length of the plaintext P exceeds the byte length η of the keystream Ks, the keystream Ks of η bytes is repeated in succession for creating a keystream of the same length as that of the plaintext P and thus performing an exclusive OR operation between the whole plaintext P and the keystream Ks.

With the ordinary stream symmetry cryptosystem, the encryption processing is regarded as completed at this primary encryption processing stage, and the ciphertext E1, which is the data obtained through the primary encryption, is sent to the opposite party. The key component in the primary encryption is the keystream Ks. In the present embodiment, the internal vector generation section 108 further generates internal vector data V (which is written as vector data V in FIG. 1, and internal vector V in FIG. 2 and FIG. 3) by a unique method; and provides an additional encryption processing (the secondary encryption in Step 9) on the primary ciphertext E1 by means of the internal vector data V for generating a secondary ciphertext E2. The primary ciphertext E1 and the internal vector data V in the secondary encryption correspond to the plaintext and the keystream in the ordinary stream encryption processing, respectively. It can be said that, in the secondary encryption in Step 9, the primary ciphertext E1 is a second plaintext and the internal vector data V a second keystream. In the method of generating this second keystream, the internal vector data V, lies an outstanding feature of the present embodiment.

The secondary encryption (Step 9) in the present embodiment provides a novel technology, which generates a second keystream (internal vector data V) with no use of the input data other than the key K and the plaintext P input by the user, and dynamically changes the primary ciphertext by means of the second keystream. The present embodiment, which adopts the secondary encryption, has substantially improves the cryptographic strength, when compared to the processing involving only the primary encryption. An important technology in the secondary encryption which dynamically changes the encryption result obtained by the primary encryption (the primary ciphertext $E_1$) is to provide a dynamic change for the primary ciphertext $E_1$ without adding data other than that used in the encryption algorithm to the encryption result.

In other words, this unique technology of the present invention provides a system which enhances the cryptographic strength without addition of means (such as a mathematical expression and a function) for dynamically changing the primary ciphertext $E_1$ or a dynamic value itself to the encryption result (the primary ciphertext $E_1$). The encryption algorithm and the key K are previously given to the receiver of the ciphertext, and if the transmitted data is only a ciphertext which is a plaintext encrypted by means of the key information, a third party who has illegally obtained the ciphertext cannot easily grab at the opportunity of decrypting the ciphertext. However, if means (such as a formula and a function) for dynamically changing the primary ciphertext $E_1$ or a dynamic value itself is added to the ciphertext as data for causing a dynamic change of it, a disadvantage is produced which is more critical than those of the ciphertext being longer by the amount of data added and the transmission time taken being longer. The more critical disadvantage is that the dynamic change data itself might be an important clue to decryption of the ciphertext. Therefore, with the common key cryptosystem, the data to be transmitted between the ciphertext sender and the ciphertext receiver is limited to a ciphertext which is a plaintext encrypted by means of the information of the key K (the internal key). The data which is input from the outside of the encryption algorithm and is used for encryption processing is preferably limited to the plaintext P and the key K, and the other data is previously contained in the encryption algorithm as the initial data. In other words, the mathematical expressions, the functions or the values necessary for encryption should be previously loaded in the encryption algorithm.

With conventional cryptosystems, a variety of internal data generated, the plaintext, and the key are processed as a quantity. With such conventional cryptosystems, data is recognized only as a quantity, and thus it can be said that the recognition of data is one dimensional. An example of this in the present embodiment is that, in the above-mentioned keystream generation section 105, Cd(1) is used for the replacement processing of the next Cd(2), and the replacement processed Cd(2) is further used for the replacement processing of Cd(1), being circulated, thus, a successive feedback processing is performed. Such processing provides an example of recognizing the data only as a quantity.

Contrarily to this, the present invention can be said to recognize data two-dimensionally. The data which is an object of two-dimensional recognition with the present invention is a group of data, i.e., the plaintext P and the key K as well as the data previously loaded in the encryption algorithm as the initial values or generated in the course of processing by means of the encryption algorithm. The group of these data is imagined as a space for data, and the imagined space for data is defined as the virtual data space. By designating data in this virtual data space by means of the vector directional component IR, recognizing the designated data as the quantitative component of the vector, and performing a prescribed operation on the quantitative component of the vector, the above-mentioned internal vector data V, which is to be called a second keystream, is generated. The internal vector data V is exclusive-ORed with the primary ciphertext $E_1$, in the secondary encryption section 109 for generating a secondary ciphertext $E_2$. This secondary ciphertext $E_2$ is handled as the vector directional component IR. The secondary ciphertext $E_2$ is not handled as a quantity, being simply fed back in the course of generating the secondary ciphertext $E_2$, but only designates the data in the virtual data space. And, the data designated in the virtual data space is handled as a quantitative component related to the course of generating the secondary ciphertext $E_2$. Thus, it can be said that, with the present invention, the data in the virtual data space is recognized two-dimensionally, and handled two-dimensionally.

FIG. 1 is a conceptual diagram showing the way of generating vector data involved in the encryption method according to the present embodiment. With reference to FIG. 1, the way of generating vector data according to the present embodiment will be more specifically explained. The present embodiment has already been outlined as follows:

① The internal vector generation section 108 has a vector data table [V], in which vector data initial values are previously stored, and the vector data table [V] has $\psi$ fields, each of which stores vector data of $\rho$ bytes.

② In the internal vector generation in Step 8, the first vector data initial value $\Psi_{(1)}$ of $\rho$ bytes in the vector data table [V] is read out first.

③ In the secondary encryption in Step 9, the secondary encryption is performed for the first data $E_{1(1)}$ of $\rho$ bytes in the primary ciphertext $E_1$ with the use of the vector data initial value $\Psi_{(1)}$ of $\rho$ bytes for generating a secondary ciphertext $E_{2(1)}$ of $\rho$ bytes.

④ In the internal vector generation in Step 8, the secondary ciphertext $E_{2(1)}$ of $\rho$ bytes is received, and this secondary ciphertext $E_{2(1)}$ of $\rho$ bytes is recognized as the directional component IR of the vector, the directional component IR designates the data Ks (IR) of the address IR in the keystream table [Ks].

⑤ In the internal vector generation in Step 8, the data Ks (IR) is read out from the keystream table [Ks]; the data Ks (IR) is recognized as the quantitative component of the vector; a logical operation is performed on the data Ks (IR) of the quantitative component; vector data $V_{(1)}$ of $\rho$ bytes is generated; and the first vector data initial value $\Psi_{(1)}$ of $\rho$ bytes is generated; and the first vector data initial value $\Psi_{(1)}$ of $\rho$ bytes in the vector data table [V] is replaced with the vector data $V_{(1)}$.

⑥ Hereafter in the same way, in the internal vector generation in Step 8, ($\psi$−1) primary ciphertexts $E_1$ (of a data length of $\rho$ bytes per ciphertext) are sequentially encrypted every $\rho$ bytes by means of the remaining ($\psi$−1) vector data initial values for sequentially generating ($\psi$−1) secondary ciphertexts $E_2$ (of a data length of $\rho$ bytes per ciphertext) and thus generating ($\psi$−1) internal vector data V. Thus, the remaining ($\psi$−1) vector data initial values are replaced with ($\psi$−1) internal vector data V, all vector data initial values in the vector data table [V] being replaced with the internal vector data V. Hereafter, the ($\psi$−1)th primary ciphertext $E_1$ and the subsequent are sequentially secondary-encrypted by means of the updated internal vector data V. The internal vector data V is updated in sequence for each secondary ciphertext $E_2$.

Here is a description of an example of vector data generation where the data length of $\rho$ bytes in the above outline explanation is 1 byte. The number of bytes, $\eta$, for the keystream table [Ks] is assumed to be 256 or larger. Also, it is assumed that the vector data table [V] has $\psi$ fields ($\psi \leq \eta$) (in the present embodiment, $\psi$=200), each of which stores internal vector data V ($V=V_{(1)}, V_{(2)}, V_{(3)}, \ldots, V_{(n)}, \ldots, V_{(\psi)}$). The data length for each field in the vector data table [V] is assumed to be 1 byte, and the vector data table [V] is assumed to previously store vector data initial values $\Psi_{(1)}, \Psi_{(2)}, \Psi_{(3)}, \ldots, \Psi_{(n)}, \ldots, \Psi_{(\psi)}$ as the internal vector data $V_{(1)}, V_{(2)}, V_{(3)}, \ldots, V_{(n)}, \ldots, V_{(\psi)}$, respectively. The secondary ciphertexts $E_{(1)}, E_{(2)}, E_{(3)}, \ldots, E_{(m)}, \ldots$ are of 1 byte, respectively, however, the data for the keystream table [Ks] to which a secondary ciphertext $E_{(m)}$ of 1 byte is assigned as the address is expressed as $S_{E2(m)}$ (if it is expressed, being conformed to the above Ks(IR), it will be $KsE_{2(m)}$, however, for simplicity, it is expressed as $S_{E2(m)}$ here). On these assumptions, the internal vector generation section 108 will perform a logical operation expressed by the logical operation expression:

$$S_{E2(m)} XOR\ V_{(n)} XOR\ V_{(n+1)} = V_{(n)} \tag{1}$$

and will replace the value expressed by the right side of Eq. (1) with $V_{(n)}$, sequentially. Here, n=m mod$\psi$, and XOR is an operator expressing exclusive OR operation.

In the present embodiment, the keystream table [Ks] provides a virtual data space. And, the secondary ciphertexts $E_{2(1)}, E_{2(2)}, E_{2(3)}, \ldots, E_{2(m)}, \ldots$ provide the above-mentioned vector directional component IR. The data $S_{E2(m)}$ designated by this vector directional component IR is recognized as a vector quantity, and handled as quantitative data by Eq. (1). By handling the secondary ciphertext $E_{2(m)}$ as the address in the keystream table [Ks], the secondary ciphertext $E_{2(m)}$ is recognized as the vector directional component IR. By performing a logical operation expressed by Eq. (1), $E_{2(m)}$ is first exclusive-ORed with $V_{(n)}$, then the value of the result of the exclusive OR operation is exclusive-ORed with $V_{(n+1)}$, then the value of the result of the exclusive OR operation is replaced with $V_{(n)}$ for providing a new $V_{(n)}$.

By performing such a processing in the internal vector generation section 108, only the data of the first $\psi$ bytes in the primary ciphertext $E_1$, i.e., $E_{1(1)}, E_{1(2)}, E_{1(3)}, \ldots, E_{1(\psi)}$, is excusive-ORed with the vector data initial values $\Psi_{(1)}, \Psi_{(2)}, \Psi_{(3)}, \ldots, \Psi_{(n)}, \ldots, \Psi_{(\psi)}$ in the secondary encryption section 109. In the secondary encryption section 109, the primary ciphertext $E_{1(\psi+1)}$ and the subsequent primary ciphertext $E_1$ are not excusive-ORed with the vector data initial values $\Psi_{(1)}, \Psi_{(2)}, \Psi_{(3)}, \ldots, \Psi_{(n)}, \ldots, \Psi_{(\psi)}$ as they are, but are excusive-ORed with the internal vector data $V_{(n)}$ replaced by means of Eq. (1).

As specifically explained above, the secondary ciphertext $E_{2(m)}$ is formed by encrypting the primary ciphertext $E_{1(m)}$, a ciphertext encrypted by means of the keystream Ks, with the internal vector data $V_{(n)}$. And yet, the internal vector data $V_{(n)}$ is data generated by using the secondary ciphertext $E_{2(m-\psi)}$, a secondary ciphertext given $\psi$ bytes ahead, as the vector directional component IR, recognizing the data $S_{E2(m)}$ in the virtual data space (the keystream table [Ks] as the quantitative component of the vector for selecting it, and performing the operation of Eq. (1) on the data $S_{E2(m)}$. Therefore, the processing which references the virtual data space by using the secondary ciphertext $E_{2(m)}$ as the vector directional component can be called an irregular reference. The secondary ciphertext $E_{2(m)}$ is output every one byte, thus, it can be handled as an integer value. If the value of 1 byte is an integer value of 256, the integer value can be used as the directional component pointing to the table having 256 fields. Then the number of fields, η, in the keystream table [Ks] is set at 256 or larger.

In the above-described processing in the internal vector generation section 108, the vector data $V_{(n)}$ has been generated by means of Eq. (1). However, in the internal vector generation section 108, also by performing a logical operation expressed by the logical operation expression:

$$S_{E2(m) XOR\ V(n) XOR\ V(n+1)} = V_{(n+1)} \tag{1a}$$

instead of Eq. (1), and replacing the value expressed by the right side of Eq. (1a) with $V_{(n+1)}$, sequentially, the present invention can be practiced. If the embodiment which involves performing an operation of this Eq. (1a) is adopted, only the data of the first 1 byte in the primary ciphertext $E_1$, i.e., $E_{1(1)}$ is excusive-ORed with the vector data initial value $\Psi_{(1)}$ in the secondary encryption section 109. In the same section 109, the primary ciphertext $E_{1(2)}$ and the subsequent primary ciphertext $E_1$ are not excusive-ORed with the vector data initial values $\Psi_{(1)}$, $\Psi_{(2)}$, $\Psi_{(3)}$, ..., $\Psi_{(n)}$, ..., $\Psi_{(\psi)}$ as they are, but are excusive-ORed with the internal vector data $V_{(n)}$ replaced by means of Eq. (1a).

The secondary ciphertext $E_2$ generated by taking the above procedure is output as the final ciphertext $E_E$ to the communication line or the like by performing the processing of ciphertext output in Step 11. The cryptosystem of the present invention is a cryptosystem of symmetrical key method, the encryption key and the decryption key being common to each other. The decryption is the same processing as the above-stated encryption. In other words, the ciphertext $E_E$ is input as the plaintext in the above-stated encryption, and by performing the processing of encrypting the ciphertext $E_E$ with the key K, the plaintext P is obtained.

As examples of plaintext P which is encrypted according to the embodiment as illustrated in FIG. 2 and FIG. 3, FIG. 12(A) shows a solid black figure, FIG. 12(B) a solid white figure, and FIG. 12(C) a figure which is black in the upper half area, and white in the lower half one. FIG. 13 provides a table which gives frequencies of occurrence of 0 and 1 in the plaintext, the ciphertext, and the decrypted plaintext, when the solid black figure, FIG. 12(A), the solid white figure, FIG. 12(B), and the black and white figure, FIG. 12(C), as well as the data obtained as an LZH file by compressing the entire Help folder (13.4 MB) in the Japanese edition of Microsoft Visio 2000 SRI (The Visual Language of Business) using compression software are each input to the encryption system as shown in FIG. 3 as a plaintext P for encrypting the plaintext P, and then decrypting the ciphertext.

In the top blanks in the table in FIG. 13, the names of the items, i.e., plaintext (name of file), encryption key used, decryption key used, file size (in bytes), plaintext, ciphertext, and decrypted plaintext are given from the left in this order. The blanks for plaintext, ciphertext, and decrypted plaintext are divided into the blanks for frequency of occurrence of 0 and that of 1. The table in FIG. 13 shows, for example, that, for the file for the solid black figure, FIG. 12(A), the percentage of the frequency of occurrence of 0 and that of 1 are 0.2% and 99.98%, respectively, for the plaintext, while the former and the latter for the ciphertext are 49.93% and 50.07%, respectively, being nearly the same, which means that the characteristic of the plaintext is varnished, and thus suggests that decryption of a ciphertext from the distribution characteristics of the data is difficult. The table also shows that, when a key which is wrong, but is different from the correct one only by one byte is used for decryption, the percentage of the frequency of occurrence of 0 and that of 1 are 50.11% and 49.89%, respectively, being almost the same. From this, it can be seen that, if someone else tries to decrypt the ciphertext which is encrypted according to the present embodiment, the encrypted data will give no opportunity of decryption. This means that the present embodiment provides a high cryptographic strength.

FIG. 14 provides tables which give the distribution of frequencies of occurrence of each binary data when the densities of the picture elements (pixels) in the plaintext, the ciphertext, and the decrypted plaintext for the solid black figure, FIG. 12 (A), are expressed as binary data of 2-digit hexadecimal numbers (i.e., binary data of 256 tones), the ordinate representing the second digit of the two-digit hexadecimal numbers, and the abscissa the first digit of the two-digit hexadecimal numbers. The tables at top, medium, and bottom give the distribution in the plaintext, the ciphertext, and the decrypted plaintext (a decrypted plaintext obtained with a key which is wrong by 1 byte), respectively. Needless to say, in the plaintext, almost all of the picture elements are in "00", which is the minimum, and the frequency of occurrence of the other values is virtually zero or near zero. Nevertheless, in the ciphertext, the frequency of occurrence of each binary data is practically on the order of 100, the difference in frequency of occurrence between types of binary data is small. The table at bottom shows that, when a key which is wrong, but is different from the correct one only by one byte is used for decryption, the distribution in the decrypted data is similar to that in the ciphertext.

FIG. 15 provides line graphs which show the distribution of frequencies of occurrence of each binary data when the densities of the picture elements (pixels) in the plaintext, the ciphertext, and the decrypted plaintext for the solid black figure, FIG. 12 (A), are expressed as binary data of 2-digit hexadecimal numbers (i.e., binary data of 256 tones), the ordinate representing the frequency of occurrence, and the abscissa the first digit of the two-digit hexadecimal numbers. The graphs at top, medium, and bottom give the distribution in the plaintext, the ciphertext, and the decrypted plaintext (a decrypted plaintext obtained with a key which is wrong by 1 byte), respectively. In each graph, 16 broken lines are drawn, and a particular broken line corresponds to 0*, 1*, 2*, ..., E*, or F* in the leftmost column (ordinate column) in the table as given in FIG. 14. In the plaintext, the frequencies of occurrence of binary data are concentrated at "00", resulting in a substantially single broken line being formed. On the other hand, in the ciphertext, the frequency of occurrence of binary data is basically uniform regardless of the binary data. This is true also in the decrypted plaintext.

FIG. 16 provides tables for the solid white figure as shown in FIG. 12(B), which are similar to those in FIG. 14, and FIG. 17 provides line graphs for the solid white figure as shown in FIG. 12(B), which are similar to those in FIG. 15. FIG. 18 provides tables for the black and white figure as shown in FIG. 12(C), which are similar to those in FIG. 14, and FIG. 19 provides line graphs for the black and white figure as shown in FIG. 12 (C), which are similar to those in FIG. 15. FIG. 20 provides tables which give the distribution of frequencies of occurrence of each binary data when the data in the plaintext, the ciphertext, and the decrypted plaintext for the Help.Izh (Visio) file as given in FIG. 13 is expressed as binary data of 2-digit hexadecimal numbers, the ordinate representing the second digit of the two-digit hexadecimal numbers, and the abscissa the first digit of the two-digit hexadecimal numbers. FIG. 21 provides line graphs which show the distribution of frequencies of occurrence of each binary data when the data in the plaintext, the ciphertext, and the decrypted plaintext for the Help.Izh (Visio) file as given in FIG. 13 is expressed as binary data of 2-digit hexadecimal numbers, the ordinate representing the frequency of occurrence, and the abscissa the first digit of the two-digit hexadecimal numbers. A particular broken line corresponds to 0*, 1*, 2*, . . . , E*, or F* in the leftmost column (ordinate column) in the table in FIG. 20. From these tables and line graphs, it can be seen that, in the plaintext, the characteristic of the file is clearly shown up, although, in the ciphertext, the frequency of occurrence of each binary data is basically uniform, and the difference in frequency of occurrence between types of binary data is small. The table at bottom in FIG. 21 shows that, when a key which is wrong, but is different from the correct one only by one byte is used for decryption, the distribution in the decrypted data is similar to that in the ciphertext.

From the tables and line graphs, it can be seen that, if someone else tries to decrypt the ciphertext which is encrypted according to the present embodiment, the encrypted data will give no opportunity of decryption. This also means that the present embodiment provides a high cryptographic strength.

As can be seen from the above detailed explanation, the embodiment of the present invention offers an encryption method and system, and a decryption method and system wherein the encryption algorithm requires a small size of real-storage area in the computer, which allows it to be easily loaded in a portable telephone, and provides a high encryption speed and a high cryptographic strength. Further, by adopting the embodiment of the present invention, computer programs for realizing these encryption method and decryption method, and a memory medium for storing those computer programs can be provided. In addition, the embodiment of the present invention can afford an encryption/decryption system with which, if a file providing a specific pattern, such as image data, is encrypted, the pattern in the plaintext will not easily be developed in the ciphertext, and thus the cryptographic strength is high. Another purpose of the present invention is to provide an encryption/decryption system with which the length of the key is optional, and thus the processing speed and the cryptographic strength can be selected as required by the user.

In the embodiment of the present invention that has been specifically described above, the byte length λ of the common key K is optional, and thus the processing speed and the cryptographic strength can be selected as needed by the user. In other words, the key in the present embodiment is a variable length key. Thus, the embodiment of the present invention offers a high resistance to any total search attack. DES uses the key management technology. However, with DES, the key is used as the encryption key as it is, thus, although the key theoretically consists of 256 key spaces, the number of key spaces which are actually available for the key is only 95 of the ASCII codes. The encryption key which can be used with the present invention consists of all ASCII codes (256 key spaces) other than 0×00, therefore, the present invention is excellent, even when compared to the encryption method of fixed length key (FEAL-8, DES).

For example, if a ciphertext according to the present invention is decrypted by use of the total search attack method, and the length of the key K is 128 bits, the current computer will require a time period of $10^8$ years for decryption. Further, the chaos cryptosystem performs operation processing at high speed, because the keystream is generated from a simple function. In other words, it is a cryptosystem which can assure the cryptographic strength without the need for repetition as with the 3DES, thus being capable of high-speed encryption and decryption.

Further, in the present embodiment, the length of the key K could theoretically be increased to an infinity. With conventional cryptosystems, the method which performs repetitive computation for increasing the cryptographic strength is adopted, therefore, generation of an internal key takes a long time, and if the key length is long, the time required for generating an internal key exceeds the practical time, which means that, unless the key length is a certain fixed length, the processing cannot be performed as a matter of fact. For example, with the RC4 (manufactured by RSA), which performs exponentiation of the value of the key for processing, the encryption speed itself depends upon the key length, resulting in the processing time required being 10 times as long as that for the present embodiment for a given key length.

Furthermore, as can be seen from the above detailed description, the following practical effects can be provided by the present embodiment.

(1) As stated above, the chaos function itself can be replaced with another, the encryption algorithm as the basis can be easily updated.

(2) The encryption method according to the present embodiment is of a stream cryptosystem, thus it can provide a consecutive encryption processing, which allows encryption processing of a large amount of data at high speed for the internet, which can be expected to increasingly develop in the future.

(3) For the same reason, data in English, Japanese, Chinese, and other languages can be processed independently of the difference in language, therefore, a world-wide cryptosystem can be provided.

(4) For the same reason, text data, binary data, and other multi-media data can be processed.

(5) In decryption processing, the decryption can be performed at high speed without the need for referencing any data other than the key.

(6) Since the key is of variable length, the user can freely select the encryption processing speed and the cryptographic strength.

(7) In addition to allowing optional selection of the encryption processing speed and the cryptographic strength, the encryption method according to the present embodiment can be used with a small-sized electronic device, such as a portable telephone connected to the internet.

By mentioning an embodiment in the above paragraphs, the present invention has been specifically described. However, the present invention is, of course, not limited to this particular embodiment. For example, the internal key is not limited to the keystream Ks, but the present invention can be practiced by using the digital chaos signal C or Cd, the subkey set L or the like as the internal key. The present invention can also be practiced by using the data Ks (IR) in the keystream table [Ks] as a second vector directional component, and handling the data in the virtual data space designated by the second vector directional component Ks (IR) as a vector quantitative component, instead of using the secondary ciphertext $E_2$ as the vector directional component IR for designating the data Ks (IR), and generating internal vector data V with the use of the data Ks (IR) as the quantitative component. Likewise, data in the virtual data space may be used as third and forth vector directional components, and the data finally designated may be handled as the vector quantitative components. Further, the data, such as the number of bytes, which has been exemplified in the above embodiment is each only an example, and the present invention is not restricted by such data.

The above description given is for the cryptosystem with which the encryption system and the decryption system have exactly the same configuration. However, depending upon the application for the cryptosystem, it may be preferable to intentionally make the encryption system different in configuration from the decryption system. In normal operation, the user performs encryption processing, intending to perform encryption, and carries out decryption processing, intending to carry out decryption. But when the encryption system and the decryption system have exactly the same configuration, and the user wrongly performs the encryption processing double by use of the same key, intending to carry out the encryption, the decryption processing will be provided after the encryption, resulting in the plaintext being output. This type of cryptosystem can be said to be lacking in safety, and the user tends to feel uneasiness with such a cryptosystem. For example, with the above-mentioned DES in the state of basic configuration, this double encryption processing will generate a plaintext when a special key is used. Such special key is generally known as the weak key. (For detailed description of weak key, refer to [ICE] in the list of reference literature given at the end of this specification). Although it cannot be directly said that the existence of a weak key causes the cryptographic strength to be lowered, the weak key may allow the plaintext to be transmitted to the communication channel as it is, depending upon the degree of the user's carelessness, thus, in service of the cryptosystem, the existence of a weak key leads to the recognition that the cryptosystem is defective, which results in the user having an undue anxiety. (For detailed description, refer to [OK94] in the list of reference literature given at the end of this specification).

The cryptosystem according to the present invention can be used in an application where the encryption system is to be intentionally made different in configuration from the decryption system. FIG. 23 is a flowchart showing the procedure for the processing involved in an encryption method, which is a variation of the encryption method as illustrated in FIG. 2, and the procedure for the processing involved in a decryption method of decrypting the ciphertext obtained using this encryption method to the plaintext. With the encryption method and the decryption method as illustrated in FIG. 23, the encryption method and the decryption method are made different in configuration from each other by adding Step 10 for transformation processing of the secondary ciphertext $E_2$ to just before the final stage in the encryption processing, and performing an inverse transformation processing (ciphertext transformation) in Step 60 in the decryption processing. In FIG. 23, the components of the encryption processing are basically identical to those of the decryption processing. The processing in Step P in the encryption processing is the same as that at P+50 in the decryption processing. However, a slight difference is provided in the flow of processing. As can be seen from FIG. 23, the final transformation in Step 10 in the encryption processing and the ciphertext transformation in Step 60 in the decryption processing, which corresponds to the final transformation in Step 10, are in the locations which are different from each other.

In the final transformation in Step 10, the secondary ciphertext $E_2$ is further stirred for generating a final ciphertext $E_E$. This stirring can be performed by various methods, and at least one of the methods is used for performing stirring at least one time. For example, the bit exchange method provides exchange of four left bits for four right ones in the secondary ciphertext $E_2$. With the bit exchange method, the secondary ciphertext $E_{2(1)}$ (00101001) is divided into (0010) and (1001), and these are exchanged for each other for outputting (10010010). Another example is the bit shift method, which shifts bits output on a specific fixed rule. With the bit shift method, the first bit is transferred to the second bit place, the second bit is transferred to the third bit place, such a transfer being sequentially performed, and finally the eighth bit is transferred to the first bit place. In short, the secondary ciphertext $E_{2(1)}$ (00101001) is transformed into (10010100), and is output as such.

In the encryption processing, the final transformation in Step 10 is performed for outputting the ciphertext $E_E$ to the communication circuit or the like. For example, the ciphertext $E_E$ output to the communication circuit is transmitted to the receiver (the other party of the communication) of the ciphertext through the internet or the like. The receiver of the ciphertext $E_E$ has been provided with the common key K independently of the ciphertext $E_E$ and thus the ciphertext $E_E$ and the common key K are input to the decryption system, and in the decryption processing, the processing inverse to the above-mentioned final transformation is performed in the ciphertext transformation in Step 60.

The plaintext input in the encryption processing is equivalent to the ciphertext input in Step 56 in the decryption processing. When the bit exchange processing is performed in the final transformation in Step 10, the ciphertext $E_E$ is input to the ciphertext input in Step 56 as (10010010). In the ciphertext transformation in Step 60, the bit exchange method divides the ciphertext $E_E$ (10010010) into (1001) and (0010), and exchanges these for each other as (0010) (1001), transforming it into (00101001), which is followed by the primary decryption processing and the like. Similarly, when the bit shift processing is performed in the final transformation in Step 10, the ciphertext $E_E$ is input to the ciphertext input in Step 56 as (10010100). In the ciphertext transformation 60, the bit shift processing inverse to that in the encryption system is performed, i.e., the second bit is transferred to the first bit place, the third bit is transferred to the second bit place, such a transfer being sequentially performed, and finally the first bit is transferred to the eighth bit place. In short, the ciphertext $E_E$ (10010100) is transformed into (00101001), which is followed by the primary decryption processing and the like.

By adopting the configuration as illustrated in FIG. 23, in which the encryption processing and the decryption processing are made different in configuration from each other, a safe encryption/decryption system which will not give any uneasy feeling to the user can be provided.

As specifically described above by mentioning an embodiment, the present invention can offer an encryption method and system, and a decryption method and system wherein the encryption algorithm requires a small size of real-storage area in the computer, which allows it to be easily loaded in a portable telephone, and provides a high encryption speed and a high cryptographic strength, and also offer computer programs which realize these encryption and decryption methods, and a memory means for storing such computer programs. Further, the present invention can afford an encryption/decryption system with which, if a file providing a specific pattern, such as image data, is encrypted, the pattern in the plaintext will not easily be developed in the ciphertext, and thus the cryptographic strength is high. Still further, the present invention can provide an encryption/decryption system with which the length of the key is optional, and thus the processing speed and the cryptographic strength can be selected as required by the user.

Here is a concentrated explanation of the meanings of the signs used in the above description of the present embodiment. [V] is vector table; $\psi$ the number of fields in the vector table [V]; $\Psi$ the vector data initial value which is loaded in the vector table [V]; $\rho$ the data length of the secondary ciphertext $E_2$ handled as the vector directional component IR in the internal vector generation in Step 8, and the data length of the field in the vector table [V] provided in the internal vector generator 108, being assumed to be 1 byte in the present embodiment; $\mu$ the number of bytes for the digital chaos signal C, Cd, being assumed to be 128 in the present embodiment; $\xi$ the number of bytes for the subkey set L; [Ks] the keystream table; $\eta$ the number of bytes for the keystream Ks stored in the keystream table [Ks], being equal to $\mu+\xi$; Ks (IR) the data of the address IR in the keystream table [Ks]; $\nu$ the number of bytes for the partial keys produced by dividing the common key K, being assumed to be 1 in the present embodiment; $S_{E2(m)}$ the data in the keystream table [Ks] designated using the secondary ciphertext $E_{2(m)}$ of 1 byte as the address: XOR an operator expressing exclusive OR operation; and m mod $\psi$ the remainder when the integer m is divided by the integer $\psi$, and $\psi=200$ and m=206, for example, gives m mod $\psi=6$.

Here is a list of reference literature which is mentioned in the above description.

[AI90]: "Chaos—Basic Theory and Application" written by Kazuyuki Aihara (Saiensu Co., Ltd., 1990)

[AI00]: "Chaos Time Series Analysis and Application" written by Tohru Ikeda, Yasuji Yamada, and Motomasa Komuro, and edited by Kazuyuki Aihara (Sangyo Tosho Publishing Co., Ltd., 2000)

[NK97]: "A Course in Number Theory and Cryptography" written by Neal Koblitz and translated by Koh'ichi Sakurai (Springer-Verlag Tokyo, Inc.)

[OK94]: "An Introduction to the Theory of Cryptography" by Eiji Okamoto (KYORITSU SHUPPAN, 1993)

[ICE]: The ICE Home Page www.darkside.com.au/ice/cyrtanalysis.html

What is claimed is:

1. A digital encryption method which uses an encryption algorithm for executing data processing, the method comprising:
    providing initial values to be applied in the encryption algorithm;
    inputting a common key K and a plaintext P;
    generating an internal key related to and based on the common key K;
    providing plaintext information comprising processed plaintext P data or the plaintext P;
    generating a primary ciphertext $E_1$ for the plaintext P by performing a first exclusive OR operation between the plaintext information and the internal key;
    generating a secondary ciphertext $E_2$ for the plaintext P by performing a second exclusive OR operation between the primary ciphertext $E_1$ and data V for secondary encryption;
    defining a group of data to be handled with the encryption algorithm comprising the common key K, the plaintext P and the initial values or the common key K, the plaintext P and data generated by processing the initial values, and providing the group of data as a virtual data space, wherein the second exclusive OR operation is recognized as a vector directional component designating data in the virtual data space, and wherein the data designated by the vector directional component is recognized as a vector quantitative component;
    performing a logical operation for the vector quantitative component for generating vector data; and
    using the vector data as the data V for secondary encryption.

2. An encryption method as claimed in claim 1, wherein the encryption algorithm is executed on a computer.

3. An encryption method as claimed in claim 2, wherein the encryption algorithm is stored on a computer.

4. A digital encryption method comprising:
    providing initial values to be applied in an encryption algorithm;
    inputting a common key K and a plaintext P;
    generating an internal key related to and based on the common key K;
    generating a primary ciphertext $E_1$ for the plaintext P by performing a first exclusive OR operation between the plaintext information and the internal key;
    generating a secondary ciphertext $E_2$ for the plaintext P by performing a second exclusive OR operation between the primary ciphertext $E_1$ and data V for secondary encryption, wherein
    the data V for secondary encryption, V, consists of $\psi$ data ($\psi$ is 1 or an integer greater than 1), $V_{(1)}, V_{(2)}, V_{(3)}, \ldots, V_{(\psi)}$, each having a length of $\rho$ ($\rho$ is 1 or an integer greater than 1), the initial values of $V_{(1)}, V_{(2)}, V_{(3)}, \ldots, V_{(\psi)}$ are $\Psi_{(1)}, \Psi_{(2)}, \Psi_{(3)}, \ldots, \Psi_{(\psi)}$,
    performing the second exclusive OR operation for the first $\psi$ data, $E_{1(1)}, E_{1(2)}, E_{1(3)}, \ldots, E_{1(\psi)}$ in the primary ciphertext $E_1$, and using the initial values $\Psi_{(1)}, \Psi_{(2)}, \Psi_{(3)}, \ldots, \Psi_{(\psi)}$ as the data V for the secondary encryption when data located in every specific length of p, counting from the head of the primary ciphertext $E_1$, is $E_{1(1)}, E_{1(2)}, E_{1(3)}, \ldots, E_{1(m)}, \ldots$ (m is 2 or an integer greater than 2), respectively, and data located in every specific length of $\rho$, counting from the head of the secondary ciphertext $E_2$, is $E_{2(1)}, E_{2(2)}, E_{2(3)}, \ldots, E_{2(m)}, \ldots$, respectively,
    defining a group of data comprising at least the internal key and the plaintext information and other data related to the key K and settings previously given or data obtained by transforming the settings, and providing the group of data as a virtual data space;
    wherein the first exclusive OR operation is performed on the data in said virtual data space designated using $E_{2(n)}$ as the address, and the generated operation value is used as data for secondary encryption, $V_{(n)}$ for replacing the initial value $\Psi_{(n)}$ with the $V_{(n)}$ when $1 \leq n \leq \psi$ (n is an integer); and
    wherein the first exclusive OR operation is performed on the data in the virtual data space designated using $E_{2(n)}$ as the address, and the generated operation value is used as new data for secondary encryption, $V_{(n)}$ for replacing the former data for secondary encryption, $V_{(n)}$ with the new $V_{(n)}$ when $n \geq \psi+1$.

5. An encryption method as claimed in claim 4, wherein, if said data length $\rho$ is 1 byte and the number of bytes for said internal key is $\eta$, a table for the data for secondary encryption of $\psi$ bytes ($\psi \leq \eta$) for storing said data for secondary encryption, V ($V=V_{(1)}, V_{(2)}, V_{(3)}, \ldots, V_{(n)}, V_{(\psi)}$) is provided; in the table for the data for secondary encryption, $\Psi_{(1)}, \Psi_{(2)}, \Psi_{(3)}, \ldots, \Psi_{(\psi)}$ are previously stored as initial values in $V_{(1)}$, $V_{(2)}$, $V_{(3)}$, ..., $V_{(n)}$, ..., $V_{(\psi)}$, respectively; the data for said internal key designated using $E_{2(1)}$, $E_{2(2)}$, $E_{2(3)}$, ..., $E_{2(m)}$, ... as the address is $S_{E2(m)}$;

and if exclusive OR operation is expressed as XOR, the value expressed by the right side of the logical operation expression:

$$S_{E2(m)} \text{XOR } V_{(n)} \text{XOR } V_{(n+1)} = V_{(n)} \quad (1)$$

is replaced with $V_{(n)}$, sequentially (Here, n=m mod $\psi$).

6. An encryption method as claimed in claim 5, wherein, by performing a first key transformation processing on the common key K, first common key transformation data including information of the key K is generated; a digital chaos signal C is generated in accordance with a chaos function using the first common key transformation data as the initial value init; and digital chaos signal C information containing data including the information of the digital chaos signal C is used as said internal key or data obtained by processing the digital chaos signal C information containing data is used as said internal key.

7. An encryption method as claimed in claim 5, wherein, by performing a second key transformation processing on the common key K, a second common key transformation data including the information of the common key K is generated; and by stirring a digital chaos signal C containing information and said second common key transformation data, said internal key is generated.

8. An encryption method as claimed in claim 5, wherein the data designated in said virtual data space using $E_{2(1)}$, $E_{2(2)}$, $E_{2(3)}$, ..., $E_{2(m)}$, ... as the address is said internal key.

9. An encryption method as claimed in claim 5, wherein the encryption algorithm is executed on a computer.

10. An encryption method as claimed in claim 4, wherein, by performing a first key transformation processing on the common key K, first common key transformation data including information of the key K is generated; a digital chaos signal C is generated in accordance with a chaos function using the first common key transformation data as the initial value init; and digital chaos signal C information containing data including the information of the digital chaos signal C is used as said internal key or data obtained by processing the digital chaos signal C information containing data is used as said internal key.

11. An encryption method as claimed in claim 10, wherein, by performing a second key transformation processing on the common key K, a second common key transformation data including the information of the common key K is generated; and by stirring said digital chaos signal C containing information and said second common key transformation data, said internal key is generated.

12. An encryption method as claimed in claim 10, wherein the data designated in said virtual data space using $E_{2(1)}$, $E_{2(2)}$, $E_{2(3)}$, ..., $E_{2(m)}$, ... as the address is said internal key.

13. An encryption method as claimed in claim 10, wherein the encryption algorithm is executed on a computer.

14. An encryption method as claimed in claim 10, wherein said first key transformation processing is a processing involving extracting at least a part of the data in the common key K; generating an add value by performing an operation of adding the partial key to the preset base value; and using the add value as said first common key transformation data.

15. An encryption method as claimed in claim 14, wherein, by performing a second key transformation processing on the common key K, a second common key transformation data including the information of the common key K is generated; and by stirring said digital chaos signal C containing information and said second common key transformation data, said internal key is generated.

16. An encryption method as claimed in claim 14, wherein the data designated in said virtual data space using $E_{2(1)}$, $E_{2(2)}$, $E_{2(3)}$, ..., $E_{2(m)}$, ... as the address is said internal key.

17. An encryption method as claimed in claim 14, wherein the encryption algorithm is executed on a computer.

18. An encryption method as claimed in claim 10, wherein, if the number of bytes for the common key K is $\lambda$ ($\lambda$ is 1 or an integer greater than 1), $\Lambda$ partial keys ($1 \leq \Lambda \leq \lambda$) of $\nu$ bytes ($1 \leq \nu \leq \lambda$) are extracted from the common key K; by adding the preset base value to the partial key, $\Lambda$ addition values are generated; using the addition values as the initial values $\text{init}_{(1)}$, $\text{init}_{(2)}$, $\text{init}_{(3)}$, ..., $\text{init}_{(n)}$, ..., $\text{init}(\Lambda)$, respectively, (n is an integer, meeting $1 \leq n \leq \Lambda$), digital chaos signals $C_{(1)}$, $C_{(2)}$, $C_{(3)}$, ..., $C_{(n)}$, ..., $C_{(\Lambda)}$ are generated for the initial values $\text{init}_{(1)}$, $\text{init}_{(2)}$, $\text{init}_{(3)}$, ..., $\text{init}_{(n)}$, $\text{init}_{(\Lambda)}$, respectively; and by processing the digital chaos signals $C_{(1)}$, $C_{(2)}$, $C_{(3)}$, ..., $C_{(n)}$, ..., $C_{(\Lambda)}$, said digital chaos signal C information containing data is generated.

19. An encryption method as claimed in claim 18, wherein, by performing a second key transformation processing on the common key K, a second common key transformation data including the information of the common key K is generated; and by stirring said digital chaos signal C containing information and said second common key transformation data, said internal key is generated.

20. An encryption method as claimed in claim 18, wherein the data designated in said virtual data space using $E_{2(1)}$, $E_{2(2)}$, $E_{2(3)}$, ..., $E_{2(m)}$, ... as the address is said internal key.

21. An encryption method as claimed in claim 18, wherein the encryption algorithm is executed on a computer.

22. An encryption method as claimed in claim 18, wherein the processing of said digital chaos signals $C_{(1)}$, $C_{(2)}$, $C_{(3)}$, ..., $C_{(n)}$, ..., $C_{(\Lambda)}$ is an operation of $C_{(1)} + C_{(2)} = C_{F(1)}$, $C_{(2)} + C_{F(1)} = C_{F(2)}$, $C_{(3)} + C_{F(2)} = C_{F(3)}$, ..., $C_{(n)} + C_{F(n-1)} = C_{F(n)}$, ..., $C_{(\Lambda)} + C_{F(\Lambda-1)} = C_{F(\Lambda)}$, and $C_{F(\Lambda)}$ is said digital chaos signal C information containing data.

23. An encryption method as claimed in claim 22, wherein, by performing a second key transformation processing on the common key K, a second common key transformation data including the information of the common key K is generated; and by stirring said digital chaos signal C containing information and said second common key transformation data, said internal key is generated.

24. An encryption method as claimed in claim 22, wherein the data designated in said virtual data space using $E_{2(1)}$, $E_{2(2)}$, $E_{2(3)}$, ..., $E_{2(m)}$, ... as the address is said internal key.

25. An encryption method as claimed in claim 22, wherein the encryption algorithm is executed on a computer.

26. An encryption method as claimed in claim 4, wherein, by performing a second key transformation processing on the common key K, a second common key transformation data including the information of the common key K is generated; and by stirring digital chaos signal C containing information and said second common key transformation data, said internal key is generated.

27. An encryption method as claimed in claim 26, wherein the data designated in said virtual data space using $E_{2(1)}$, $E_{2(2)}$, $E_{2(3)}$, ..., $E_{2(m)}$, ... as the address is said internal key.

28. An encryption method as claimed in claim 26, wherein the encryption algorithm is executed on a computer.

29. An encryption method as claimed in claim 4, wherein the data designated in said virtual data space using $E_{2(1)}$, $E_{2(2)}$, $E_{2(3)}$, ..., $E_{2(m)}$, ... as the address is said internal key.

30. An encryption method as claimed in claim 29, wherein the encryption algorithm is executed on a computer.

31. An encryption method as claimed in claim 4, wherein the encryption algorithm is executed on a computer.

32. A digital encryption method comprising:
inputting a common key K and a plaintext P;
generating an internal key related to and based on the common key K;
performing a first exclusive OR operation between the plaintext information comprising plaintext processed data or the plaintext P, and the internal key for generating a primary ciphertext $E_1$ for the plaintext P;
performing a second exclusive OR operation between the primary ciphertext $E_1$ and data for secondary encryption, V, for generating a secondary ciphertext $E_2$ of the plaintext P,
wherein
the second exclusive OR operation is performed between the primary ciphertext $E_1$ and data for secondary encryption, V, every specific length of ρ, the data for secondary encryption, $V_{(1)}$, of the specific length of ρ between which and the data $E_{1(1)}$ of the specific length of ρ at the head of the primary ciphertext $E_1$ said second exclusive OR operation is performed is the initial value $\Psi_{(1)}$;
defining a group of data comprising at least the internal key and the plaintext information and settings previously given or data obtained by transforming the settings, and providing the group of data as a virtual data space;
performing said second exclusive OR operation by performing the first exclusive OR operation on the data designated in the virtual data space using $E_{2(1)}$ as the address, if the secondary ciphertext $E_2$ of a length of ρ generated by said second exclusive OR operation performed between the data $E_{1(1)}$ and the initial value $\Psi_{(1)}$ is $E_{2(1)}$, the data for secondary encryption, $V_{(2)}$, of a length of ρ between which and the data $E_{1(2)}$ of a length of ρ following the data $E_{1(1)}$ in the primary ciphertext $E_1$; and
generating, subsequently, the data for secondary encryption, $V_{(3)}$, $V_{(4)}$, $V_{(5)}$, . . . following $V_{(2)}$ of a length of ρ by performing the first exclusive OR operation on the data designated in said virtual data space using the secondary ciphertexts $E_{2(2)}$, $E_{2(3)}$, $E_{2(4)}$, . . . , $E_{2(m)}$, wherein m is 1 or an integer greater than 1, following $E_{2(1)}$ of a length of ρ as the address, respectively.

33. An encryption method as claimed in claim 32, wherein, if said data length ρ is 1 byte and the number of bytes for said internal key is η, a table for the data for secondary encryption of ψ bytes (ψ≦η) for storing said data for secondary encryption, V (V=$V_{(1)}$, $V_{(2)}$, $V_{(3)}$, . . . , $V_{(n)}$, . . . , $V_{(\psi)}$ is provided; in the table for the data for secondary encryption, $\Psi_{(1)}$, $\Psi_{(2)}$, $\Psi_{(3)}$, . . . , $\Psi_{(\psi)}$ are previously stored as initial values in $V_{(1)}$, $V_{(2)}$, $V_{(3)}$, . . . , $V_{(n)}$, . . . , $V_{(\psi)}$, respectively; the data for said internal key designated using $E_{2(1)}$, $E_{2(2)}$, $E_{2(3)}$, . . . , $E_{2(m)}$, . . . as the address is $S_{E2(m)}$; and when exclusive OR operation is expressed as XOR, the value expressed by the right side of the logical operation expression:

$$S_{E2(m)XOR\ V(n)XOR\ V(n+1)=V(n+1)} \quad (1a)$$

is replaced with $V_{(n+1)}$, sequentially (Here, n=m mod ψ).

34. An encryption method as claimed in claim 33, wherein, by performing a first key transformation processing on the common key K, first common key transformation data including information of the key K is generated; a digital chaos signal C is generated in accordance with a chaos function using the first common key transformation data as the initial value init; and digital chaos signal C information containing data including the information of the digital chaos signal C is used as said internal key or data obtained by processing the digital chaos signal C information containing data is used as said internal key.

35. An encryption method as claimed in claim 33, wherein, by performing a second key transformation processing on the common key K, a second common key transformation data including the information of the common key K is generated; and by stirring a digital chaos signal C containing information and said second common key transformation data, said internal key is generated.

36. An encryption method as claimed in claim 33, wherein the data designated in said virtual data space using $E_{2(1)}$, $E_{2(2)}$, $E_{2(3)}$, . . . , $E_{2(m)}$, . . . as the address is said internal key.

37. An encryption method as claimed in claim 33, wherein the encryption algorithm is executed on a computer.

38. An encryption method as claimed in claim 32, wherein, by performing a first key transformation processing on the common key K, first common key transformation data including information of the key K is generated; a digital chaos signal C is generated in accordance with a chaos function using the first common key transformation data as the initial value init; and digital chaos signal C information containing data including the information of the digital chaos signal C is used as said internal key or data obtained by processing the digital chaos signal C information containing data is used as said internal key.

39. An encryption method as claimed in claim 32, wherein, by performing a second key transformation processing on the common key K, a second common key transformation data including the information of the common key K is generated; and by stirring a digital chaos signal C containing information and said second common key transformation data, said internal key is generated.

40. An encryption method as claimed in claim 32, wherein the data designated in said virtual data space using $E_{2(1)}$, $E_{2(2)}$, $E_{2(3)}$, . . . , $E_{2(m)}$, . . . as the address is said internal key.

41. An encryption method as claimed in claim 32, wherein the encryption algorithm is executed on a computer.

42. A digital encryption apparatus which uses an encryption algorithm for executing data processing, the apparatus comprising a processor executing modules operable to:
provide initial values to be applied to the encryption algorithm
input a common key K and a plaintext P;
generate an integral key related to and based on the common key K;
provide plaintext information comprising processed plaintext P or the plaintext P
generate a primary ciphertext $E_1$ for the plaintext P by performing a first exclusive OR operation between the plaintext information and the internal key; and
generate a secondary ciphertext $E_2$ of the plaintext P by performing a second exclusive OR operation between the primary ciphertext $E_1$ and data V for secondary encryption,
further comprising a secondary encryption data V generator for generating secondary encryption data V, wherein said secondary encryption data V generator grasps as a virtual data space a group of data including the common key K, the plaintext P and the initial values or the common key K, the plaintext P and the data generated by processing the initial values to be handled with the encryption algorithm, and wherein the secondary encryption data V generator recognizes the result of the second exclusive OR operation as a vector directional component designating data in the virtual data space, and wherein the secondary encryption data V generator recognizes the data designated by the vector directional component as a vector quantitative component; and wherein the secondary encryption data V generator performs a logical operation for the vector quantitative component for generating vector data and handles the vector data as the data V for secondary encryption.

43. A decryption method which decrypts a ciphertext generated by an encryption method, wherein the encryption method uses an encryption algorithm for executing data processing involving:
providing initial values to be applied in the encryption algorithm;
inputting a common key K and a plaintext P; generating an internal key, related to and based on the common key K;
providing plaintext information comprising processed plaintext P data or the plaintext P;
generating a primary ciphertext $E_1$ for the plaintext P by performing a first exclusive OR operation between the plaintext information and the internal key;
generating a secondary ciphertext $E_2$ for the plaintext P by performing a second exclusive OR operation between the primary ciphertext $E_1$ and data V for secondary encryption
defining a group of data to be handled with the encryption algorithm comprising the common key K, the plaintext P and the initial values, or the common key K, the plaintext P and data generated by processing the initial values, and providing the group of data as a virtual data space, wherein the second exclusive OR operation is recognized as a vector directional component designating data in the virtual data space, and wherein the data designated by the vector directional component is recognized as a vector quantitative component; a logical operation for the vector quantitative component is performed for generating vector data; and
using the vector data as the data for secondary encryption, V;
the decryption method comprising the steps of:
inputting the ciphertext; and
decrypting the ciphertext using the common key.

44. A digital decryption apparatus which decrypts a ciphertext generated using an encryption apparatus, the encryption apparatus comprising an encryption algorithm for executing data processing, the encryption apparatus comprising a processor executing modules operable to:
input a common key K and a plaintext P;
generate an internal key related to and based on the common key K;
provide plaintext information comprising processed plaintext P or the plaintext P;
generate a primary ciphertext $E_1$ for the plaintext P by performing a first exclusive OR operation between the plaintext information and the internal key;
generate a secondary ciphertext $E_2$ of the plaintext P; by performing a second exclusive OR operation between the primary ciphertext $E_1$ and data V for secondary encryption;
further comprising a secondary encryption data V generator for generating secondary encryption data V, wherein said secondary encryption data V generator grasps as a virtual data space a group of data including the common key K, the plaintext P and the initial values which are previously loaded in the algorithm, or the common key K, the plaintext P and the data generated by processing the initial values to be handled with the encryption algorithm, and wherein the secondary encryption data V generator recognizes the result of the second exclusive OR operation as a vector directional component designating data in the virtual data space; and wherein the secondary encryption data V generator recognizes the data designated by the vector directional component as a vector quantitative component; and wherein the secondary encryption data V generator performs a logical operation for the vector quantitative component for generating vector data and handles the vector data as the data V for secondary encryption;
wherein the ciphertext is provided as an input and the common key is used to decrypt the ciphertext.

* * * * *